US009193809B2

(12) United States Patent
Kuzuba et al.

(10) Patent No.: US 9,193,809 B2
(45) Date of Patent: Nov. 24, 2015

(54) POLYETHYLENE BASED RESIN, PRODUCING CATALYST FOR THE SAME, METHOD FOR PRODUCING THE SAME, HOLLOW PLASTIC MOLDED ARTICLE CONTAINING POLYETHYLENE BASED RESIN, AND USE OF THE SAME

(75) Inventors: Yuuichi Kuzuba, Kanagawa (JP); Takashi Monoi, Kanagawa (JP); Ritsuya Matsumoto, Kanagawa (JP); Kouichi Ogawa, Kanagawa (JP); Satoshi Kanazawa, Kanagawa (JP); Takaaki Hattori, Kanagawa (JP)

(73) Assignee: JAPAN POLYETHYLENE CORPORATION, Tokyo (JP)

( * ) Notice: Subject to any disclaimer, the term of this patent is extended or adjusted under 35 U.S.C. 154(b) by 1010 days.

(21) Appl. No.: 13/318,486

(22) PCT Filed: Jun. 26, 2009

(86) PCT No.: PCT/JP2009/061784
§ 371 (c)(1),
(2), (4) Date: Nov. 2, 2011

(87) PCT Pub. No.: WO2010/150410
PCT Pub. Date: Dec. 29, 2010

(65) Prior Publication Data
US 2012/0058288 A1 Mar. 8, 2012

(51) Int. Cl.
C08F 10/02 (2006.01)
C08F 10/00 (2006.01)
(Continued)

(52) U.S. Cl.
CPC ............... *C08F 10/00* (2013.01); *C08F 10/02* (2013.01); *C08F 4/44* (2013.01); *C08F 4/52* (2013.01);
(Continued)

(58) Field of Classification Search
CPC ............... C08F 4/44; C08F 4/52; C08F 4/54; C08F 10/02; C08F 2500/04; C08F 2500/12
See application file for complete search history.

(56) References Cited

U.S. PATENT DOCUMENTS 4,593,079 A 6/1986 Rekers et al.
4,735,931 A 4/1988 McDaniel et al.
(Continued)

FOREIGN PATENT DOCUMENTS

CN 1659192 A 8/2005
CN 1753729 A 3/2006
(Continued)

OTHER PUBLICATIONS

Office Action issued on Apr. 30, 2014 in the corresponding Chinese Patent Application No. 200980159486.0 (with English Translation).
(Continued)

*Primary Examiner* — Richard A Huhn
(74) *Attorney, Agent, or Firm* — Oblon, McClelland, Maier & Neustadt, L.L.P

(57) ABSTRACT

A polyethylene based resin exhibiting excellent moldability and durability and having an excellent balance between impact resistance and stiffness; and a hollow plastic molded article using the foregoing resin, which exhibits excellent moldability, durability and barrier properties and has an excellent balance between impact resistance and stiffness, are provided. The polyethylene based resin satisfies the following requirements (1) to (4): (1) a high-load melt flow rate (HLMFR) is from 1 to 100 g/10 min; (2) a density is from 0.940 to 0.960 g/cm$^3$; (3) a strain hardening parameter λmax of elongational viscosity is from 1.05 to 1.50; and (4) a rupture time in a full notch tensile creep test and a density satisfy the following relational expression (A): log(rupture time)≥−355×(density)+337.6(A).

5 Claims, 4 Drawing Sheets

(51) Int. Cl.
*C08F 4/44* (2006.01)
*C08F 4/54* (2006.01)
*C08F 4/52* (2006.01)
*C08F 110/02* (2006.01)
*C08F 210/16* (2006.01)

(52) U.S. Cl.
CPC ............... *C08F 4/54* (2013.01); *C08F 110/02* (2013.01); *C08F 210/16* (2013.01); *C08F 2500/04* (2013.01); *C08F 2500/12* (2013.01); *Y10T 428/1397* (2015.01)

(56) References Cited

U.S. PATENT DOCUMENTS

| | | | |
|---|---|---|---|
| 4,820,785 A | 4/1989 | McDaniel et al. |
| 2002/0007205 A1 | 1/2002 | Zheng et al. |
| 2003/0171524 A1 | 9/2003 | Mihan et al. |
| 2003/0232715 A1 | 12/2003 | Katzen et al. |
| 2004/0093054 A1 | 5/2004 | Zheng et al. |
| 2005/0004605 A1 | 1/2005 | Zheng et al. |
| 2005/0037917 A1 | 2/2005 | Cann et al. |
| 2006/0136026 A1 | 6/2006 | Zheng et al. |

FOREIGN PATENT DOCUMENTS

| | | |
|---|---|---|
| EP | 1 172 381 A1 | 1/2002 |
| JP | 53 146287 | 12/1978 |
| JP | 58 084806 | 5/1983 |
| JP | 62 297305 | 12/1987 |
| JP | 2002 020412 | 1/2002 |
| JP | 2002 080521 | 3/2002 |
| JP | 2003 096127 | 4/2003 |
| JP | 2003 183287 | 7/2003 |
| JP | 2003 313225 | 11/2003 |
| JP | 2003313225 A * | 11/2003 ............... C08F 4/69 |
| JP | 2004 504416 | 2/2004 |
| JP | 2006 512454 | 4/2006 |
| JP | 2006 182917 | 7/2006 |
| WO | 94 13708 | 6/1994 |
| WO | WO 2004/076494 A2 | 9/2004 |
| WO | WO 2004/076494 A3 | 9/2004 |

OTHER PUBLICATIONS

International Search Report Issued Sep. 1, 2009 in PCT/JP09/061784 Filed Jun. 26, 2009.

Office Action issued Oct. 14, 2013 in Chinese patent Application No. 200980159486.0 (with English translaiton).

Combined Chinese Office Action and Search Report issued Jan. 22, 2013, in Patent Application No. 200980159486.0 (with English-language translation).

C. E. Marsden, et al., "The Influence of Silica Support on Polymerisation Catalyst Performance", Preparation of Catalysts V, Studies in Surface Science and Catalysis, vol. 63, 1991, pp. 215-227.

C. E. Marsden, "Advances in supported chromium catalysts", Plastics, Rubber and Composites Processing and Applications, vol. 21, No. 4, 1994, pp. 193-200.

Extended Search Report issued Jan. 30, 2013 in European Patent Application No. 09846540.4.

* cited by examiner

POLYETHYLENE BASED RESIN, PRODUCING CATALYST FOR THE SAME, METHOD FOR PRODUCING THE SAME, HOLLOW PLASTIC MOLDED ARTICLE CONTAINING POLYETHYLENE BASED RESIN, AND USE OF THE SAME

TECHNICAL FIELD

The present invention relates to a polyethylene based resin, a catalyst used for production of a polyethylene based resin and a method for producing the same, and a hollow plastic molded article containing a polyethylene based resin and a use of the same. In more detail, the present invention relates to a polyethylene based resin obtained by specified catalyst and polymerization process, which satisfies prescribed requirements, exhibits excellent moldability and durability and has an excellent balance between impact resistance and stiffness; and a hollow plastic molded article containing the foregoing resin, which exhibits excellent moldability, durability and barrier properties and has an excellent balance between impart resistance and stiffness.

Furthermore, the present invention relates to a use for concretizing a hollow plastic molded article exhibiting excellent moldability and durability, having an excellent balance between impact resistance and stiffness and exhibiting excellent barrier properties as a hollow plastic product such as tanks, cans, containers, bottles and the like, particularly a fuel tank for automobiles and the like.

BACKGROUND ART

Hollow plastic molded articles used for the storage or transport of liquid substances are widely used for daily living or industrial field. In particular, in automobile parts, a hollow plastic molded article to be used as a fuel tank is taking the place of a conventional metal material-made fuel tank. Furthermore, at present, plastics are a material most frequently used for production of a fuel can of inflammable liquids, noxious substances or the like and a carriage container such as plastic bottles or the like. Since plastic-made containers and tanks are low in a weight/voltage ratio as compared with those made of a metal material, they have such merits that it is possible to reduce the weight, corrosion such as rust and the like hardly occurs, and impact resistance is good, and they are acquiring wide uses more and more.

In many cases, the hollow plastic molded articles are mainly obtained by means of blow molding from high-density polyethylene (HDPE). Polyethylene containers are not sufficient in an intercepting action (barrier action) for mainly suppressing penetration of the contents toward the outside. In the case of automobiles, in view of the fact that a volatile substance such as a fuel and the like will be an environmental pollutant, severe legal regulations are imposed regarding the exhaust. Since the barrier action of polyethylene against the penetration of a volatile substance is low, grapping for reducing the penetration by adopting more measures is taken. A measure which is the most important for attaining this is a fluorine treatment of the surface of a container, or introduction of a battier layer made of a polar barrier plastic. The barrier layer of this kind is introduced as a wall within a container by a technology known as multi-layer co-extrusion blow molding.

In almost all cases, the barrier layer is low in mechanical strength in co-extrusion blow molding. In barrier layer-containing containers, the impact properties are more likely influences particularly at low temperatures, as compared with those of barrier layer-free non-coated high-density polyethylene containers.

In plastic fuel tanks obtained from polyethylene, attention should be paid especially to requirements which will be problems. Since the plastic fuel tanks are classified as an important safety part for ensuring safety of automobiles, they are required to provide with high levels especially with respect to mechanical strength, durability and impact resistance, and the development of materials for enhancing these matters to sufficiently high levels is desired.

As to the hollow plastic molded articles, for example, there are proposed hollow plastic molded articles having one or more layers made of polyethylene obtained using a fluorine-modified chromium catalyst (see Patent Document 1). But, as compared with the case where fluorine modification is not performed, when a fluorine-modified chromium catalyst is used, a molecular weight distribution of obtained polyethylene becomes narrow, and therefore, there are brought results that the durability does not sufficiently satisfy a level as a hollow plastic molded article, particularly a fuel tank for automobiles.

Also, as to polyethylene, there is proposed a method for producing polyethylene suitable for blow molded articles, particularly large blow molded articles, by performing polymerization using a trialkylaluminum compound-supported chromium catalyst while allowing hydrogen to coexist (see Patent Document 2). Also, the subject patent document also discloses a method for producing polyethylene using a dialkylaluminum alkoxide compound-supported chromium catalyst (Comparative Example 13). However, polyethylene suitable for hollow plastic molded articles, particularly a fuel tank for automobiles is not disclosed, and it is hard to say that a fuel tank for automobiles with a sufficient level of durability can be produced.

Also, there is proposed a method for producing polyethylene using a chromium catalyst by adding an organoaluminum compound as a co-catalyst to a polymerization system (see Patent Document 3). The subject patent document also discloses a method for producing polyethylene using a trialkylaluminum and/or dialkylaluminum alkoxide compound-supported chromium catalyst (Examples Nos. 2 to 6). However, polyethylene suitable for hollow plastic molded articles, particularly a fuel tank for automobiles is not disclosed. Furthermore, the subject patent document also discloses a method for producing polyethylene using a titania-containing chromium catalyst obtained by impregnating titanium tetraisopropoxide onto silica before activation of a Cr catalyst to achieve calcination activation. But, polyethylene obtained at that time tends to be low in its impact strength.

Also, there is proposed a method for producing polyethylene using a trialkylaluminum and/or dialkylaluminum alkoxide-supported chromium catalyst (see Patent Document 4). However, polyethylene suitable for hollow plastic molded articles, particularly a fuel tank for automobiles is not disclosed.

Also, there is proposed a catalyst for ethylene based polymerization composed of a solid chromium catalyst component prepared by allowing an inorganic oxide carrier to support a chromium compound in which at least a part of chromium atoms can be converted into a hexavalent chromium atom thereon by performing calcination activation in a non-reducing atmosphere, a dialkylaluminum functional group-containing alkoxide and a trialkylaluminum (see Patent Document 5). The subject patent document also discloses an ethylene based polymer for blow molded articles exhibiting excellent creep resistance and ESCR and having an HLMFR of from 1 to 100 g/10 min and a density of from 0.935 to 0.955 g/cm³. The subject patent document also discloses a method for producing polyethylene using a trialkylaluminum and/or dialkylaluminum alkoxide compound-supported chromium catalyst (Comparative Examples 3 and 13).

However, the subject patent document neither suggests nor discloses polyethylene suitable for hollow plastic molded articles, particularly a fuel tank for automobiles with excellent impact resistance.

Also, there is proposed a method for producing an ethylene based polymer using a chromium catalyst prepared by allowing a chromium compound-supported inorganic oxide carrier prepared by supporting a chromium compound on an inorganic oxide carrier and performing calcination activation in a non-reducing atmosphere, to convert at least a part of chromium atoms into a hexavalent chromium atom, thereby supporting a specified organoaluminum compound (alkoxides, siloxides, phenoxides, etc.) thereon in an inert hydrocarbon solvent (see Patent Document 6). The subject patent document discloses an ethylene based polymer having an excellent balance between environmental stress crack resistance (ESCR) and stiffness.

Also, there is proposed an ethylene based polymer producing catalyst which is characterized by being composed of a chromium catalyst prepared by supporting a chromium compound on an inorganic oxide carrier and performing calcination activation in a non-reducing atmosphere, thereby converting at least a part of chromium atoms into a hexavalent chromium atom and a specified organoaluminum compound (alkoxides, siloxides, phenoxides, etc.) (see Patent Document 7). The subject patent document discloses an ethylene based polymer exhibiting excellent ESCR or creep resistance.

Furthermore, there is proposed a method for producing an ethylene based polymer which is characterized in that in multistage polymerization of ethylene alone or copolymerization of ethylene and an α-olefin having from 3 to 8 carbon atoms continuously in a plurality of polymerization reactors connected in series by using a chromium catalyst prepared by supporting a chromium compound on an inorganic oxide carrier and performing calcination activation in a non-reducing atmosphere, thereby converting at least a part of chromium atoms into a hexavalent chromium atom, and a specified organoaluminum compound (alkoxides, siloxides, phenoxides, etc.) is introduced into any one or all of the polymerization reactors (see Patent Document 8). The subject patent document discloses an ethylene based polymer exhibiting excellent environmental stress crack resistance (ESCR) and creep resistance. However, in the foregoing patent document, though an ethylene based polymer having a molecular weight distribution (Mw/Mn) of 20.9 (working examples) is disclosed, polyethylene suitable for hollow plastic molded articles, particularly a fuel tank for automobiles with excellent impact resistance is neither suggested nor disclosed.

Also, there is proposed a catalyst for ethylene based polymerization prepared by allowing a fluorinated chromium compound in which at least a part of chromium atoms can be converted into a hexavalent chromium atom by performing activation in a non-reducing atmosphere, to support a specified organic boron compound thereon (see Patent Document 9). The subject patent document also discloses a method for producing polyethylene using a trialkylaluminum and/or dialkylaluminum alkoxide compound-supported chromium catalyst (Comparative Examples 6 and 8). However, the subject patent document neither suggests nor discloses polyethylene suitable for hollow plastic molded articles, particularly a fuel tank for automobiles.

In addition to the above, as commercially available polyethylene used for a fuel tank for automobiles, for example, HB111R, manufactured by Japan Polyethylene Corporation; 4261AG, manufactured by Basell Polyolefins; and the like are known. Though these are a material which meets severe requirements of automobile manufactures and is acclaimed in the market, it may not be always said that they are on a sufficiently high level regarding a balance between durability and stiffness and issues of impact resistance and moldability.

Under such circumstances, there are desired polyethylene overcoming the problems of polyethylene so far, exhibiting excellent moldability and durability and having an excellent balance between impact resistance and stiffness and in particular, capable of realizing excellent high stiffness; and polyethylene suitable for hollow plastic molded articles, particularly fuel tanks with high performances.

PRIOR ART DOCUMENT

Patent Document

Patent Document 1: JP-T-2004-504416
Patent Document 2: JP-A-2002-080521
Patent Document 3: JP-T-2006-512454
Patent Document 4: WO94/13708
Patent Document 5: JP-A-2002-020412
Patent Document 6: JP-A-2003-096127
Patent Document 7: JP-A-2003-183287
Patent Document 8: JP-A-2003-313225
Patent Document 9: JP-A-2006-182917

SUMMARY OF THE INVENTION

Problem to be Solved by the Invention

A problem of the present invention is to provide a polyethylene based resin exhibiting excellent moldability and durability and having an excellent balance between impact resistance and stiffness; and a hollow plastic molded article using the foregoing resin, which exhibits excellent moldability, durability and barrier properties and has an excellent balance between impact resistance and stiffness.

Means for Solving the Problem

In order to achieve the foregoing problem, the present inventors made extensive and intensive investigations. As a result, it has been found that a polyethylene based resin having specified properties, particularly a polyethylene based resin obtained by performing polymerization using an organoaluminum compound, especially a trialkylaluminum and/or alkylaluminum alkoxide compound-supported chromium catalyst, exhibits excellent moldability and durability and has an excellent balance between impact resistance and stiffness; and that a hollow plastic molded article using the subject polyethylene based resin reveals such favorable characteristics, leading to accomplishment of the present invention on the basis of such knowledge.

That is, constitutions of the present invention are shown below.

[1] A polyethylene based resin satisfying the following requirements (1) to (4):
(1) a high-load melt flow rate (HLMFR) is from 1 to 100 g/10 min;
(2) a density is from 0.940 to 0.960 g/cm³;
(3) a strain hardening parameter λmax of elongational viscosity is from 1.05 to 1.50; and (4) a rupture time in a full notch tensile creep test and a density satisfy the following relational expression (A):

$$\log(\text{rupture time}) \geq -355 \times (\text{density}) + 337.6 \quad (A)$$

[2] The polyethylene based resin according to [1] above, wherein the rupture time in a full notch tensile creep test and the density satisfy the following relational expression (D):

$$\log(\text{rupture time}) \geq -355 \times (\text{density}) + 338.8 \quad (D)$$

[3] The polyethylene based resin according to [1] above, which is produced using a chromium catalyst supporting an organoaluminum compound.

[4] The polyethylene based resin according to [3] above, which is produced using a chromium catalyst supporting an organoaluminum compound represented by the following general formula (1):

$$R^1_n Al(OR^2)_{3-n} \quad (1)$$

n=1,2 wherein each of $R^1$ and $R^2$ may be the same as or different from each other and represents an alkyl group, provided that the alkyl group of each of $R^1$ and $R^2$ also includes a cycloalkyl group.

[5] The polyethylene based resin according to [3] above, which is produced using a chromium catalyst supporting an organoaluminum compound represented by the following general formula (2):

$$R^3 R^4 Al(OR^5) \quad (2)$$

wherein each of $R^3$, $R^4$ and $R^5$ may be the same as or different from each other and represents an alkyl group, provided that the alkyl group of each of $R^3$, $R^4$ and $R^5$ also includes a cycloalkyl group.

[6] The polyethylene based resin according to [1] above, which has a molecular weight distribution (Mw/Mn) measured by GPC of 25 or more.

[7] The polyethylene based resin according to [1] above, which has a Charpy impact strength of 8 kJ/m² or more.

[8] The polyethylene based resin according to [1] above, wherein the rupture time (T) in a full notch tensile creep test is 30 hours or more.

[9] A polyethylene based resin-producing catalyst comprising a chromium catalyst having a chromium compound supported on an inorganic oxide carrier, wherein at least a part of chromium atoms is a hexavalent chromium atom, and an organoaluminum compound is present concentrated on the surface of the inorganic oxide carrier.

[10] The polyethylene based resin-producing catalyst according to [9] above, wherein when an aluminum atom content on a section of a catalyst particle is measured using an electron probe micro analyzer, a detected amount of the aluminum atom on the surface of the particle is larger than that of the aluminum atom present in an inner part of the particle.

[11] The polyethylene based resin-producing catalyst according to [9] above, wherein the organoaluminum compound-supported chromium catalyst is one obtained by first subjecting an inorganic oxide carrier having a chromium compound supported thereon to calcination activation in a non-reducing atmosphere, thereby converting at least a part of chromium atom into a hexavalent chromium atom; further supporting an organoaluminum compound thereon in an inert hydrocarbon solvent; and subsequently removing and drying the solvent.

[12] The polyethylene based resin-producing catalyst according to [9] above, wherein the organoaluminum compound is selected from the group consisting of a dialkylaluminum alkoxide, an alkylaluminum dialkoxide and a trialkylaluminum.

[13] A method for producing a polyethylene based resin, comprising homopolymerizing ethylene or copolymerizing ethylene and an α-olefin using a chromium catalyst supporting an organoaluminum compound, wherein the organoaluminum compound-supported chromium catalyst is one obtained by supporting a chromium compound on an inorganic oxide carrier having a specific surface area of from 250 to 800 m²/g and a pore volume of from 0.5 to 3.0 cm³/g; performing calcination activation at from 400 to 900° C. in a non-reducing atmosphere, thereby converting at least a part of chromium atom into a hexavalent chromium atom; further supporting an organoaluminum compound thereon in an inert hydrocarbon solvent, so that a molar ratio thereof to the chromium atom is from 0.1 to 20; and removing and drying the inert hydrocarbon solvent.

[14] The method for producing a polyethylene based resin according to [13] above, wherein the calcination activation is performed at from 450 to 550° C.

[15] The method for producing a polyethylene based resin according to [13] above, wherein the molar ratio of the organoaluminum compound to the chromium atom is from 0.5 to 2.0.

[16] The method for producing a polyethylene based resin according to [13] above, wherein the organoaluminum compound is an alkylaluminum alkoxide compound represented by the following general formula (1):

$$R^1_n Al(OR^2)_{3-n} \quad (1)$$

n=1,2 wherein each of $R^1$ and $R^2$ may be the same as or different from each other and represents an alkyl group, provided that the alkyl group of each of $R^1$ and $R^2$ also includes a cycloalkyl group.

[17] The method for producing a polyethylene based resin according to [13] above, wherein the organoaluminum compound is an alkylaluminum alkoxide compound represented by the following general formula (2):

$$R^3 R^4 Al(OR^5) \quad (2)$$

wherein each of $R^3$, $R^4$ and $R^5$ may be the same as or different from each other and represents an alkyl group, provided that the alkyl group of each of $R^3$, $R^4$ and $R^5$ also includes a cycloalkyl group.

[18] The method for producing a polyethylene based resin according to [17] above, wherein the alkylaluminum alkoxide compound is a compound represented by the following general formula (3):

$$R^6 R^7 Al \left( O - \underset{H}{\overset{R^8}{\underset{|}{\overset{|}{C}}}} - R^9 \right) \quad (3)$$

wherein each of $R^6$ and $R^7$ may be the same as or different from each other and represents an alkyl group having from 1 to 18 carbon atoms; and each of $R^8$ and $R^9$ may be the same as or different from each other and represents a hydrogen atom or an alkyl group, and at least one of them is an alkyl group, provided that the alkyl group of each of $R^6$, $R^7$, $R^8$ and $R^9$ also includes a cycloalkyl group; and that $R^8$ and $R^9$ may be connected to each other to form a ring.

[19] The method for producing a polyethylene based resin according to [13] above, wherein hydrogen is allowed to coexist at the time of polymerization.

[20] The method for producing a polyethylene based resin according to [19] above, wherein the polymerization is performed in a liquid phase, and the polymerization is performed under a condition where a ratio of a hydrogen concentration (Hc; % by mass) to an ethylene concentration (ETc; % by mass) in the liquid phase satisfies the following relational expression (1):

$$1.0 \times 10^{-4} \leq Hc/ETc \leq 7.0 \times 10^{-3} \quad (1)$$

[21] The method for producing a polyethylene based resin according to [19] above, wherein the polymerization is performed in a vapor phase, and the polymerization is performed under a condition where a ratio of a hydrogen partial pressure (Hp; MPa) to an ethylene partial concentration (ETp; MPa) in the vapor phase satisfies the following relational expression (2):

$$1.0 \times 10^{-4} \leq Hp/ETp \leq 1.0 \quad (2)$$

[22] The method for producing a polyethylene based resin according to [13] above, wherein the α-olefin has from 3 to 8 carbon atoms.

[23] A hollow plastic molded article comprising the polyethylene based resin according to [1] above.

[24] The hollow plastic molded article according to [23] above, wherein the hollow plastic molded article is at least one member selected from the group consisting of a fuel tank, a kerosene can, a drum can, a container for chemicals, a container for agrochemicals, a container for solvents and a plastic bottle.

Effect of the Invention

The polyethylene based resin of the present invention exhibits excellent moldability and durability and has an excellent balance between impact resistance and stiffness.

Also, the hollow plastic molded article of the present invention exhibits excellent moldability and durability and has an excellent balance between impact resistance and stiffness, and in particular, even when formed in a multi-layer structure using a barrier layer, it exhibits excellent barrier properties without giving adverse influences by the barrier layer, such as deterioration in strength, failure in molding and the like. Therefore, the hollow plastic molded article of the present invention is suitably provided for use of tanks such as fuel tanks and the like, cans, containers, bottles and the like, particularly a fuel tank for automobiles and the like.

MODES FOR CARRYING OUT THE INVENTION

Figure 1:
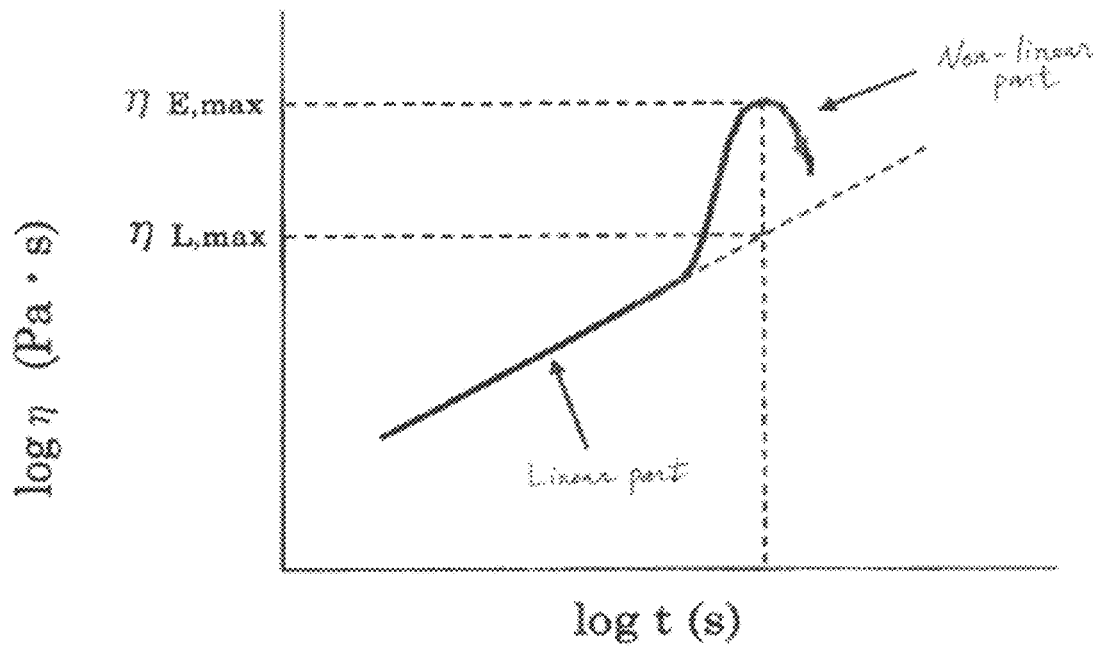
FIG. 1 is an explanatory diagram of a measurement method of a strain hardening parameter (λmax) of elongational viscosity.

The present invention is concerned with a specified polyethylene based resin, namely a polyethylene based resin which is characterized by specified melt flow rate, density and strain hardening parameter (λmax) of elongational viscosity and in that a rupture time in a full notch tensile creep test and a density satisfy a relational expression represented by the foregoing expression (A) (hereinafter also referred to as "present polyethylene based resin"); and further with a hollow plastic molded article using the same, particularly a fuel tank, especially a fuel tank for automobiles. The present invention is hereunder described in detail for every item.

[I] Polyethylene Based Resin:

The polyethylene based resin of the present invention satisfies the following requirements (1) to (4).

(1) A high-load melt flow rate (HLMFR) is from 1 to 100 g/10 min.
(2) A density is from 0.940 to 0.960 g/cm³.
(3) A strain hardening parameter λmax of elongational viscosity is from 1.05 to 1.50.
(4) A rupture time in a full notch tensile creep test and a density satisfy a relational expression represented by the foregoing expression (A).

$$\log(\text{rupture time}) \geq -355 \times (\text{density}) + 337.6 \quad (A)$$

Each of these requirements is hereunder described in detail.

1. High-Load Melt Flow Rate (HLMFR):

In the polyethylene based resin of the present invention, HLMFR falls within the range of from 1 to 100 g/10 min, preferably from 1 to 10 g/10 min, more preferably from 3 to 7 g/10 min, and still more preferably from 4 to 6 g/10 min.

When HLMFR is less than 1 g/10 min, at the time of extrusion molding into a parison (a molten polymer in a pipe form as extruded from a nozzle of a molding machine at blow molding; in a state before expansion by an air pressure within a die), the extrusion amount is insufficient, and the molding state is unstable, so that such is not practically useful; whereas even when it exceeds 10100 g/10 min, the formation of a parison is unstable due to shortages in melt viscosity and melt tension, so that such is not practically useful.

HLMFR can be adjusted by a method of controlling a polymerization temperature or a hydrogen concentration, or the like. For example, HLMFR can be increased by elevating the polymerization temperature or increasing the hydrogen concentration. Here, HLMFR is one measured under a condition at a temperature of 190° C. under a load of 21.60 kg in conformity with JIS K-7210.

2. Density:

In the polyethylene based resin of the present invention, a density falls within the range of from 0.940 to 0.960 g/cm³, preferably from 0.943 to 0.955 g/cm³, and more preferably from 0.946 to 0.950 g/cm³.

When the density is less than 0.940 g/cm³, stiffness of the hollow plastic molding article is insufficient, whereas when it exceeds 0.960 g/cm³, durability of the hollow plastic molding article is insufficient.

The density can be adjusted by a method of controlling the kind or content of an α-olefin, or the like. For example, the density can be increased by decreasing the content of the α-olefin in the polyethylene based resin (decreasing the addition amount of the α-olefin at the time of polymerization), or by using an α-olefin with a small carbon number in the case of the same content.

The density is one obtained by melting pellets at a temperature of 160° C. by a heat compression molding machine and dropping the temperature at a rate of 25° C./min to form a sheet having a thickness of 2 mm, conditioning this sheet in a room at a temperature of 23° C. for 48 hours and then putting it in a density ingredient tube, followed by measurement in conformity with JIS K-7112.

3. Strain Hardening Parameter (λmax) of Elongational Viscosity:

From the viewpoint of moldability, the polyethylene based resin of the present invention is preferably one exhibiting a strain hardening behavior in the elongational viscosity measurement. The elongational viscosity measurement is a measurement of an elongation viscosity η(Pa·s) relative to a time (s) at a temperature of 170° C. and at a strain rate of 0.1/s, and the strain hardening behavior is a phenomenon in which the elongation viscosity rises up on the side of a long time in the subject measurement.

The strain hardening behavior in the elongational viscosity measurement can be evaluated by an elongation viscosity ratio (λmax) obtained in the elongational viscosity measurement.

The elongation viscosity ratio (λmax) can be determined as follows. That is, a graph of double-logarithmic axes in which the abscissa is a time (s), and the ordinate is an elongation viscosity η(Pa·s) is prepared; a maximum elongational viscosity ηEmax of a non-linear part of a viscosity increase curve is determined; a linear part of the viscosity increase curve is extrapolated to determine an extrapolated viscosity ηLmax at a time t (s) at which ηEmax is given; and a ratio of ηEmax and ηLmax (ηEmax/ηLmax) is defined as an elongational viscosity ratio (λmax).

In the polyethylene based resin of the present invention, the strain hardening parameter (λmax) obtained by the elongation viscosity measurement falls within the range of from 1.05 to 1.50, and preferably from 1.10 to 1.40.

This strain hardening parameter λmax correlates with a long chain branching number, and when λmax is large, the long chain branching number is large. The long chain branching also correlates with moldability. That is, when the long chain branching increases, the moldability is good. Furthermore, the long chain branching also correlates with creep resistant that is one of indexes of the durability. That is, when the long chain branching increases, the creep resistance tends to be inferior, thereby exhibiting a reverse correlation against the moldability.

When λmax is less than 1.05, though the durability measured in a specimen is enhanced, the moldability is inferior, so that failure in molding is generated, resulting in a situation that an actual hollow plastic molded article is not obtainable. When λmax exceeds 1.50, though moldability of the hollow plastic molded article is good, its durability is lowered.

λmax can be adjusted by a method of controlling an activation temperature of the chromium catalyst, a supporting amount of the trialkylaluminum and/or alkylaluminum alkoxide compound or a hydrogen concentration at the time of polymerization, or the like. For example, λmax can be increased by elevating the activation temperature, increasing the supporting amount of the trialkylaluminum and/or alkylaluminum alkoxide compound, or decreasing the hydrogen concentration at the time of polymerization.

A measurement method of λmax is described in the Examples.

4. Creep Resistance (Rupture Time):

In the polyethylene based resin of the present invention, a rupture time in a full notch tensile creep test and a density satisfy a relational expression represented by the following expression (A), preferably the following expression (A'), more preferably the following expression (A''), and especially preferably the following expression (D).

$$\log(\text{rupture time}) \geq -355 \times (\text{density}) + 337.6 \quad (A)$$

$$\log(\text{rupture time}) \geq -355 \times (\text{density}) + 337.7 \quad (A')$$

$$\log(\text{rupture time}) \geq -355 \times (\text{density}) + 337.8 \quad (A'')$$

$$\log(\text{rupture time}) \geq -355 \times (\text{density}) + 338.8 \quad (D)$$

When the rupture time is less than this lower limit, durability of the hollow plastic molded article is insufficient. Though an upper limit value of the rupture time is not particularly restricted, in general, it satisfies a relational expression represented by the following expression (C).

$$\log(\text{rupture time}) \leq -355 \times (\text{density}) + 340.3 \quad (C)$$

A measurement of the rupture time in a full notch tensile creep test is described in the Examples.

That is, after compression molding a sheet having a thickness of 5.9 mm in conformity with JIS K-6992-2 (2004 version), a specimen having shape and dimensions of Section: "Nominal 50" shown in FIG. 1 of Annex 5 (Regulations) of JIS K-6774 (2004 version) is prepared and subjected to a full notch tensile creep test (FNCT) in pure water at 80° C. A tensile load is set to 88N, 98N and 108N, respectively, and the test point is defined to be two points at each load. From plots of six points between a rupture time and a nominal stress in the obtained double-logarithmic scale, a rupture time at a nominal stress of 6 MPa is defined as an index of the creep resistance by means of a method of least squares.

Figure 3:
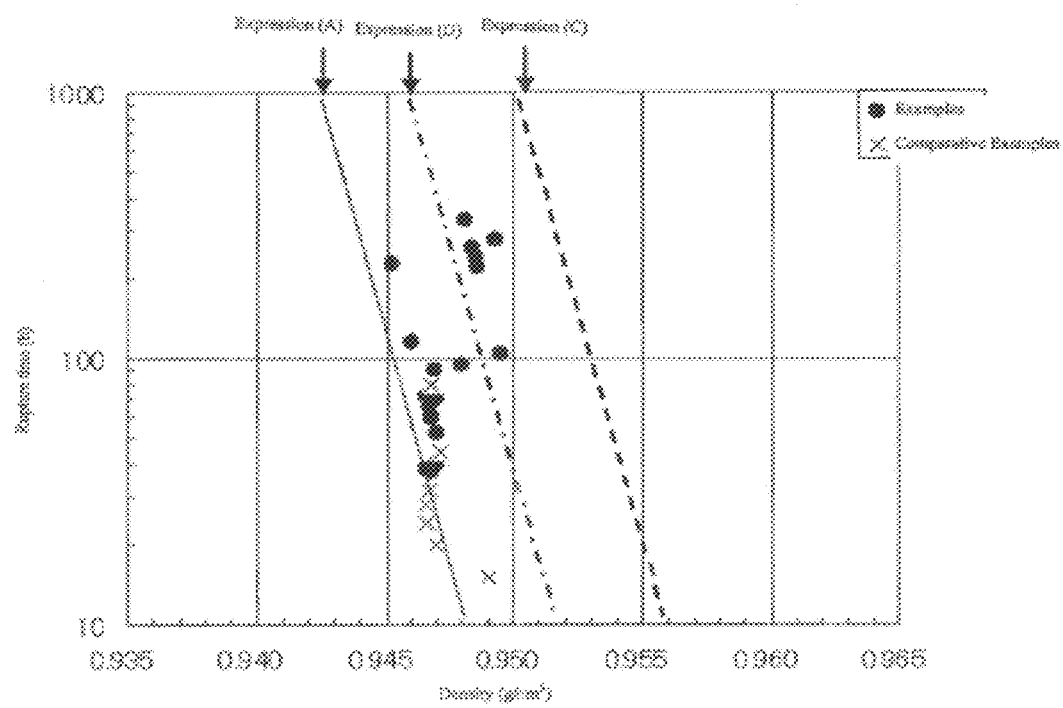
FIG. 3 is a diagram showing a relation between density and rupture time of a polyethylene based resin.
Figure 4:
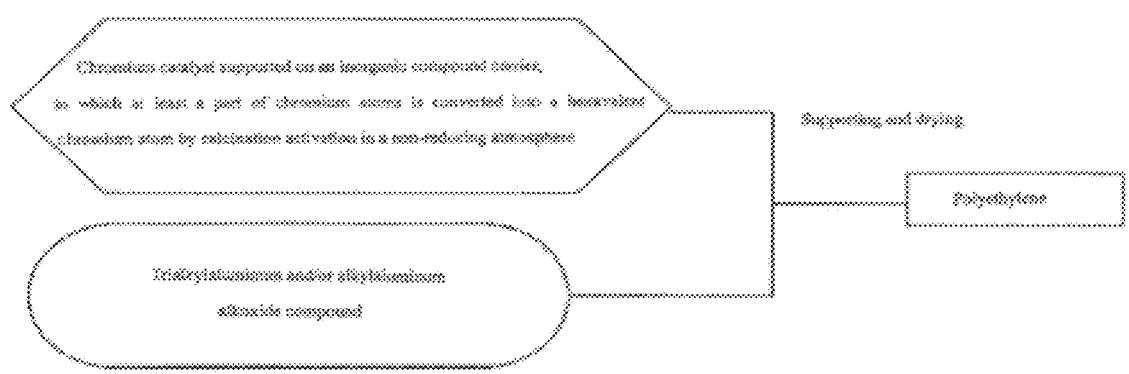
FIG. 4 is a flow chart in the preparation of a polymerization catalyst used for production of the present polyethylene based resin.

FIG. 3 is a diagram showing a relation between density and rupture time. A polyethylene based resin falling outside the region represented by the expression (A) is insufficient with respect to durability as a hollow plastic molded article, whereas one falling within the region represented by the expression (A) has excellent durability.

In the case of producing a polymer with the same HLMFR and same density, the rupture time can be adjusted by a method of controlling an activation temperature of the chromium catalyst or a hydrogen concentration at the time of polymerization, or the like. For example, since the broader the molecular weight distribution of the polyethylene based resin, or the smaller the long chain branching amount, the higher the rupture time is, the rupture time can be increased by dropping the activation temperature or increasing the hydrogen concentration.

A rupture time (T) in the full notch tensile creep test is preferably 30 hours or more, and more preferably 50 hours or more. When the rupture time (T) is less than this lower limit, durability of the hollow molded article is insufficient. Though an upper limit value of the rupture time (T) is not always originally restricted, in general, a hollow molded article whose rupture time exceeds 300 hours is hardly produced.

(III) Molecular weight Distribution (Mw/Mn) Measured by GPC:

In the polyethylene based resin of the present invention, a molecular weight distribution (Mw/Mn) measured by gel permeation chromatography (GPC) is preferably 25 or more, and more preferably 27 or more. Though an upper limit thereof is not particularly restricted, it is usually up to 50.

As to the molecular weight distribution (Mw/Mn), the following GPC measurement is performed to determine a number average molecular weight (Mn) and a mass average molecular weight (Mw), from which a molecular weight distribution (Mw/Mn) is then calculated and determined.

[Measurement Condition of Gel Permeation Chromatography (GPC)]

Apparatus: 150C Model, manufactured by Waters Corporation

Column: Shodex-HT806M

Solvent: 1,2,4-Trichlorobenzene

Temperature: 135° C.

Universal assessment using a monodispersed polystyrene fraction

As to the molecular weight distribution shown in terms of a ratio of Mw to Mn (Mw/Mn) (the larger the Mw/Mn, the broader the molecular weight distribution is), an n-alkane and data of classified linear polyethylene with Mw/Mn≤1.2 were applied to the formula of molecular weight and detector sensibility described in "Size Exclusion Chromatography (High Performance Liquid Chromatography for Polymers)" (page 98, written by Sadao Mori, Kyoritsu Shuppan Co., Ltd.), and a sensitivity of a molecular weight M expressed by the following expression was determined, thereby correcting actually measured values of sample.

Sensitivity of molecular weight $M=a+b/M$

Here, each of a and b represents a constant, with a=1.032 and b=189.2.

The molecular weight distribution can be adjusted by a method of controlling the activation temperature of the catalyst or the polymerization temperature, particularly by controlling the activation temperature. That is, when the activation temperature is elevated, the molecular weight distribution becomes narrow, whereas when the activation temperature is reversely dropped, the molecular weight distribution becomes broad. The molecular weight distribution can also be adjusted by controlling the polymerization temperature, an effect of which is, however, smaller than that in the case of the activation temperature. That is, when the polymerization temperature is elevated, the molecular weight distribution becomes slightly narrow, whereas when the polymerization temperature is reversely dropped, the molecular weight distribution becomes slightly broad.

5. Charpy Impact Strength:

In the polyethylene based resin of the present invention, a Charpy impact strength falls within the range of preferably 8 kJ/m$^2$ or more, more preferably 9 kJ/m$^2$ or more, and still more preferably 10 kJ/m$^2$ or more.

When the Charpy impact strength is less than 8 kJ/m$^2$, impact resistance of the hollow plastic molded article is insufficient. Though an upper limit value of the Charpy impact strength is not particularly restricted, it is in general not more than 30 kJ/m$^2$.

A measurement method of the Charpy impact strength is described in the Examples.

In the case of producing a polymer with the same HLMFR and same density, the Charpy impact strength can be adjusted by a method of controlling an activation temperature of the chromium catalyst or a hydrogen concentration at the time of polymerization, or the like. For example, since the narrower the molecular weight distribution of the polyethylene based resin, or the smaller the long chain branching amount, the higher the Charpy impact strength is, the Charpy impact strength can be increased by elevating the activation temperature or increasing the hydrogen concentration.

6. Production Method of Polyethylene Based Resin:

The polyethylene based resin of the present invention is preferably obtained by performing polymerization using a chromium catalyst. The polyethylene based resin of the present invention is preferably obtained by performing polymerization using an organoaluminum compound (preferably a trialkylaluminum and/or alkylaluminum alkoxide compound)-supported chromium catalyst while allowing hydrogen to coexist.

The trialkylaluminum and/or alkylaluminum alkoxide compound-supported chromium catalyst that is a preferred polymerization catalyst, and the polymerization method are hereunder described in detail.

(6-1) Trialkylaluminum and/or Alkylaluminum Alkoxide Compound-Supported Chromium Catalyst:

The trialkylaluminum and/or alkylaluminum alkoxide compound-supported chromium catalyst is prepared by supporting a chromium compound on an inorganic oxide carrier; performing calcination activation in a non-reducing atmosphere, thereby converting at least a part of chromium atoms into a hexavalent chromium atom; further supporting a trialkylaluminum and/or alkylaluminum alkoxide compound thereon in an inert hydrocarbon solvent; and subsequently removing and drying the solvent.

On that occasion, the reason why the solvent is removed and dried so as to make a contact time between the catalyst and the solvent short as far as possible resides in the matter that the chromium atom is not over-reduced by the trialkylaluminum and/or alkylaluminum alkoxide compound.

The chromium catalyst having a chromium compound supported on an inorganic oxide carrier, in which at least a part of chromium atoms is converted into a hexavalent chromium atom by performing calcination activation in a non-reducing atmosphere is usually known as a Phillips catalyst. An outline of this catalyst is described in documents such as M. P. McDaniel, *Advance in Catalysis*, Volume 33, page 47 (1985), Academic Press Inc.; M. P. McDaniel, *Handbook of Heterogeneous Catalysis*, page 2400 (1997), VCH; M. B. Welch, et al., *Handbook of Polyolefins: Synthesis and Properties*, page 21 (1993), Marcel Dekker; and the like.

As the inorganic oxide carrier, oxides of metals belonging to the Group 2, 4, 13 or 14 of the periodic table are preferable. Specific examples thereof include magnesia, titania, zirconia, alumina, silica, thoria, silica-titania, silica-zirconia, silica-alumina and mixtures thereof. Above all, silica, silica-titania, silica-zirconia or silica-alumina is preferable. In the case of silica-titania, silica-zirconia or silica-alumina, a material containing from 0.2 to 10% by weight, preferably from 0.5 to 7% by weight, and more preferably from 1 to 5% by weight of a titanium, zirconium or aluminum atom as a metal component other than silica is useful. Production methods, physical properties and characteristic features of such carriers suitable for the chromium catalyst are described in documents such as C. E. Marsden, *Preparation of Catalysts*, Volume V, page 215 (1991), Elsevier Science Publishers; C. E. Marsden, *Plastics, Rubber and Composites Processing and Applications*, Volume 21, page 193 (1994); and the like.

In the present invention, it is preferable to select a carrier as the chromium catalyst so as to have a specific surface area of 250 m$^2$/g or more, preferably 350 m$^2$/g or more, more preferably 370 m$^2$/g or more, and still more preferably 400 m$^2$/g or more. In the case where the specific surface area is less than 250 m$^2$/g, both of durability and impact resistance are lowered, an aspect of which may be, however, considered to be related to the matter that not only the molecular weight distribution is narrow, but the long chain branching increases. Also, a lowering of ethylene polymerization activity is easy to occur with an increase of a molar ratio of the trialkylaluminum and/or alkylaluminum alkoxide compound to be supported to the chromium atom. Though an upper limit value of the specific surface area is not particularly restricted, it is usually not more than 1,000 m$^2$/g, and preferably not more than 800 m$^2$/g.

Similar to the case of carriers which are used for general chromium catalysts, those having a pore volume falling within the range of from 0.5 to 3.0 cm$^3$/g, preferably from 0.7 to 2.7 cm$^3$/g, more preferably from 1.0 to 2.5 cm$^3$/g, and suitably from 1.2 to 1.8 cm$^3$/g are useful. Similar to carriers which are used for general chromium catalysts, those having an average particle size falling within the range of from 10 to 200 µm, preferably from 20 to 150 µm, and more preferably from 30 to 100 µm are useful. When falling outside the foregoing ranges, ESCR and impact resistance are hardly balanced.

A chromium compound is supported on the foregoing inorganic oxide carrier. The chromium compound may be a compound in which at least a part of chromium atoms can be converted into a hexavalent chromium atom by performing calcination activation in a non-reducing atmosphere after supporting. Examples thereof include chromium oxide, chromium halides and oxyhalides, chromates, bichromates, nitrates, carboxylates, sulfates, chromium-1,3-diketo compounds, chromic acid esters and the like. Specific examples thereof include chromium trioxide, chromium trichloride, chromyl chloride, potassium chromate, ammonium chromate, potassium bichromate, chromium nitrate, chromium nitrate, chromium sulfate, chromium acetate, chromium tris (2-ethylhexanoate), chromium acetylacetonate, bis(tert-butyl) chromate and the like. Above all, chromium trioxide, chromium acetate or chromium acetylacetonate is preferable. It is known that even in the case of using an organic group-containing chromium compound such as chromium acetate and chromium acetylacetonate, the organic group moiety burns by calcination activation in a non-reducing atmosphere as described later, and finally, similar to the case of using chromium trioxide, the resultant reacts with a hydroxyl group on the surface of the inorganic oxide carrier, whereby at least a part of chromium atoms is converted into a hexavalent chromium atom and immobilized in the structure of a chromic acid ester (V. J. Ruddick, et al., *J. Phys. Chem.*, Volume 100, page 11062 (1996); and S. M. Augustine, et al., *J. Catal.*, Volume 161, page 641 (1996)).

Supporting of the chromium compound on the inorganic oxide carrier can be performed by a known method such as impregnation, solvent distillation, sublimation and the like, and an appropriate method may be adopted depending upon the kind of the chromium compound to be used. An amount of the chromium compound to be supported is from 0.2 to 2.0% by weight, preferably from 0.3 to 1.7% by weight, and more preferably from 0.5 to 1.5% by weight in terms of a chromium atom relative to the carrier.

In the present invention, there may be the case where a fluorine compound is further contained in the chromium catalyst having a chromium compound supported on an inorganic oxide carrier.

A method of containing a fluorine compound (fluorination) can be performed by a known method such as a method in which a fluorine compound solution is impregnated in a solvent, and the solvent is then distilled off; a method in which a fluorine compound is sublimated without using a solvent; and the like, and a suitable method may be properly adopted depending upon the kind of the chromium compound to be used. Though the fluorine compound may be contained after supporting the chromium compound on the inorganic oxide carrier, or the chromium compound may be supported after containing the fluorine compound, a method in which the fluorine compound is contained after supporting the chromium compound is preferable.

A content of the fluorine compound is from 0.1 to 10% by weight, preferably from 0.3 to 8% by weight, and more preferably from 0.5 to 5% by weight in terms of a content of fluorine atom.

As the fluorine compound, fluorine-containing salts such as hydrogen fluoride HF, ammonium fluoride NH$_4$F, ammonium silicofluoride (NH$_4$)$_2$SiF$_6$, ammonium borofluoride NH$_4$BF$_4$, ammonium monohydrogen difluoride (NH$_4$)HF$_2$, ammonium hexafluorophosphate NH$_4$PF$_6$ and tetrafluoroborate HBF$_4$ are useful. Above all, ammonium silicofluoride or ammonium monohydrogen difluoride is preferable.

From the viewpoint of uniformity, though it is preferable that such a fluorine compound is dissolved in water or an organic solvent such an alcohol and the like and then impregnated on the chromium catalyst, the fluorine compound in a solid form may be merely mixed with the chromium catalyst. In the case of dissolving and impregnating the fluorine compound, in order to suppress shrinkage of the pore volume to be caused due to a surface tension, it is more preferable to use an organic solvent such as an alcohol and the like. Also, in the case of using a solvent, the solvent is allowed to dry away by an already-known method such as air-drying, vacuum drying, spray drying and the like.

The inorganic oxide carrier is fluorinated by thermally decomposing such a fluorine compound by means of activation in a non-reducing atmosphere as described later. For example, in the case of using silica as the inorganic oxide carrier and using ammonium silicofluoride as the fluorine compound, ammonium silicofluoride is thermally decomposed in the following way, thereby producing hydrogen fluoride HF and silicon fluorine SiF$_4$.

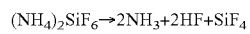
$(NH_4)_2SiF_6 \rightarrow 2NH_3 + 2HF + SiF_4$

Furthermore, it is known that HF and SiF$_4$ react with a silanol group on the surface of silica to cause fluorination (see B. Rebenstorf, *Journal of Molecular Catalysis*, Vol. 66, page 59 (1991); and A, Noshay, et al., *Transition Metal Catalyzed Polymerizations—Ziegler Nana and Metathesis Polymerizations*, page 396 (1988), Cambridge University Press).

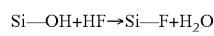
$Si-OH + HF \rightarrow Si-F + H_2O$

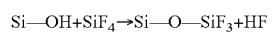
$Si-OH + SiF_4 \rightarrow Si-O-SiF_3 + HF$

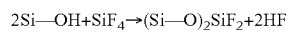
$2Si-OH + SiF_4 \rightarrow (Si-O)_2SiF_2 + 2HF$

In consequence, even in the case of merely mixing a solid of the fluorine compound such as fluorine-containing salts with the chromium catalyst, since the fluorine compound is finally thermally decomposed, the same reaction occurs, whereby the chromium catalyst is fluorinated. Alternatively, a method in which the fluorine compound is thrown during the activation process may be adopted. However, in that case, since the solid of the fluorine compound is fluidized in a gas, from the viewpoint of uniformity, it is preferable to use a fluorine compound solid in a finely particulate form as far as possible.

After supporting the chromium compound, calcination is performed to achieve an activation treatment. The calcination activation can be performed in a non-reducing atmosphere which does not substantially contain water, for example, under oxygen or air. On that occasion, an inert gas may be allowed to coexist. Preferably, the calcination activation is performed in a fluidized state using air having been thoroughly dried by circulating into a molecular sieve or the like. The calcination activation is performed at a temperature of from 400 to 900° C., preferably from 450 to 550° C., more preferably from 470 to 530° C., and still more preferably from 490 to 510° C. for from 30 minutes to 48 hours, preferably from one hour to 24 hours, and more preferably from 2 hours to 12 hours. According to this calcination activation, at least a part of chromium atoms of the chromium compound supported on the inorganic oxide carrier is oxidized into a hexavalent chromium atom and chemically immobilized on the carrier. When the calcination activation is performed at lower than 400° C., the polymerization activity is lowered, and the molecular weight distribution becomes broad, so that though the durability is enhanced, the impact resistance is lowered. When the calcination activation is performed at a temperature exceeding 550° C., the molecular weight distribution becomes narrow, so that though the impact resistance is enhanced, the durability is lowered; and furthermore, when the calcination activation is performed at a temperature exceeding 900° C., sintering occurs, and activity is lowered.

The chromium catalyst which is used in the present invention is obtained in this way. In producing the polyethylene based resin of the present invention, before supporting the chromium compound, or after supporting the chromium compound but before calcination activation, there may be jointly adopted a known method for adjusting ethylene polymerization activity, copolymerizability with an α-olefin, or molecular weight or molecular weight distribution of the obtained ethylene based polymer, by the addition of a metal alkoxide or an organometallic compound represented by a titanium alkoxide such as titanium tetraisopropoxide, a zirconium alkoxide such as zirconium tetrabutoxide, an aluminum alkoxide such as aluminum tributoxide, an organoaluminum such as a trialkylaluminum, an organomagnesium such as a dialkylmagnesium, or the like, a fluorine-containing salt such as ammonium silicofluoride, or the like.

In such a metal alkoxide or organometallic compound, the organic group moiety burns by calcination activation in a non-reducing atmosphere, and the resultant is oxidized into a metal oxide such as titania, zirconia, alumina and magnesia and incorporated into the catalyst. Also, in the case of a fluorine-containing salt, the inorganic oxide carrier is fluorinated.

Such a method is described in documents such as C. E. Marsden, *Plastics, Rubber and Composites Processing and Applications*, Volume 21, page 193 (1994); T. Pullukat, et al., *J. Polym. Sci., Polym. Chem. Ed.*, Volume 18, page 2857 (1980); M. P. McDaniel, et al., *J. Catal.*, Volume 82, page 118 (1983); and the like.

In the present invention, only a silica carrier that is an inorganic oxide is preferable for use of a fuel tank for automobiles excellent in both ESCR and impact resistance. When such a metal alkoxide or organometallic compound is added to the inorganic oxide, an increase of a low-molecular weight component of the polyethylene polymer or narrowing of a molecular weight distribution tends to occur.

In the present invention, it is preferable to use an organoaluminum compound (preferably a trialkylaluminum and/or alkylaluminum alkoxide compound)-supported chromium catalyst obtained by supporting an organoaluminum compound (preferably a trialkylaluminum and/or alkylaluminum alkoxide compound) on a calcination-activated chromium catalyst in an inert hydrocarbon solvent and further removing and drying the solvent.

The trialkylaluminum is a compound represented by the following general formula (A).

$$R'^1 R'^2 R'^3 Al \tag{A}$$

In the formula, each of $R'^1$, $R'^2$ and $R'^3$ represents an alkyl group having from 1 to 18 carbon atoms and may be the same as or different from each other.

Specific examples of the trialkylaluminum include trimethylaluminum, triethylaluminum, tri-n-propylaluminum, tri-n-butylaluminum, triisobutylaluminum, trihexylaluminum, trioctylaluminum and the like. Above all, triethylaluminum, tri-n-butylaluminum, triisobutylaluminum or trihexylaluminum is preferable.

(Alkylaluminum Alkoxide Compound)

In the present invention, it is preferable to use, as a polymerization catalyst, an alkylaluminum alkoxide compound-supported chromium catalyst obtained by supporting an alkylaluminum alkoxide compound on a calcination-activated chromium catalyst in an inert hydrocarbon solvent and further removing and drying the solvent.

The alkylaluminum alkoxide compound is a compound represented by the following general formula (1).

$$R^1{}_n Al(OR^2)_{3-n} \tag{1}$$

n=1,2

In the formula, each of $R^1$ and $R^2$ may be the same as or different from each other and represents an alkyl group. Here, the alkyl group of each of $R^1$ and $R^2$ also includes a cycloalkyl group.

Above all, a compound represented by the following general formula (2) is preferable in view of polymerization activity.

$$R^3 R^4 Al(OR^5) \tag{2}$$

In the formula, each of $R^3$, $R^4$ and $R^5$ may be the same as or different from each other and represents an alkyl group. Here, the alkyl group of each of $R^3$, $R^4$ and $R^5$ also includes a cycloalkyl group.

Among the alkylaluminum alkoxide compounds represented by the general formulae (1) and (2), an alkylaluminum alkoxide compound represented by the following general formula (3) is preferable.

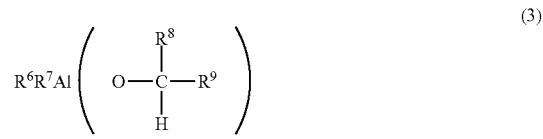

$$R^6 R^7 Al \left( O - \underset{H}{\overset{R^8}{\underset{|}{C}}} - R^9 \right) \tag{3}$$

In the formula, each of $R^6$ and $R^7$ may be the same as or different from each other and represents an alkyl group having from 1 to 18 carbon atoms. Each of $R^8$ and $R^9$ may be the same as or different from each other and represents a hydrogen atom or an alkyl group, and at least one of them is an alkyl group. Here, the alkyl group of each of $R^6$, $R^7$, $R^8$ and $R^9$ also includes a cycloalkyl group. Also, $R^8$ and $R^9$ may be connected to each other to form a ring.

Furthermore, in view of catalytic activity, the compound of the general formula (3) is most preferably an alkylaluminum alkoxide compound represented by the following general formula (4).

(4)

In the formula, each of $R^{10}$, $R^{11}$ and $R^{12}$ may be the same as or different from each other and represents an alkyl group. Here, the alkyl group of each of $R^{10}$, $R^{11}$ and $R^{12}$ also includes a cycloalkyl group.

In the alkylaluminum alkoxide represented by the general formula (1), specific examples of $R^1$ include methyl, ethyl, n-propyl, i-propyl, n-butyl, i-butyl, sec-butyl, tert-butyl, n-hexyl, n-octyl, n-decyl, n-dodecyl, cyclohexyl and the like. Above all, methyl, ethyl, n-propyl, i-propyl, n-butyl, i-butyl, n-hexyl or n-octyl is preferable, with methyl, ethyl, n-propyl, i-propyl, n-butyl or 1-butyl being especially preferable.

Also, specific examples of $R^2$ include methyl, ethyl, n-propyl, i-propyl, n-butyl, i-butyl, sec-butyl, tert-butyl, n-pentyl, n-heptyl, n-nonyl, n-undecyl, cyclohexyl and the like. Above all, methyl, ethyl, n-propyl, i-propyl, n-butyl, i-butyl, sec-butyl, tert-butyl, n-pentyl or n-heptyl is preferable, with methyl, ethyl, n-propyl or i-propyl being especially preferable.

In the alkylaluminum alkoxide represented by the general formula (2), specific examples of $R^3$ and $R^4$ include methyl, ethyl, n-propyl, i-propyl, n-butyl, i-butyl, sec-butyl, tert-butyl, n-hexyl, n-octyl, n-decyl, n-dodecyl, cyclohexyl and the like. Above all, methyl, ethyl, n-propyl, i-propyl, n-butyl, i-butyl, n-hexyl or n-octyl is preferable, with methyl, ethyl, n-propyl, i-propyl, n-butyl or i-butyl being especially preferable.

Also, specific examples of $R^5$ include methyl, ethyl, n-propyl, i-propyl, n-butyl, i-butyl, sec-butyl, tert-butyl, n-pentyl, n-heptyl, n-nonyl, n-undecyl, cyclohexyl and the like. Above all, methyl, ethyl, n-propyl, i-propyl, n-butyl, i-butyl, sec-butyl, tert-butyl, n-pentyl or n-heptyl is preferable, with methyl, ethyl, n-propyl or i-propyl being especially preferable.

Each of $R^8$, $R^9$ and $R^{12}$ is synonymous with the foregoing $R^5$, and each of $R^6$, $R^7$, $R^{10}$ and $R^{11}$ is synonymous with the foregoing $R^3$ or $R^4$.

Specific examples of the dialkylaluminum alkoxide represented by the general formula (2) include dimethylaluminum methoxide, diethylaluminum methoxide, di-n-butylaluminum methoxide, di-i-butylaluminum methoxide, dimethylaluminum ethoxide, diethylaluminum ethoxide, di-n-butylaluminum ethoxide, di-i-butylaluminum ethoxide, dimethylaluminum n-propoxide, diethylaluminum n-propoxide, di-n-butylaluminum n-propoxide, di-i-butylaluminum n-propoxide, dimethylaluminum i-propoxide, diethylaluminum i-propoxide, di-n-butylaluminum i-propoxide, di-i-butylaluminum i-propoxide, dimethylaluminum n-butoxide, diethylaluminum n-butoxide, di-n-butylaluminum n-butoxide, di-i-butylaluminum n-butoxide, dimethylaluminum i-butoxide, diethylaluminum i-butoxide, di-n-butylaluminum i-butoxide, di-i-butylaluminum i-butoxide, dimethylaluminum t-butoxide, diethylaluminum t-butoxide, di-n-butylaluminum t-butoxide, di-i-butylaluminum t-butoxide, dimethylaluminum (cyclopropyl)methoxide, diethylaluminum (cyclopropyl)methoxide, di-n-butylaluminum (cyclopropyl)methoxide, di-i-butylaluminum (cyclopropyl)methoxide, dimethylaluminum (cyclobutyl)methoxide, diethylaluminum (cyclobutyl)methoxide, di-n-butylaluminum (cyclobutyl)methoxide, di-i-butylaluminum (cyclobutyl)methoxide, dimethylaluminum (cyclopentyl)methoxide, diethylaluminum (cyclopentyl)methoxide, di-n-butylaluminum (cyclopentyl)methoxide, di-i-butylaluminum (cyclopentyl)methoxide, dimethylaluminum (cyclohexyl)methoxide, diethylaluminum (cyclohexyl)methoxide, di-n-butylaluminum (cyclohexyl)methoxide, di-i-butylaluminum (cyclohexyl)methoxide, dimethylaluminum (dicyclopropyl)methoxide, diethylaluminum (dicyclopropyl)methoxide, di-n-butylaluminum (dicyclopropyl)methoxide, di-i-butylaluminum (dicyclopropyl)methoxide, dimethylaluminum (dicyclobutyl)methoxide, diethylaluminum (dicyclobutyl)methoxide, di-n-butylaluminum (dicyclobutyl)methoxide, di-i-butylaluminum (dicyclobutyl) methoxide, dimethylaluminum (dicyclopentyl)methoxide, diethylaluminum (dicyclopentyl)methoxide, di-n-butylaluminum (dicyclopentyl)methoxide, di-i-butylaluminum (dicyclopentyl)methoxide, dimethylaluminum (dicyclohexyl) methoxide, diethylaluminum (dicyclohexyl)methoxide, di-n-butylaluminum (dicyclohexyl)methoxide, di-i-butylaluminum (dicyclohexyl)methoxide, dimethylaluminum cyclopropoxide, diethylaluminum cyclopropoxide, di-n-butylaluminum cyclopropoxide, di-i-butylaluminum cyclopropoxide, dimethylaluminum cyclobutoxide, diethylaluminum cyclobutoxide, di-n-butylaluminum cyclobutoxide, di-i-butylaluminum cyclobutoxide, dimethylaluminum cyclopentoxide, diethylaluminum cyclopentoxide, di-n-butylaluminum cyclopentoxide, di-i-butylaluminum cyclopentoxide, dimethylaluminum cyclohexoxide, diethylaluminum cyclohexoxide, di-n-butylaluminum cyclohexoxide and di-i-butylaluminum cyclohexoxide.

Above all, taking into consideration catalytic activity and other catalyst performances, compounds represented by the general formula (3) in which carbon directly bonding to oxygen in the alkoxide moiety is primary or secondary carbon are preferable.

Examples thereof include dimethylaluminum methoxide, diethylaluminum methoxide, di-n-butylaluminum methoxide, di-i-butylaluminum methoxide, dimethylaluminum ethoxide, diethylaluminum ethoxide, di-n-butylaluminum ethoxide, di-i-butylaluminum ethoxide, dimethylaluminum n-propoxide, diethylaluminum n-propoxide, di-n-butylaluminum n-propoxide, di-i-butylaluminum n-propoxide, dimethylaluminum i-propoxide, diethylaluminum i-propoxide, di-n-butylaluminum i-propoxide, di-i-butylaluminum i-propoxide, dimethylaluminum n-butoxide, diethylaluminum n-butoxide, di-n-butylaluminum n-butoxide, di-i-butylaluminum n-butoxide, dimethylaluminum i-butoxide, diethylaluminum i-butoxide, di-n-butylaluminum i-butoxide, di-i-butylaluminum i-butoxide, dimethylaluminum (cyclopropyl) methoxide, diethylaluminum (cyclopropyl)methoxide, di-n-butylaluminum (cyclopropyl)methoxide, di-i-butylaluminum (cyclopropyl)methoxide, dimethylaluminum (cyclobutyl)methoxide, diethylaluminum (cyclobutyl)methoxide, di-n-butylaluminum (cyclobutyl)methoxide, di-i-butylaluminum (cyclobutyl)methoxide, dimethylaluminum (cyclopentyl)methoxide, diethylaluminum (cyclopentyl) methoxide, di-n-butylaluminum (cyclopentyl)methoxide, di-i-butylaluminum (cyclopentyl)methoxide, dimethylaluminum (cyclohexyl)methoxide, diethylaluminum (cyclohexyl) methoxide, di-n-butylaluminum (cyclohexyl)methoxide, di-i-butylaluminum (cyclohexyl)methoxide, dimethylaluminum (dicyclopropyl)methoxide, diethylaluminum (dicyclopropyl)methoxide, di-n-butylaluminum (dicyclopropyl) methoxide, di-i-butylaluminum (dicyclopropyl)methoxide, dimethylaluminum (dicyclobutyl)methoxide, diethylaluminum (dicyclobutyl)methoxide, di-n-butylaluminum (dicyclobutyl)methoxide, di-i-butylaluminum (dicyclobutyl)

methoxide, dimethylaluminum (dicyclopentyl)methoxide, diethylaluminum (dicyclopentyl)methoxide, di-n-butylaluminum (dicyclopentyl)methoxide, di-i-butylaluminum (dicyclopentyl)methoxide, dimethylaluminum (dicyclohexyl)methoxide, diethylaluminum (dicyclohexyl)methoxide, di-n-butylaluminum (dicyclohexyl)methoxide, di-i-butylaluminum (dicyclohexyl)methoxide, dimethylaluminum cyclopropoxide, diethylaluminum cyclopropoxide, di-n-butylaluminum cyclopropoxide, di-i-butylaluminum cyclopropoxide, dimethylaluminum cyclobutoxide, diethylaluminum cyclobutoxide, di-n-butylaluminum cyclobutoxide, di-i-butylaluminum cyclobutoxide, dimethylaluminum cyclopentoxide, diethylaluminum cyclopentoxide, di-n-butylaluminum cyclopentoxide, di-i-butylaluminum cyclopentoxide, dimethylaluminum cyclohexoxide, diethylaluminum cyclohexoxide, di-n-butylaluminum cyclohexoxide and di-i-butylaluminum cyclohexoxide.

Furthermore, above all, taking into consideration catalytic activity and other catalyst performances, compounds represented by the general formula (4) in which carbon directly bonding to oxygen in the alkoxide moiety is primary carbon are preferable.

Examples thereof include dimethylaluminum methoxide, diethylaluminum methoxide, di-n-butylaluminum methoxide, di-i-butylaluminum methoxide, dimethylaluminum ethoxide, diethylaluminum ethoxide, di-n-butylaluminum ethoxide, di-i-butylaluminum ethoxide, dimethylaluminum n-propoxide, diethylaluminum n-propoxide, di-n-butylaluminum n-propoxide, di-i-butylaluminum n-propoxide, dimethylaluminum n-butoxide, diethylaluminum n-butoxide, di-n-butylaluminum n-butoxide, di-i-butylaluminum n-butoxide, dimethylaluminum (cyclopropyl)methoxide, diethylaluminum (cyclopropyl)methoxide, di-n-butylaluminum (cyclopropyl)methoxide, di-i-butylaluminum (cyclopropyl)methoxide, dimethylaluminum (cyclobutyl)methoxide, diethylaluminum (cyclobutyl)methoxide, di-n-butylaluminum (cyclobutyl)methoxide, di-i-butylaluminum (cyclobutyl)methoxide, dimethylaluminum (cyclopentyl) methoxide, diethylaluminum (cyclopentyl)methoxide, di-n-butylaluminum (cyclopentyl)methoxide, di-i-butylaluminum (cyclopentyl)methoxide, dimethylaluminum (cyclohexyl)methoxide, diethylaluminum (cyclohexyl)methoxide, di-n-butylaluminum (cyclohexyl)methoxide and di-i-butylaluminum (cyclohexyl)methoxide.

Furthermore, above all, diethylaluminum ethoxide, diethylaluminum n-butoxide, di-n-butylaluminum ethoxide, di-n-butylaluminum n-butoxide, diethylaluminum i-butoxide, di-i-butylaluminum ethoxide or di-i-butylaluminum i-butoxide is suitable.

The dialkylaluminum alkoxide can be simply synthesized by (i) a method of allowing a trialkylaluminum and an alcohol to react with each other or (ii) a method of allowing a dialkylaluminum halide and a metal alkoxide to react with each other.

That is, in order to synthesize the dialkylaluminum alkoxide represented by the general formula (2), there is preferably adopted a method of allowing a trialkylaluminum and an alcohol to react with each other in a molar ratio of 1:1 as shown in the following scheme:

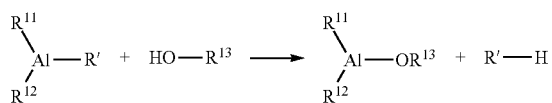

(in the scheme, each of R', $R^{11}$, $R^{12}$ and $R^{13}$ may be the same as or different from each other and represents an alkyl group)

or a method of allowing a dialkylaluminum halide and a metal alkoxide to react with each other in a molar ratio of 1/1 as shown in the following scheme:

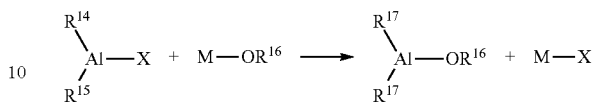

(in the scheme, $R^{14}$, $R^{15}$ and $R^{16}$ may be the same as or different from each other and represents an alkyl group; X in the dialkylaluminum halide: $R^{14}R^{15}AlX$ is fluorine, chlorine, bromine or iodine, with chlorine being especially preferably useful; and M in the metal alkoxide: $R^{16}OM$ is an alkali metal, and especially preferably lithium, sodium or potassium).

A by-product: R'—H is an inert alkane, and in the case where its boiling point is low, it volatilizes out the system in the reaction process, whereas in the case where the boiling point is high, though the compound remains in the solution, even when it remains in the system, it is inert against the sequent reactions. Also, a by-product: M-X is an alkali metal halide and precipitates, and therefore, it can be simply removed by means of filtration or decantation.

It is preferable to perform such a reaction in an inert hydrocarbon such as hexane, heptane, octane, decane, cyclohexane, benzene, toluene, xylene and the like. So far as the reaction proceeds, a reaction temperature is arbitrary. However, the reaction is performed preferably at 0° C. or higher, and more preferably at 20° C. or higher. A method in which the reaction is performed by heating at a boiling point of the used solvent or higher under refluxing of the solvent is favorable for completing the reaction. A reaction time is arbitrary. However, it would be better to perform the reaction for one hour or more, and more preferably 2 hours or more. After completion of the reaction, the reaction product may be cooled as it stands, thereby providing it in a solution form for a reaction with the chromium catalyst, or after removing the solvent, the reaction product may be isolated. However, the use of the solution as it stands is simple and easy, and hence, such is preferable.

Also, an alkylaluminum dialkoxide can be synthesized by a method of allowing a trialkylaluminum and an alcohol to react with each other (in a molar ratio of the trialkylaluminum to the alcohol of 1/2).

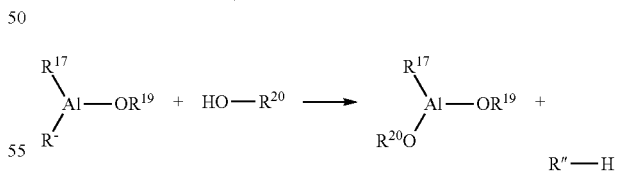

A synthesis method and physical and chemical properties of the alkylaluminum alkoxide are described in detail in T. Mole, et al., *Organoaluminum Compounds*, 3rd. ed., 1972, Elsevier, Chapter 8 and the like.

As to a supporting amount of the alkylaluminum alkoxide compound, a molar ratio of the alkylaluminum alkoxide compound to the chromium atom is from 0.1 to 20. For a fuel tank for automobiles, the molar ratio of the alkylaluminum alkoxide compound to the chromium atom is from 0.5 to 2.0, preferably from 0.7 to 1.8, and more preferably from 1.0 to 1.5. A suitable lower limit value is 0.7, and a more suitable lower limit value is 0.9.

By regulating this molar ratio to from 0.5 to 2.0, the ethylene polymerization activity is largely enhanced as compared with the case where the alkylaluminum alkoxide compound is not supported. Also, the durability is enhanced under a polymerization condition under which hydrogen is allowed to coexist. When this molar ratio is less than 0.5, even under a polymerization condition under which hydrogen is allowed to coexist, the effect to be brought by supporting an alkylaluminum alkoxide compound is not sufficiently revealed, and the ethylene polymerization activity and durability do not differ so much from those in the case where an alkylaluminum alkoxide compound is not supported. On the other hand, when this molar ratio exceeds 2.0, not only the ethylene polymerization activity is lowered as compared with that in the case where an alkylaluminum alkoxide compound is not supported, but the molecular weight distribution becomes broad, whereby though the durability is enhanced, the impact resistance is lowered. While the reason of this lowering of activity is not elucidated yet, it may be considered that the excessive alkylaluminum alkoxide compound is coupled with a chromium active site, thereby hindering the ethylene polymerization reaction.

A method of supporting the trialkylaluminum and/or alkylaluminum alkoxide compound is not particularly restricted so far as it is a method of bringing it into contact with a chromium catalyst after calcination activation in a liquid phase in an inert hydrocarbon. For example, a method in which the chromium catalyst after calcination activation is mixed with an inert hydrocarbon solvent such as propane, n-butane, isobutane, n-pentane, isopentane, hexane, heptane, octane, decane, cyclohexane, benzene, toluene, xylene and the like to form a slurry, to which is then added the trialkylaluminum and/or alkylaluminum alkoxide compound is preferable. The trialkylaluminum and/or alkylaluminum alkoxide compound to be added may be diluted with the foregoing inert hydrocarbon solvent, or may be added without being diluted. The solvent for dilution and the solvent for supporting may be the same or different from each other.

A use amount of the inert hydrocarbon solvent is preferably an amount sufficient for performing stirring at least in a slurry state at the time of preparing the catalyst. So far as the amount falls within such a range, the use amount of the solvent is not particularly restricted. For example, the solvent can be used in an amount of from 2 to 20 g per gram of the chromium catalyst after calcination activation.

In the present invention, on the occasion of treating the chromium catalyst with the trialkylaluminum and/or alkylaluminum alkoxide compound in the inert hydrocarbon solvent, the addition order of the trialkylaluminum and/or alkylaluminum alkoxide compound and the chromium catalyst to the solvent is arbitrary. Specifically, an operation of supporting reaction in which the chromium catalyst is suspended in the inert hydrocarbon solvent, the trialkylaluminum and/or alkylaluminum alkoxide compound is added, and the mixture is stirred is preferable.

A temperature of the supporting reaction is from 0 to 150° C., preferably from 10 to 100° C., and more preferably from 20 to 80° C.; and a time of the supporting reaction is from 5 minutes to 8 hours, preferably from 30 minutes to 6 hours, and more preferably from 1 to 4 hours. In the trialkylaluminum and/or alkylaluminum alkoxide compound reacts with chromium atoms in which a part thereof has been converted into a hexavalent chromium atom after calcination activation, and reduces it into a chromium atom with a lower valence. Such a phenomenon can be confirmed from the fact that the chromium catalyst after calcination activation assumes an orange color which is peculiar to a hexavalent chromium atom, whereas the chromium catalyst having been subjected to a supporting operation with the trialkylaluminum and/or alkylaluminum alkoxide compound assumes a green color or a bluish green color. That is, it may be presumed from this change of color of the chromium catalyst that at least a part of the hexavalent chromium atom is reduced to a trivalent or divalent chromium atom. In recent years, Terano, et al. support triethylaluminum on an activated chromium catalyst in a heptane solvent and then dry, thereby measuring a valence of the Cr atom by means of X-ray photoelectron spectroscopy (XPS), and observe the presence of not only a hexavalent chromium atom but divalent, trivalent and pentavalent chromium atoms (M. Terano, et al., *J. Mol. Catal. A: Chemical*, Volume 238, page 142 (2005)). However, it is said that a proportion of an actual polymerization active site in all of Cr atoms is from about 10% to 30% (M. P. McDaniel, et al., *J. Phys. Chem.*, Volume 95, page 3289 (1991)), and a conclusion on the valence of a chromium atom in the polymerization active site has not been obtained yet at the present time. Monoi, et al. advocate that a catalyst having a trialkylchromium complex supported on silica exhibits the same polymerization behavior as a Phillips catalyst (T. Monoi, et al., *Polym. J.*, Volume 35, page 608 (2003)); and Espelid, et al. advocate that by theoretically calculating activation energy of an ethylene insertion reaction in a model active site of a Phillips catalyst, the trivalent chromium atom is a valence of the active site (O. Espelid, et al., *J. Catal.*, Volume 195, page 125 (2000)).

In the case of jointly using a trialkylaluminum compound and an alkylaluminum alkoxide compound, in an inert hydrocarbon solvent, any of (i) a method in which the trialkylaluminum compound is first supported, and the alkylaluminum alkoxide compound is then supported, (ii) a method in which the alkylaluminum alkoxide compound is first supported, and the trialkylaluminum compound is then supported, or (iii) a method in which the trialkylaluminum compound and the alkylaluminum compound are previously mixed and then supported may be adopted. Though a use proportion of the trialkylaluminum compound and the alkylaluminum alkoxide compound is arbitrary, a molar ratio of the trialkylaluminum compound to the alkylaluminum alkoxide compound is from 0.01 to 100, and preferably from 0.1 to 10.

After stopping stirring to terminate the supporting operation, it is necessary to rapidly remove the solvent. This removal of the solvent is performed by means of drying under reduced pressure. On that occasion, filtration can also be performed in combination. In this drying under reduced pressure, drying is performed in such a manner that the trialkylaluminum and/or alkylaluminum alkoxide compound-supported chromium catalyst is obtained as a free flowing powder. When the catalyst is stored for a long period of time without being separated from the solvent, the catalyst is deteriorated with a lapse of time, and the ethylene polymerization activity is lowered. In addition to the above, since the molecular weight distribution becomes broad, though the durability is enhanced, the impact resistance is lowered, and a balance between the durability and the impact resistance is deteriorated. Hence, such is not preferable. In consequence, it is preferable to shorten a contact time with the solvent inclusive of a contact time with the solvent on the occasion of supporting reaction to the utmost and to rapidly separate and remove the solvent. There is not found any technical document describing such an effect that a polyethylene based resin in which polymerization activity and a balance between durability and impact resistance are enhanced is obtained by rapid separation and removal of a solvent, and it is one of the most important characteristic features of the present invention to rapidly remove the solvent after the supporting reaction.

While details of the reason why this effect are not elucidated yet, it may be considered that this effect is brought due to the matter that the reaction between the chromium active site and the trialkylaluminum and/or alkylaluminum alkoxide compound continues to proceed in the presence of a solvent, and as a result, chromium atoms in which a part thereof has been converted into a hexavalent chromium atom upon being calcination-activated in a non-reducing atmosphere are over-reduced into a divalent, monovalent or zero-valent chromium atom, whereby the catalyst structure is changed to one in which the ethylene polymerization reaction is hindered. However, it is difficult to specifically show the over-reduced state, for example, showing a specific valence or the like of the valence of chromium in an over-reduced state, or the like. Alternatively, it may also be considered that an alkylaluminum alkoxide species which will be produced by the reaction between the trialkylaluminum and/or alkylaluminum alkoxide compound and the hexavalent chromium atom (precisely chromium oxide chemically bonded to a silanol group on the silica surface) coordinates with the polymerization active site, thereby hindering the ethylene polymerization reaction. In short, a degree of over-reduction can be discriminated by a lowering of polymerization activity or a lowering of physical properties of the obtained polymer, mainly a lowering of impact strength. The impact strength as referred to herein is specifically the Charpy impact strength. That is, when the contact time with the solvent is too long, there is found a lowering of polymerization activity or a lowering of physical properties of the obtained polymer, mainly a lowering of impact strength. In consequence, the contact time with the solvent including a time of the solvent contact in the supporting reaction is made short as far as possible in such a manner that the polymerization activity or the impact strength of the obtained polymer is not substantially lowered, or even when it is lowered, a degree of the lowering is a minimum. That is, it is necessary that a supporting reaction time that is the contact time with the solvent is shortened as far as possible, and after supporting, the solvent is rapidly separated in such a manner that the over-reduction reaction does not proceed. A time required for after completion of the supporting reaction, separating the solvent and completing drying is preferably within 20 hours, more preferably within 15 hours, and especially preferably within 10 hours. A total time from the start of supporting until the solvent removal and the completion of drying is from 5 minutes to 28 hours, preferably from 30 minutes to 24 hours, and more preferably from 1 to 20 hours.

It is preferable that after completion of drying, the trialkylaluminum and/or alkylaluminum alkoxide compound-supported catalyst is in a free flowing, powdery state. As a yardstick from the standpoint of physical properties, it is preferable that a residual weight of the solvent is not more than $1/10$, preferably not more than $1/30$, and more preferably not more than $1/100$ of a weight obtained by multiplying a pore volume of the chromium catalyst by a density of the solvent. Incidentally, the pore volume as referred to herein is one by the BET method by nitrogen adsorption, and the residual weight of the solvent is one determined according to the following expression.

Residual weight of solvent=(Weight of dried trialkylaluminum and/or alkylaluminum alkoxide compound-supported chromium catalyst after drying)−{(Weight of trialkylaluminum and/or alkylaluminum alkoxide compound)+(Weight of chromium catalyst)}

Incidentally, in the case of using the trialkylaluminum and/or alkylaluminum alkoxide compound jointly with the chromium catalyst, there may be considered a method in which the chromium catalyst and the trialkylaluminum and/or alkylaluminum alkoxide compound are fed directly or separately into a reactor in the presence or absence of a dilution solvent; and a method in which the chromium catalyst and the trialkylaluminum and/or alkylaluminum alkoxide compound are once preliminarily mixed in or brought into contact with the solvent, and this mixed slurry is fed into a reactor. However, in all of these methods, since the continuous production is performed while separately feeding the chromium catalyst and the trialkylaluminum and/or alkylaluminum alkoxide compound into a reactor, unless the amounts and ratio of the chromium catalyst and the trialkylaluminum and/or alkylaluminum alkoxide compound to be continuously fed are precisely adjusted, the polymerization activity or the molecular weight of the obtained polyethylene based resin fluctuates, so that it is difficult to continuously produce molded articles of the same standards.

According to the method of the present invention, the trialkylaluminum and/or alkylaluminum alkoxide compound is previously supported on the chromium catalyst, and the catalyst in which a molar ration of the trialkylaluminum and/or alkylaluminum alkoxide compound to the chromium atom is always constant is fed into a reactor, so that molded articles of the same standards can be stably produced in a continuous manner. In consequence, the method of the present invention is an excellent method which is suitable for the continuous production of a polyethylene based resin with a fixed quality.

Furthermore, different from the method of the present invention using the catalyst obtained by rapidly separating and removing the solvent used in the supporting reaction, according to a method in which the chromium catalyst and the trialkylaluminum and/or alkylaluminum alkoxide compound are fed directly or separately into a reactor in the presence or absence of a dilution solvent; or a method in which the chromium catalyst and the trialkylaluminum and/or alkylaluminum alkoxide compound are once preliminarily mixed in or brought into contact with the solvent, the ethylene polymerization activity is lowered. In addition to the above, since the molecular weight distribution becomes broad, though the durability is enhanced, the impact resistance is lowered, and a balance between the durability and the impact resistance is deteriorated. Hence, such is not preferable.

A reaction occurred on the silica surface at the time of performing calcination activation using chromium acetate as the chromium compound (b) is shown below.

The silanol group on the silica surface reacts with chromium acetate, and the carboxyl group is burnt, thereby forming a chromic acid ester structure. In the ethylene polymerization by this calcination-activated chromium catalyst, the chromium acid ester structure is reduced with ethylene at the time of polymerization. A time required for this reduction is referred to as an induction time. According to the reduction reaction with ethylene, the chromium moiety illustrated in the reaction is converted into a polymerization active precursor structure, whereby the polymerization of ethylene is started.

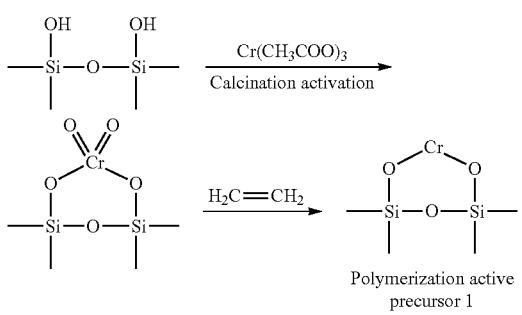

Polymerization active
precursor 1

On the other hand, by subjecting the chromium catalyst taking the calcination-activated chromic acid ester structure to an organoaluminum compound treatment, at least a part of the hexavalent chromium atom is reduced into a chromium atom with a lower valence. Such a phenomenon can be confirmed from the fact that the chromium catalyst after calcination activation assumes an orange color which is peculiar to a hexavalent chromium atom, whereas the chromium catalyst having been subjected to a supporting operation with, for example, a dialkylaluminum alkoxide compound assumes a green color or a bluish green color.

This reaction is illustrated below. Since this active site is already in a reduced state, the foregoing induction time is not required at the time of polyethylene polymerization.

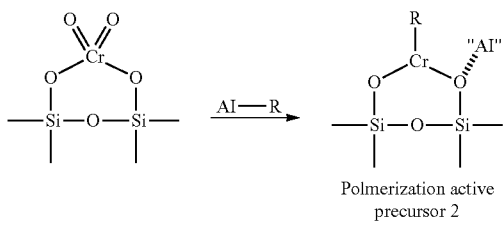

Polmerization active
precursor 2

Also, as a result of the diffuse reflection UV-VIS measurement, a peak of trivalence of chromium is not present before the organoaluminum compound treatment, whereas in the catalyst having an organoaluminum compound added thereto, a peak intensity of hexavalence is decreased, and a trivalent peak appears. From this result, it is also revealed that at least a part of the chromium atoms is reduced to a trivalent chromium atom by the organoaluminum compound.

When an amount of the organoaluminum compound added herein is from about 0.5 to 5 in terms of an Al/Cr molar ratio, since the amount of the organoaluminum compound is extremely small as compared with the amount of silica gel, it may be considered that the added organoaluminum compound is present concentrating on the surface of the silica particle and reacts.

Figure 5:
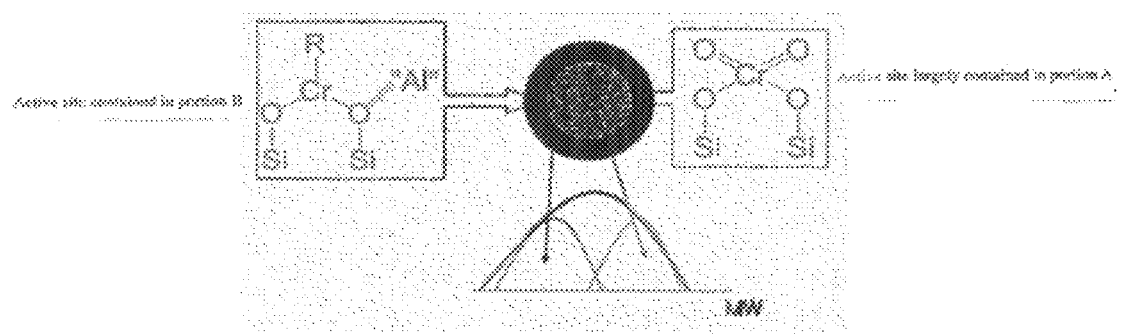
FIG. 5 is a schematic view explaining that a catalyst for ethylene polymerization of the present invention is a "pseudo binary catalyst".

This fact that the added organoaluminum compound is present concentrating on the surface is also supported from the result of EPMA. Namely, this organoaluminum compound-supported chromium catalyst has an inner portion (portion A) where the organoaluminum compound is not present and a surface portion (portion B) where at least a part of chromium atoms is reduced with the organoaluminum compound in one silica particle. In this meaning, this catalyst can be called a "pseudo binary catalyst" (see FIG. 5). In view of the fact that a large proportion of the aluminum atom is present on the carrier surface, its pseudo illustration is shown in FIG. 5.

At the time of introducing ethylene into this pseudo binary catalyst, even when polyethylene produced from the Cr active site having been previously reduced with the organoaluminum compound has a different characteristic feature from polyethylene produced from the Cr active site to be reduced by introducing ethylene, such is not strange at all.

In fact, as the amount of the organoaluminum compound to be added is increased, HLMFR (high-load melt flow rate, temperature: 190° C., load: 21.6 kg) of produced polyethylene becomes large. That is, it is ascertained that the average molecular weight becomes small. It may be considered that a polymer having a mountain of a low-molecular weight component as compared with a polymer produced from the portion A (inner portion) which does not react with the organoaluminum compound at all is possibly produced from the portion B (surface portion) in which at least a part thereof is reduced with the organoaluminum compound.

Namely, polyethylene having concurrently tow kinds of molecular weight distribution with different properties is prepared by using one catalyst. As a result, as compared with polyethylene obtained using a chromium catalyst to which an organoaluminum compound is not added, polyethylene having a broad molecular weight distribution is obtained using the catalyst of the present invention that is a pseudo binary catalyst.

Also, the following can be considered as one of characteristic features of this catalyst system.

That is, it is known that when a dialkyl alkoxide represented by diethylaluminum ethoxide is added to a chromium catalyst, copolymerizability of the catalyst is lowered as compared with that before the addition. When this matter is considered while referring to a thought of the "pseudo binary catalyst", it may be said that while the copolymerizability of the portion A does not change, the copolymerizability of the portion B is lowered, whereby the copolymerizability as a whole of the catalyst is lowered. Namely, as compared with a chromium catalyst not supported on aluminum, the dialkyl alkoxide-supported chromium catalyst produces polyethylene in which a large amount of a branching chain is not contained in a low-molecular weight component.

In general, as a defect of the chromium catalyst, it is known that branching is hardly incorporated into a high-molecular weight component as compared with the low-molecular weight component. However, by using the dialkyl alkoxide-supported chromium catalyst, it is possible to make the copolymerizability of the low-molecular weight component low, thereby increasing the branching number of a relatively high-molecular weight component occupying in the whole.

An electron probe micro analyzer (hereinafter abbreviated as EPMA) is an apparatus having the following principle.

An electron beam accelerated by reducing its diameter to not more than 1 μm is applied onto the surface of a sample, and characteristic X-rays emitted therefrom are measured by an X-ray spectrometer. The characteristic X-rays are an X ray emitted by transition of inner-shell electrons surrounding an atomic nucleus of each element and appear as some wavelengths (energies) inherent to the element. Accordingly, the kind of the element is grasped from the wavelength of the X-rays, and the content of the element is grasped from the intensity thereof.

Figure 6:
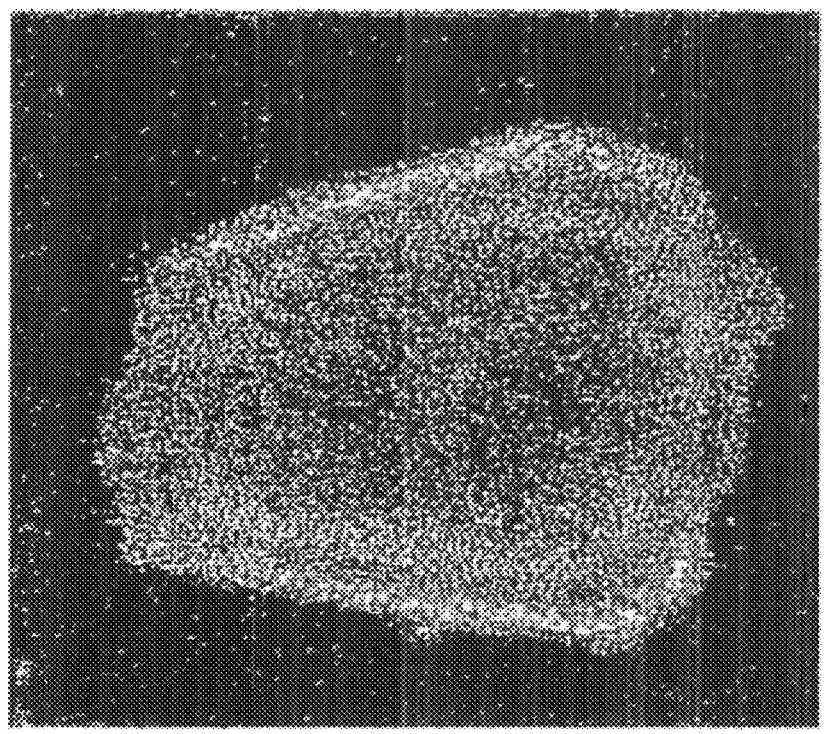
FIG. 6 is a photograph showing an example of an EPMA analysis according to a catalyst for ethylene polymerization of the present invention.

When the catalyst particle in the present invention is cut on a certain section, and an aluminum atom content on that section is measured using EPMA, in the particle surface portion of FIG. 6, the aluminum atom content is usually from 0.25 to 3.5% by weight, preferably from 0.25 to 2.5% by weight, and more preferably from 0.25 to 1.5% by weight. Also, in the particle inner portion of FIG. 6, the aluminum atom content is usually not more than 1% by weight, preferably not more than 1.5% by weight, and more preferably not more than 2.0% by weight as compared with the aluminum atom content in the particle surface portion of FIG. 6.

Also, when the catalyst particle in the present invention is cut on a certain section, and the aluminum atom content on that section is measured using EPMA, a catalyst containing a particle in which a thickness of a region where the content of the aluminum atom existent on the surface of the particle is 0.25% by weight is usually from 5 to 50 µm, preferably from 5 to 40 µm, and more preferably from 5 to 25 µm is desirable.

(6-2) Polymerization Method:

The polyethylene based resin of the present invention is obtained by means of homopolymerization of ethylene or copolymerization of ethylene and an α-olefin having from 3 to 12 carbon atoms, for example, propylene, 1-butene, 1-pentene, 1-hexene, 4-methyl-1-pentene, 1-octene or the like. Also, copolymerization with a diene in the case of aiming at modification is also possible. As the diene compound which is used at that time, there can be exemplified butadiene, 1,4-hexadiene, ethylidene norbornene, dicyclopentadiene and the like. Incidentally, though a content of the comonomer on the occasion of polymerization can be arbitrarily chosen, for example, in the case of copolymerization of ethylene and an α-olefin having from 3 to 12 carbon atoms, the content of the α-olefin in the ethylene α-olefin copolymer is from 0 to 40% by mole, and preferably from 0 to 30% by mole.

On the occasion of performing the production of a polyethylene based resin using the foregoing trialkylaluminum and/or alkylaluminum alkoxide compound-supported chromium catalyst, any method of a liquid phase polymerization method such as slurry polymerization and solution polymerization, a vapor phase polymerization method, or the like can be adopted. In particular, a slurry polymerization method is preferable, and any of a slurry polymerization method using a pipe loop type reactor or a slurry polymerization method using an autoclave type reactor can be adopted. Above all, a slurry polymerization method using a pipe loop type reactor is preferable (details of the pipe loop type reactor and the slurry polymerization using the same are described in *Polyethylene Gijutsu Dokuhon* (Polyethylene Technology Guidebook), page 148 (2001), edited and written by Kazuo Matsuura and Naotaka Mikami and published by Kogyo Chosakai Publishing Co., Ltd.,).

The liquid phase polymerization method is usually performed in a hydrocarbon solvent. As the hydrocarbon solvent, an inert hydrocarbon such as propane, n-butane, isobutane, n-pentane, isopentane, hexane, heptane, octane, decane, cyclohexane, benzene, toluene, xylene and the like is used alone or in admixture. As the vapor phase polymerization method, a usually known polymerization method using a fluidized bed, a stirring bed or the like in the copresence of an inert gas can be adopted. According to circumstances, a so-called condensing mode in which a medium of polymerization heat removal is allowed to coexist can also be adopted.

A polymerization temperature in the liquid phase polymerization method is generally from 0 to 300° C., practically from 20 to 200° C., preferably from 50 to 180° C., and more preferably from 70 to 150° C. Each of catalyst concentration and ethylene concentration in the reactor may be an arbitrary concentration sufficient for allowing the polymerization to proceed. For example, in the case of liquid phase polymerization, the catalyst concentration can be allowed to fall within the range of from about 0.0001 to about 5% by weight on the basis of the weight of the contents of the reactor. Similarly, in the case of liquid phase polymerization, the ethylene concentration can be allowed to fall within the range of from about 1% to about 10% on the basis of the weight of the contents of the reactor. Similarly, in the case of vapor phase polymerization, the ethylene concentration can be allowed to fall within the range of from 0.1 to 10 MPa as a total pressure.

In the present invention, in order to produce a desired polyethylene based resin for hollow plastic molded articles composed of various multi-layer laminates, which exhibit excellent moldability and durability, have an excellent balance between impact resistance and stiffness and exhibit excellent barrier properties, it is important to perform the polymerization while allowing hydrogen to coexist. Preferably, it would be better to perform the polymerization under a condition under which hydrogen and ethylene are allowed to have a specified ratio. In general, it is considered that hydrogen works as a so-called chain transfer agent for adjusting the molecular weight. By performing the polymerization under a condition under which hydrogen and ethylene are allowed to have a specified ratio, durability can be enhanced, and a balance between impact resistance and stiffness can be enhanced. Though details of reasons why such effects are obtained in the copresence of hydrogen are not elucidated yet, it may be considered that in the ethylene polymerization by the trialkylaluminum and/or alkylaluminum alkoxide compound-supported chromium catalyst, hydrogen works to introduce long chain branching with a proper length or number into a specified molecular weight region, or works to change the distribution of short chain branching by copolymerization of ethylene and an α-olefin.

In the case of a liquid phase polymerization method, the polymerization is performed under a condition under which a ratio of a hydrogen concentration (% by weight) in the liquid phase (abbreviated as Hc) to an ethylene concentration in the liquid phase (abbreviated as ETc) satisfies a relation of the following expression: $1.0 \times 10^{-4} \leq Hc/ETc \leq 7.0 \times 10^{-3}$, preferably $2.0 \times 10^{-4} \leq Hc/ETc \leq 6.0 \times 10^{-3}$, and more preferably $3.0 \times 10^{-4} \leq Hc/ETc \leq 5.0 \times 10^{-3}$.

Also, in the case of a vapor phase polymerization method, the polymerization is performed under a condition under which a ratio of a hydrogen partial pressure (MPa) in the reactor (abbreviated as Hp) to an ethylene partial pressure (MPa) in the reactor (abbreviated as ETp) satisfies a relation of $1.0 \times 10^{-4} \leq Hp/ETp \leq 1.0$, preferably $3.0 \times 10^{-4} \leq Hp/ETp \leq 8.0 \times 10^{-1}$, and more preferably $5.0 \times 10^{-4} \leq Hp/ETp \leq 5.0 \times 10^{-1}$.

A concentration ratio of hydrogen to be allowed to coexist with ethylene and ethylene can be easily adjusted by changing a concentration of each of hydrogen and ethylene. Since hydrogen works as a chain transfer agent as described above, in the case of changing Hc/ETc, in order to obtain a molded article of the same HLMFR, the polymerization temperature must also be changed. That is, in the case of increasing Hc/ETc, the polymerization temperature must be dropped, whereas in the case of decreasing Hc/ETc, the polymerization temperature must be elevated. However, since such varies depending upon an absolute value of the hydrogen concentration, it is not the case where in order to obtain a molded article of the same HLMFR, it is always necessary to change the polymerization temperature.

In the case where the value of Hc/ETc is less than the foregoing lower limit, the obtained polyethylene based resin is lowered in the durability at the same HLMFR, and in the case where Hc/ETc exceeds the foregoing upper limit, the obtained polyethylene based resin is lowered in the impact resistance at the same HLMFR. Incidentally, though a hydrogen pressure is not particularly restricted, in general, in the case of a liquid phase polymerization method, a hydrogen concentration in the liquid phase falls within the range of from $1.0\times10^{-4}$ to $1.1\times10^{-1}$% by weight, and preferably $1.0\times10^{-3}$ to $5.0\times10^{-2}$% by weight. Also, though a pressure of ethylene is not particularly restricted, in general, in the case of a liquid phase polymerization method, an ethylene concentration in the liquid phase falls within the range of from 1.0 to 10.0% by weight, and preferably from 3.0 to 8.0% by weight.

On the occasion of performing ethylene polymerization by the trialkylaluminum and/or alkylaluminum alkoxide compound-supported chromium catalyst by the method of the present invention, it is preferable to copolymerize an α-olefin as a comonomer. The copolymerization is performed by introducing, as the α-olefin, propylene, 1-butene, 1-hexene, 4-methyl-1-pentene, 1-octene or the like alone or in admixture of two or more kinds thereof into the reactor. It is suitable to use, as the comonomer, preferably 1-butene or 1-hexene, and more preferably 1-hexene. It is desirable that a content of the α-olefin in the obtained polyethylene based resin is not more than 15% by mole, and preferably not more than 10% by mole.

An ethylene based polymer having an HLMFR of from 0.1 to 1,000 g/10 min, and preferably from 0.5 to 500 g/10 min and a density of from 0.900 to 0.980 g/cm$^3$, and preferably from 0.920 to 0.970 g/cm$^3$ is obtained by the method of the present invention. Since the obtained ethylene based polymer exhibits high ESCR and impact resistance and has an excellent balance therebetween, in particular, it exhibits a large effect in blow molded products, and especially large blow molded products. HLMMFR of the ethylene based polymer for blow molded products is from 1 to 100 g/10 min, and in particular, HLMMFR of the ethylene based polymer for large blow molded products is from 1 to 15 g/10 min. The density of the ethylene based polymer for blow molded products is from 0.935 to 0.960 g/cm$^3$, and in particular, the density of the ethylene based polymer for large blow molded products is from 0.940 to 0.955 g/cm$^3$.

As the polymerization method, not only single-stage polymerization for producing an ethylene based polymer using one reactor can be performed, but for the purpose of enhancing the production amount or broadening the molecular weight distribution, multi-stage polymerization using at least two reactors connected to each other can be performed. In the case of multi-stage polymerization, two-stage polymerization in which two reactors are connected to each other, and a reaction mixture obtained by polymerization in a first-stage reactor is subsequently continuously fed into a second-stage reaction is preferable. Transportation from the first-stage reaction to the second-stage reactor is performed through a connecting pipe, and a polymerization reaction mixture from the second-stage reactor is continuously discharged.

The polyethylene based resin may be produced under the same condition in the first-stage reactor and the second-stage reactor, or the polyethylene based resin having the same HLMFR and density may be produced in the first-stage reactor and the second-stage reactor. However, in the case of broadening the molecular weight distribution, it is preferable to discriminate the molecular weight of the polyethylene based resin between the both reactors. Any of a production method in which a high-molecular weight component is produced in the first-stage reactor, and a low-molecular weight component is produced in the second-stage reactor; or a production method in which a low-molecular weight component is produced in the first-stage reactor, and a high-molecular weight component is produced in the second-stage reactor may be adopted. However, a method in which a high-molecular weight component is produced in the first-stage reactor, and a low-molecular weight component is produced in the second-stage reactor is more preferable in view of productivity because in the transfer from the first stage to the second stage, a middle flash tank of hydrogen is not required.

In the first stage, as to the polymerization of ethylene alone or copolymerization thereof with an α-olefin, if desired, the polymerization reaction is performed while adjusting the molecular weight by a weight ratio of the hydrogen concentration to the ethylene concentration (Hc/ETc), a polymerization temperature or both of them, or while adjusting the density by a weight ratio of the α-olefin concentration to the ethylene concentration.

In the second stage, hydrogen having flown into the reaction mixture from the first stage and the α-olefin having also flown thereinto are present. However, hydrogen and the α-olefin can be newly added, respectively, if desired. In consequence, in the second stage, the polymerization reaction can be performed, too while adjusting the molecular weight by a weight ratio of the hydrogen concentration to the ethylene concentration (Hc/ETc), a polymerization temperature or both of them, or while adjusting the density by a weight ratio of the α-olefin concentration to the ethylene concentration. As to the catalyst or the organometallic compound such as an organoaluminum compound, not only the polymerization reaction is continuously performed in the second stage using the catalyst which has flown thereinto from the first stage, but the catalyst or the organometallic compound such as an organoaluminum compound or both of them may be newly fed in the second stage.

In the case of performing the production by means of two-stage polymerization, as to a ratio of the high-molecular weight component and the low-molecular weight component, an amount of the high-molecular weight component is from 10 to 90 parts by weight, with an amount of the low-molecular weight component being from 90 to 10 parts by weight; the amount of the high-molecular weight component is preferably from 20 to 80 parts by weight, with the amount of the low-molecular weight component being from 80 to 20 parts by weight; and the amount of the high-molecular weight component is more preferably from 30 to 70 parts by weight, with the amount of the low-molecular weight component being from 70 to 30 parts by weight. Also, HLMFR of the high-molecular weight component is from 0.01 to 100 g/10 min, and preferably from 0.01 to 50 g/10 min, and HLMFR of the low-molecular weight component is from 10 to 1,000 g/10 min, and preferably from 10 to 500 g/10 min.

Though HLMFR of the ethylene based polymer obtained by means of two-stage polymerization is from 0.1 to 1,000 g/10 min, and preferably from 0.5 to 500 g/10 min, it is from 1 to 100 g/10 min for the resin for blow molded products, and in particular, from 1 to 15 g/10 min for the resin for large blow molded products. Though the density of the ethylene based polymer obtained by means of two-stage polymerization is from 0.900 to 0.980 g/cm$^3$, and preferably from 0.920 to 0.970 g/cm$^3$, it is from 0.935 to 0.960 g/cm$^3$ for the resin for blow molded products, and in particular, from 0.940 to 0.955 g/cm$^3$ for large blow molded products. It is preferable that the obtained ethylene based polymer is kneaded. Kneading can be performed using a single-screw or twin-screw extruder or a continuous type kneader. Also, the obtained ethylene based copolymer can be blow molded in the usual method.

It is preferable that the obtained polyethylene based resin is subsequently kneaded. Kneading is performed using a single-screw or twin-screw extruder or a continuous type kneader. The polyethylene based resin produced in the foregoing method may be used alone or in admixture of plural kinds thereof. After pelletizing by means of mechanical melt mixing using a pelletizer, a homogenizer or the like according to the usual method, molding is performed using a molding machine of every kind, whereby a desired molded article can be formed.

The polyethylene based resin of the present invention can be blended with, in addition to other olefin based polymer, a rubber or the like, known additives such as an antioxidant, a UV absorber, a light stability, a lubricant, an antistatic agent, an anti-fogging agent, a blocking preventive, a processing aid, a coloring pigment, a pearlescent pigment, a polarizing pearlescent pigment, a crosslinking agent, a blowing agent, a neutralization agent, a heat stabilizer, a crystal nucleating agent, an inorganic or organic filler, a flame retardant and the like in the usual method, if desired.

As an additive, for example, an antioxidant (a phenol base, a phosphorus base or a sulfur base), a lubricant, an antistatic agent, a light stabilizer, a UV absorber or the like can be properly used alone or in combination of two or more kinds thereof. As a filler, calcium carbonate, talk, a metal powder (aluminum, copper, iron, lead, etc.), silica stone, diatomaceous earth, alumina, gypsum, mica, clay, asbestos, graphite, carbon black, titanium oxide and the like can be used. In any case, the foregoing polyethylene based resin can be formed into a molding material by blending an additive of every kind, if desired and kneading the mixture by a kneading extruder, a Banbury mixer or the like.

On the occasion of obtaining the polyethylene based resin of the present invention using the trialkylaluminum and/or alkylaluminum alkoxide compound-supported chromium catalyst, a relation between a characteristic feature in the case of using each of the aluminum compounds and a polymerization condition for enhancing durability represented by creep resistance is hereunder described in detail.

In order to enhance the creep resistance of the polyethylene based resin, it is important to broaden the molecular weight distribution. That is, in order to enhance the creep resistance, though it is preferable to increase the molecular weight as far as possible, when the molecular weight is too high, molding of the resin cannot be achieved. Therefore, in order to impart flowing properties, polyethylene of a low-molecular weight region is also necessary, and as a result, it is necessary to broaden the molecular weight distribution (J. Scheirs and W. Kaminsky ed., *Metallocene-based Polyolefins*, Volume 2, page 365 (2000), John Wiley & Sons). In the case of obtaining a polyethylene based resin using a general chromium catalyst, for broadening the molecular weight distribution, it is a usual measure to drop the activation temperature and/or polymerization temperature (for example, *Polyethylene Gijutsu Dokuhon* (Polyethylene Technology Guidebook), page 134 (2001), edited and written by Kazuo Matsuura and Naotaka Mikami and published by Kogyo Chosakai Publishing Co., Ltd.). However, it is general that when the activation temperature and/or polymerization temperature is dropped, the activity is lowered, and at the same time, HLMFR is lowered (the above-mentioned *Polyethylene Gijutsu Dokuhon* (Polyethylene Technology Guidebook), page 134). Therefore, it is frequently impossible to set up a polymerization condition of economical production for the purpose of obtaining a polyethylene based resin with prescribed HLMFR.

In the case of a trialkylaluminum compound-supported catalyst, though there is no significant difference in the molecular weight distribution of the obtained polyethylene based resin as compared with the case where a trialkylaluminum is not supported (Mw/Mn=20 to 30), the creep resistance is largely enhanced at the same HLMF or same density. Though the reason for this has not been elucidated yet, it may be considered that the distribution of short chain branching derived from the comonomer is improved. That is, in general, in a chromium catalyst, short chain branching is not introduced into a high-molecular weight region (the above-mentioned *Polyethylene Gijutsu Dokuhon* (Polyethylene Technology Guidebook), pages 103 to 104). However, it may be considered that the short chain branching is introduced into a region with a higher molecular weight, too by the trialkylaluminum supporting, and as a result, the creep resistance is enhanced (it is well known that when short chain branching is introduced into a high-molecular weight region, too, the creep resistance is enhanced; the above-mentioned *Polyethylene Gijutsu Dokuhon* (Polyethylene Technology Guidebook), pages 156 to 157). By changing the activation temperature before the trialkylaluminum supporting, the molecular weight distribution can also be adjusted, and the creep resistance can be adjusted.

In order to more enhance a level of the creep resistance as compared with the case of a trialkylaluminum compound-supported chromium catalyst, it is necessary to much more broaden the molecular weight distribution (Mw/Mn>30). In the case of a general chromium catalyst, in view of the facts that when the activation temperature is lower than 450° C., the polymerization activity falls off sharply and that even when the polymerization temperature is dropped to broaden the molecular weight distribution, HLMFR is lower than the prescribed range, it is difficult to make it possible to practically produce a broad molecular weight distribution of this level. However, according to the dialkylaluminum alkoxide compound-supported chromium catalyst, this can be achieved. That is, it is the point that by supporting the dialkylaluminum alkoxide compound, as compared with the case of supporting the trialkylaluminum compound, the molecular weight is largely enhanced while keeping HLMR under the same polymerization condition at Mw/Mn of from 20 to 30 (the molecular weight distribution in the case of supporting the trialkylaluminum compound), and the molecular weight distribution can be much more broadened by dropping the polymerization temperature. As a result, not only Mw/Mn>30 can be achieved within the prescribed HLMFR range, but the polymerization activity can be kept on a practically producible level. Even in the case of supporting the dialkylaluminum alkoxide compound, it may be considered that there is an effect for enabling one to introduce short chain branching into a region with a higher molecular weight. Also, it may be considered that by more enhancing the molecular weight distribution, a much more enhancement of the creep resistance could be achieved.

[II] Hollow Plastic Molded Article:

Though the hollow plastic molded article of the present invention has a structure of at least one layer of the present polyethylene based resin, and preferably a multi-layer structure, it may be of a single-layer structure made of a polyethylene based resin.

In the case where the hollow plastic molded article is of a multi-layer structure, it is preferable that the hollow plastic molded article has a penetration reduction and blocking layer. For the penetration reduction and blocking layer, a barrier layer is usually used.

When the layer structure of the hollow plastic molded article of the present invention has two or more layers, it is preferable that each of an innermost layer and an outermost layer is made of the present polyethylene based resin.

The hollow plastic molded article of the present invention is preferably of a multi-layer structure containing a penetration reduction and blocking layer in which at least one barrier layer is allowed to exist, thereby reducing penetration of a volatile substance, and the barrier layer is constituted of a polar blocking polymer. For example, when a wall of a plastic fuel tank is constructed of a multi-layer structure, there is such an advantage that the barrier layer (when used singly, its moldability and mechanical strength are not sufficient) can be immobilized between two layers each made of the present polyethylene based resin. As a result, in particular, during co-extrusion blow molding, moldability of a material having two or more layers made of the present polyethylene based resin is influenced mainly by improved moldability of the present polyethylene based resin and improved. Furthermore, since the improved performance of the present polyethylene based resin gives an extremely important influence to the mechanical strength of the material, it is possible to conspicuously increase the strength of the hollow plastic molded article of the present invention.

Also, in the hollow plastic molded article of the present invention, a base layer may be coated on the surface of the present polyethylene based resin layer by means of a treatment such as fluorination, surface coating, plasma polymerization and the like.

An especially preferred embodiment of the hollow plastic molded article according to the present invention is a structure made of six layers of four different materials including the following layers from the inside to the outside.

That is, the structure includes a present polyethylene based resin layer, an adhesive layer, a barrier layer, an adhesive layer, a regenerated material layer and a present polyethylene based resin layer.

Configurations of the respective layers and layer configuration ratios in the foregoing embodiment are hereunder described in detail.

(1) Layer Configurations of Hollow Plastic Molded Article:

1. Outermost Layer:

A resin (A) constituting an outermost layer of the hollow plastic molded article of the present invention is the present polyethylene based resin satisfying the foregoing prescribed requirements, which is produced by performing polymerization using a trialkylaluminum and/or alkylaluminum alkoxide compound-supported chromium catalyst while allowing hydrogen to coexist.

2. Innermost Layer:

A resin (B) constituting an innermost layer of the hollow plastic molded article of the present invention is the present polyethylene based resin satisfying the foregoing prescribed requirements, which is produced by performing polymerization using a trialkylaluminum and/or alkylaluminum alkoxide compound-supported chromium catalyst while allowing hydrogen to coexist, and the resin (B) may be the same as or different from the foregoing resin (A).

3. Barrier Layer:

A resin (C) constituting a barrier layer of the hollow plastic molded article of the present invention is selected among an ethylene vinyl alcohol resin, a polyamide resin, a polyethylene terephthalate resin, a polybutylene terephthalate resin and the like, and in particular, the resin (C) is preferably made of an ethylene vinyl alcohol resin. The ethylene vinyl alcohol resin has a degree of saponification of 93% or more, and desirably 96% or more, and more preferably has an ethylene content of from 25 to 50% by mole.

4. Adhesive Layer:

A resin (D) constituting an adhesive layer of the hollow plastic molded article of the present invention is selected among high-density polyethylene graft-modified with an unsaturated carboxylic acid or a derivative thereof, low-density polyethylene, linear low-density polyethylene and the like, and in particular, the resin (D) is preferably made of high-density polyethylene graft-modified with an unsaturated carboxylic acid or a derivative thereof.

A content of the unsaturated carboxylic acid or its derivative is from 0.01 to 5% by weight, preferably from 0.01 to 3% by weight, and more preferably from 0.01 to 1% by weight. When the graft modification amount is less than 0.01% by weight, a sufficient adhesive performance is not revealed, whereas when it exceeds 5% by weight, the unsaturated carboxylic acid which does not contribute to adhesiveness adversely affects the adhesiveness.

5. Regenerated Material Layer:

A resin forming a regenerated material layer of the hollow plastic molded article of the present invention is a composition containing the polyethylene based resin (A) forming the outermost layer, the polyethylene based resin (B) forming the innermost layer, the resin (C) forming the barrier layer and the resin (D) forming the adhesive layer. A blending amount of each of the components is desirably from 10 to 30% by weight for the component (A), from 30 to 50% by weight for the component (B), from 1 to 15% by weight for the component (C) and from 1 to 15% by mass for the component (D), respectively.

For the respective components (A) to (D), brand-new articles can be used, or recycled articles obtained by recovering unnecessary portions such as scraps or burrs of multilayer laminates including the respective layers made of the components (A) to (D) can be used as raw materials of the respective components. For example, regrind resins obtained by pulverizing a spent hollow plastic molded article which has been once molded and used (fuel tank product for automobiles, etc.) are useful. In the case of using a recycled article, the whole amount of all of the components (A) to (D) can be supplied from the recycled articles, or mixtures thereof with brand-new articles can also be used.

In the case of using a molding burr generated during the preparation of a multi-layer laminate or an unused parison as the recycled material, since there may be the case where compatibility among the respective components is lowered, a compatibilizing agent or a resin constituting the adhesive layer may be further mixed.

6. Layer Configuration Ratios of Hollow Plastic Molded Article:

A thickness constitution of each of the layers of the hollow plastic molded article of the present invention is from 10 to 30% for the outermost layer, from 20 to 50% for the innermost layer, from 1 to 15% for the barrier layer, from 1 to 15% for the adhesive layer and from 30 to 60% for the regenerated material layer, respectively in terms of a thickness ratio (provided that a total sum of the thickness configuration ratios of all of the layers is 100%).

A layer configuration ratio of the outermost layer is from 10 to 30%, preferably from 10 to 25%, and more preferably from 10 to 20%. When the layer configuration ratio of the outermost layer is less than 10%, impact resistance is insufficient, whereas when it exceeds, molding stability of the hollow plastic molded article is impaired.

A layer configuration ratio of the innermost layer is from 20 to 50%, preferably from 35 to 50%, and more preferably from 40 to 50%. When the layer configuration ratio of the outermost layer is less than 20%, an insufficiency of stiffness of the hollow plastic molded article is visualized, whereas when it exceeds 50%, molding stability of the hollow plastic molded article is impaired.

A layer configuration ratio of the barrier layer is from 1 to 15%, preferably from 1 to 10%, and more preferably from 1 to 5%. When the layer configuration ratio of the barrier layer is less than 1%, a barrier performance is unsatisfactory, whereas when it exceeds 15%, an impact performance is insufficient.

A layer configuration ratio of the adhesive layer is from 1 to 15%, preferably from 1 to 10%, and more preferably from 1 to 5%. When the layer configuration ratio of the adhesive layer is less than 1%, an adhesive performance is unsatisfactory, whereas when it exceeds 15%, an insufficiency of stiffness of the hollow plastic molded article is visualized.

A layer configuration ratio of the regenerated material layer is from 30 to 60%, preferably from 35 to 50%, and more preferably from 35 to 45%. When the layer configuration ratio of the regenerated material layer is less than 30%, molding stability of the hollow plastic molded article is impaired, whereas when it exceeds 60%, an impact performance is insufficient.

The hollow plastic molded article of the present invention is preferably a hollow plastic molded article made of six layers of four different materials, in which the outermost layer, the regenerated material layer, the adhesive layer, the barrier layer, the adhesive layer and the innermost layer are laminated in this order from the outside. By sandwiching the barrier layer between the adhesive layers, high-degree barrier properties are exhibited. By disposing the regenerated material layer between the outmost layer and the adhesive layer, effects of a reduction in costs due to reduction of raw material costs and maintenance of stiffness of the hollow plastic molded article are exhibited.

(2) Production of Hollow Plastic Molded Article and Product or Use:

A production method of the hollow plastic molded article of the present invention is not particularly restricted, and the hollow plastic molded article can be produced by am extrusion blow molding method using a conventionally known multi-layer hollow molding machine. For example, after heat melting a constitutional resin of each of the layers by plural extruders, a molten parison is extruded by a multi-layer die, this parison is subsequently sandwiched by this die, and air is blown into the inner part of the parison, thereby producing a multi-layer hollow plastic molded article.

Furthermore, if desired, known additives such as an antistatic agent, an antioxidant, a neutralizing agent, a lubricant, a blocking preventive, an anti-fogging agent, an inorganic or organic pigment, a filler, an inorganic filler, a UV preventive, a dispersant, a weathering agent, a crosslinking agent, a blowing agent, a flame retardant and the like can be added to the hollow plastic molded article of the present invention within the range where the object is not impaired.

Also, specifically, the hollow plastic molded article of the present invention is provided for, as a product, products including a tank such as a fuel tank, a kerosene can, a drum can, a container for chemicals, a container for agrochemicals, a container for solvents, a plastic bottle of every kind and the like, and in particular, a fuel tank for automobiles. Alternatively, examples of the use of the hollow plastic molded article of the present invention include a tank such as fuel tanks, a kerosene can, a drum can, a container for chemicals, a container for agrochemicals. a container for solvents, a plastic bottle of every kind and the like. In particular, it is the most preferable to use the hollow plastic molded article of the present invention as a fuel tank for automobiles.

EXAMPLES

The present invention is hereunder described in more detail with reference to the following Examples and Comparative Examples, thereby proving excellence of the present invention and superiority in the configurations of the present invention. However, it should not be construed that the present invention is limited by these Examples.

(1) Various Measurement Methods:

Measurement methods used in the Examples and Comparative Examples are as follows.

1. Quantification of Hydrogen Concentration and Ethylene Concentration in a Liquid Phase in an Autoclave:

A hydrogen concentration and an ethylene concentration at a polymerization temperature, a hydrogen partial pressure and an ethylene partial pressure under a condition of each of the Examples and Comparative Examples were analyzed and quantified by means of gas chromatography in advance in a state where a catalyst was not introduced in conformity with JIS K-2301 (2004 version). A small amount of a solution within an autoclave was discharged and vaporized, and a hydrogen concentration and an ethylene concentration were quantified using a gas chromatograph GC-14A, manufactured by Shimadzu Corporation by a heat conductivity detector under an analysis condition of Column Combination B described in Table 2 on page 10 of the above-mentioned JIS.

2. Evaluation of Physical Properties of Polyethylene Based Resin Obtained by Autoclave Polymerization:

(2-a) Polymer Pre-Treatment for Measurement of Physical Properties:

0.2% by weight of "IRGANOX B225", manufactured by Ciba Specialty Chemicals, that is a blend of an antioxidant and a phosphorus based stabilizer, was added as an additive, and the mixture was kneaded and pelletized by a single-screw extruder.

(2-b) High-Load Melt Flow Rate (HLMFR):

A measured value at a test temperature of 190° C. under a nominal load of 21.60 kg in conformity with Condition G in Table 1 of Annex A of JIS K-7210 (2004 version) was shown as HLMFR.

(2-c) Density:

A density was measured in conformity with JIS K-7112 (2004 version).

(2-d) Molecular Weight Dispersion (Mw/Mn):

A produced ethylene based polymer was subjected to gel permeation chromatography (GPC) under the following condition, thereby determining a number average molecular weight (Mn) and a weight average molecular weight (Mw), and a molecular weight distribution (Mw/Mn) was calculated.

[Measurement Condition of Gel Permeation Chromatography]

Apparatus: 150C Model, manufactured by Waters Corporation

Column: Shodex-HT806M

Solvent: 1,2,4-Trichlorobenzene

Temperature: 135° C.

Universal Assessment Using a Monodispersed Polystyrene Fraction

As to the molecular weight distribution shown in terms of a ratio of Mw to Mn (Mw/Mn) (the larger the Mw/Mn, the broader the molecular weight distribution is), an n-alkane and data of classified linear polyethylene with Mw/Mn≤1.2 were applied to the formula of molecular weight and detector sensibility described in "Size Exclusion Chromatography (High Performance Liquid Chromatography for Polymers)" (page 98, written by Sadao Mori, Kyoritsu Shuppan Co., Ltd.), and a sensitivity of a molecular weight M expressed by the following expression was determined, thereby correcting actually measured values of sample.

$$\text{Sensitivity of molecular weight } M = a + b/M$$

Here, each of a and b represents a constant, with a=1.032 and b=189.2.

(2-e) Strain Hardening Parameter (λmax) of Elongational Viscosity:

A capillary rheometer, manufactured by Intesco Co., Ltd. was used, a capillary of 3 mmφ×15 mmL was used at a temperature of 190° C., and a specimen was prepared at a piston rate of 20 mm/min.

An elongational viscosity was measured using a melten rheometer, manufactured by Toyo Seiki Seisaku-Sho, Ltd. while setting a pre-heating time to 15 minutes at a temperature of 170° C. and at a strain rate of 0.1/s. In the case of generating strain hardening, a viscosity growth curve obtained in a graph of double-logarithmic axes of a time (t) and an elongation viscosity (η) includes a linear part and a non-linear part. A ratio of a maximum elongation viscosity ηE, λmax in the non-linear part and an estimated viscosity ηL, λmax in the linear part at a time of giving ηE, λmax was designated as λmax and defined as an index expressing a size of non-linear properties in the elongation viscosity.

$$\lambda max = \eta E, \zeta max / \eta L, \lambda max$$

Incidentally, FIG. 1 schematically shows a measurement method of this index.

(2-f) Creep Resistance (Rupture Time):

After compression molding a sheet having a thickness of 5.9 mm in conformity with JIS K-6992-2 (2004 version), a specimen having shape and dimensions of Section: "Nominal 50" shown in FIG. 1 of Annex 5 (Regulations) of JIS K-6774 (2004 version) was prepared and subjected to a full notch tensile creep test (FNCT) in pure water at 80° C. A tensile load was set to 88N, 98N and 108N, respectively, and the test point was defined to be two points at each load. From plots of six points between a rupture time and a nominal stress in the obtained double-logarithmic scale, a rupture time at a nominal stress of 6 MPa was defined as an index of the creep resistance by means of a method of least squares.

(2-g) Charpy Impact Strength:

A specimen of Type 1 was prepared in conformity with JIS K-7111 (2004 version), and a Charpy impact strength was measured in dry ice/alcohol at −40° C. while setting an impact direction edgewise and a notch type to Type A (0.25 mm).

(2-h) Bending Stiffness:

A cantilever bending stress was measured at a rate of 60° C./min using a stiffness meter, manufactured by Toyo Seiki Seisaku-Sho, Ltd. under a condition of a span interval of 30 mm, a grasping part of 30 mm and a total bending moment of 6 kgf·cm in conformity with JIS K-7106 (2004 version).

Incidentally, as to the specimen, after melting pellets by a heat compression molding machine at a temperature of 160° C., the temperature was dropped at a rate of 25° C./min, thereby molding a sheet having a thickness of 2 mm. This sheet was conditioned in a room at a temperature of 23° C. for 48 hours and then punched using a dumbbell knife so as to have a size of 85 mm in length and 15 mm in width, thereby preparing the specimen.

3. Evaluation of Physical Properties of Hollow Plastic Molded Article Obtained Using a Pipe Loop Type Reactor:

(3-a) Polymer Pre-Treatment for Measurement of Physical Properties:

0.05% by weight of ADEKA STUB AO-60 and 0.15% by weight of ADEKA STUB 2112, each of which is manufactured by Adeka Corporation, were respectively added as additives, and the mixture was kneaded and pelletized by a single-screw extruder.

(3-b)
(i) Drop Impact Properties:

A fuel tank for automobiles having an antifreeze solution fully injected therein was cooled to −40° C. and vertically dropped on a concrete surface, thereby deciding the presence or absence of liquid leakage.

⊙: Even when dropped from a height of 9 m, liquid leakage did not occur.

○: When dropped from a height of 6 m, liquid leakage did not occur, whereas when dropped from a height of 9 mm, the tank was broken to cause liquid leakage.

Δ: When dropped from a height of 3 m, liquid leakage did not occur, whereas when dropped from a height of 6 mm, the tank was broken to cause liquid leakage.

X: When dropped from a height of 3 mm, the tank was broken to cause liquid leakage.

(ii) Internal Pressure Deformation Test:

A plastic tank was subjected to an internal pressure deformation test at an internal pressure of 0.05 MPa and at 60° C. After a lapse of 500 hours, the pressure was removed, and the temperature was returned to ordinary temperature. Then, the case where deformation was conspicuously large is defined as "×", and the case where deformation was not large is defined as "○".

(iii) Hear Resistance/Pressure Resistance Test:

A plastic tank was subjected to an internal pressure/heat resistance test at an internal pressure of 0.05 MPa and at 60° C. After a lapse of 1,000 hours, the case where a hole, a crack or the like was not produced is defined as "○", and the case where a hole, a crack or the like was produced is defined as "×".

(3-c) Moldability:

On the occasion of hollow molding of a fuel tank for automobiles, drawdown resistance and thickness homogeneity of a parison were evaluated. The case where the both properties were favorable is defined as "○"; the case where failure in molding was generated is defined as "×"; and the case where failure in molding was not generated, but the thickness distribution was slightly large is defined as "Δ".

(3-d) Gasoline Barrier Properties:

A synergy regular gasoline was charged in a fuel tank and conditioned at 40° C. for one week; the gasoline was replaced; a weight was measured; and the amount reduced with time was measured, thereby undergoing decision under the following criteria.

⊙: Less than 0.01 g/day
X: 0.01 g/day or more (2) Used Resin:

The following Resins 1 to 4 were processed by a co-extrusion blow molding machine NB 150, manufactured by The Japan Steel Works, Ltd., thereby molding a tank for automobiles having a structure made of six layers of four different materials. The order of the respective layers was chosen from the inside to the outside as follows.

Innermost layer (the present polyethylene based resin)
Adhesive layer (MAPE)
Barrier layer (EVOH)
Adhesive layer (MAPE)
Regenerated material layer
Outermost layer (the present polyethylene based layer)

An empty weight of the fuel tank was 8 kg.

(III) Analysis of Catalyst Structure:
(1) Catalyst Analysis by Electron Probe Micro Analyzer (EPMA):

The catalyst analysis was performed by an electron probe micro analyzer in the following manner, and the results thereof are shown in FIG. 6.

Incidentally, the catalyst analysis by the electron probe micro analyzer was performed with respect to three catalysts shown in the following preparation method.

A sample of each of the foregoing three kinds of catalysts was subjected resin embedding and then polished using an abrasive paper (grit: #1500 to #4000). Thereafter, the resultant was polished with a diamond suspension liquid (grain size: 1 μm). After vapor deposition with Au (about 300 angstroms), a mapping analysis was performed using EPMA-1600, manufactured by Shimadzu Corporation.

Mapping Condition:
Accelerating voltage (ACC. V): 15 kV
Beam current: 50 nA
Beam diameter: 1 μm
Measurement time: 50 msec
Measurement area: 512*512 μm
Analyzing crystal:
Al/RAP (acid rubidium phthalate) $C_6H_4(COOH)(COORb)$
Si/PET (pentaerythritol) $C(CH_2OH)_4$
Cr/LiF (lithium fluoride)

As to the above-used catalysts, an ICP emission analysis was performed, and a calibration curve of a relation between an aluminum content and an intensity by an electron probe micro analyzer was prepared on the basis of the obtained results. A weight percent concentration of aluminum in FIG. 6 is shown on the basis of the results.

(2) Catalyst Analysis by Diffuse Reflection UV-VIS:
(i) Sampling Method and Environment:

A sample was charged in a closed UV cell having an optical path length of 5 mm within a glove box under a nitrogen atmosphere, and a diffuse reflection UV-VIS spectrum was then measured. Barium sulfate of a first grade, manufactured by Wako Pure Chemical Industries, Ltd., was used as a reference.

(ii) Measurement Method and Measurement Condition:

A diffuse reflection unit-equipped UV-VIS meter (UV2400), manufactured by Shimadzu Corporation was used as a measurement apparatus, and an end-on photomultiplier was used as a detector. An absorption spectrum with a wavelength of from 190 nm to 800 nm was captured at a low scanning rate while setting a slit width to 5 nm. For the preparation of a baseline, barium sulfate was used.

Figure 7:
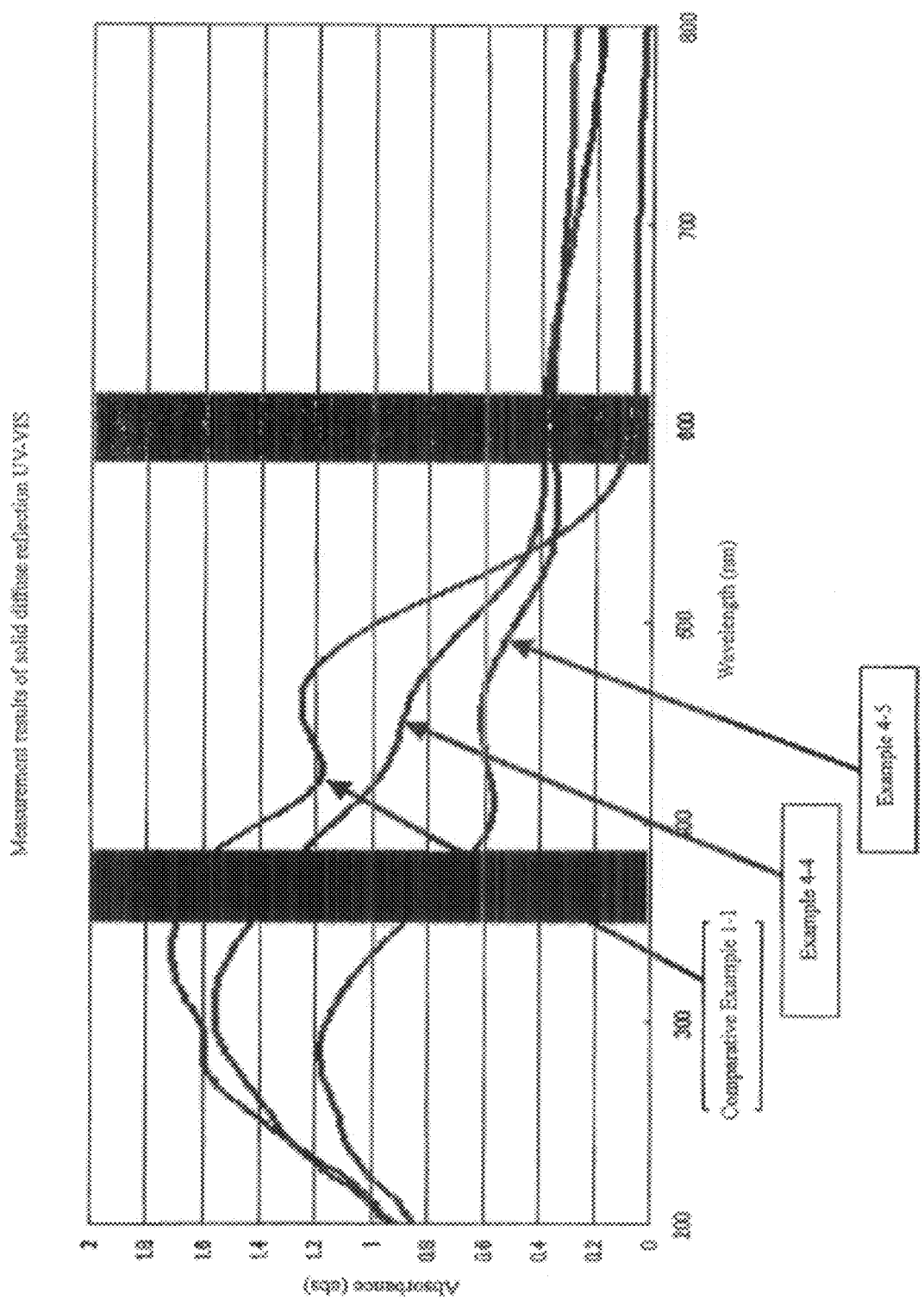
FIG. 7 is a diagram showing an example of a catalyst analysis of diffuse reflection UV-VIS according to a catalyst for ethylene polymerization of the present invention.

It is noted from FIG. 7 that when the activation temperature is 500° C., as the amount of the organoaluminum compound to be added increases in terms of an Al/Cr molar ratio, the absorption in the vicinity of 370 nm which is peculiar to a hexavalent Cr atom becomes small.

Also, following this, the absorption in the vicinity of 600 nm which is peculiar to a trivalent Cr atom becomes large. It is noted from this fact that the reduction reaction of the Cr atom occurs by the addition of an organoaluminum reagent. On the basis of the results of EPMA that distribution of aluminum is concentrated on the surface rather than in the inner part of the carrier, it may be said that in one carrier particle, in comparison between the inner part and the outer part of the carrier, a large proportion of trivalent chromium is distributed in the outer part of the carrier was used.

1. Polyethylene Based Resin:
The present polyethylene based resin produced by performing using a trialkylaluminum and/or alkylaluminum alkoxide compound-supported chromium catalyst while allowing hydrogen to coexist.

2. Adhesive Resin (MAPE):
Maleic anhydride-modified polyethylene having 0.1% by weight of maleic anhydride grafted thereon, manufactured by Japan Polyethylene Corporation was used.

3. Barrier Resin (EVOH):
An ethylene vinyl alcohol resin EVAL, manufactured by Kuraray Co., Ltd. was used.

4. Regenerated Material Layer Resin:
A regrind resin prepared by in a layer configuration described in Example 1-14(1), using the same resin as the resin constituting the innermost layer as a regenerated material layer resin at the time of starting an experiment, blow molding a fuel tank for automobiles made of six layers of four different materials and pulverizing the fuel tank for automobiles was used. Specifically, for the regenerated material layer resin in each of Example 14 and Comparative Examples 1-7 to 1-8, a regrind resin prepared by molding a fuel tank for automobiles having the following layer configuration and pulverizing it was used.

Outermost layer: Present polyethylene based resin (layer configuration ratio:
Regenerated material layer: Present polyethylene based resin (layer configuration ratio: 40%)
Adhesive outer layer: MAPE (layer configuration ratio: 3%)
Barrier layer: EVOH (layer configuration ratio: 3%)
Adhesive inner layer: MAPE (layer configuration ratio: 3%)
Innermost layer: Present polyethylene based resin (layer configuration ratio: 40%)

(3) Production and Evaluation of Polyethylene Based Resin by Autoclave:

Example 1-1

(1) Preparation of Chromium Catalyst 15 g of Catalyst-1 (a catalyst having chromium acetate supported on silica) having a chromium atom supporting amount of 1.1% by weight, a specific surface area of 500 m$^2$/g and a pore volume of 1.5 cm$^3$/g was charged in a perforated grating plate-equipped quartz glass tube having a tube diameter of 5 cm; the quartz glass tube was set in a cylindrical electric furnace for calcination; and the catalyst was fluidized with air having passed through a molecular sieve and then subjected to calcination activation at a linear velocity of 6 cm/s at 500° C. for 18 hours. There was thus obtained a chromium catalyst assuming an orange color demonstrating that it contained a hexavalent chromium atom.

(2) Trialkylaluminum Compound-Supported Chromium Catalyst

In a 100-mL flask which had been previously purged with nitrogen, 2 g of the chromium catalyst obtained in the foregoing (1), to which was then added 30 mL of hexane which had been purified by distillation, thereby preparing a slurry. 4.2 mL of a 0.1 moles/L hexane solution of tri-n-butylaluminum, manufactured by Tosoh Finechem Corporation (hereinafter also referred to as a "tri-n-butylaluminum solution") (Al/Cr molar ratio=1) was added, and the mixture was stirred at 40° C. for 2 hours. Immediately after completion of stirring, the solvent was removed under reduced pressure over 30 minutes, thereby obtaining a powdery, free flowing trialkylaluminum compound-supported chromium catalyst. The catalyst assumes a green color demonstrating that hexavalent chromium is reduced.

(3) Polymerization

In a 2.0-L autoclave which had been thoroughly purged with nitrogen, 50 mg of the trialkylaluminum compound-supported chromium catalyst obtained in the foregoing (2) and 0.8 L of isobutane were charged, and the inner temperature was elevated to 100° C. After introducing hydrogen at 0.1 MPa, 4.0 g of 1-hexene was introduced under pressure with ethylene, and polymerization was performed while keeping an ethylene partial pressure at 1.4 MPa (Hc/ETc=8.1×10$^{-4}$) so as to achieve catalyst productivity of 3,000 g-polymer/g-catalyst. Subsequently, the content gas was released outside the system, thereby terminating the polymerization. Polymerization activity per gram of the catalyst and per hour of the polymerization time was 4,100 g-polymer/g-catalyst/h. Measurement results of physical properties (HLMFR, density, molecular weight (Mn and Mw), molecular weight distribution (Mw/Mn), λmax, rupture time, Charpy impact strength and bending stiffness) are shown in Tables 1 and 2.

Example 1-2

A trialkylaluminum compound-supported chromium catalyst was prepared, and polymerization was performed in exactly the same manner as in Example 1-1, except that 4.2 mL of a 0.1 moles/L hexane solution of triethylaluminum, manufactured by Tosoh Finechem Corporation (Al/Cr molar ratio=1) was added in place of the tri-n-butylaluminum solution. Polymerization activity was 3,700 g-polymer/g-catalyst/h. Measurement results of physical properties are shown in Tables 1 and 2.

Example 1-3

A trialkylaluminum compound-supported chromium catalyst was prepared, and polymerization was performed in exactly the same manner as in Example 1-1, except that 4.2 mL of a 0.1 moles/L hexane solution of triisobutylaluminum, manufactured by Tosoh Finechem Corporation (Al/Cr molar ratio=1) was added in place of the tri-n-butylaluminum solution. Polymerization activity was 4,000 g-polymer/g-catalyst/h. Measurement results of physical properties are shown in Tables 1 and 2.

Example 1-4

A trialkylaluminum compound-supported chromium catalyst was prepared, and polymerization was performed in exactly the same manner as in Example 1-1, except that the activation temperature of the chromium catalyst was changed from 500° C. to 450° C.; and that the addition amount of 1-hexene was changed from 4.0 g to 6.0 g. Polymerization activity was 3,100 g-polymer/g-catalyst/h. Measurement results of physical properties are shown in Tables 1 and 2.

Example 1-5

A trialkylaluminum compound-supported chromium catalyst was prepared, and polymerization was performed in exactly the same manner as in Example 1-1, except that the activation temperature of the chromium catalyst was changed from 500° C. to 550° C.; and that the addition amount of 1-hexene was changed from 4.0 g to 3.0 g. Polymerization activity was 4,700 g-polymer/g-catalyst/h. Measurement results of physical properties are shown in Tables 1 and 2.

Example 1-6

A trialkylaluminum compound-supported chromium catalyst was prepared, and polymerization was performed in exactly the same manner as in Example 1-1, except that the addition amount of the tri-n-butylaluminum solution was changed from 4.2 mL to 6.3 mL to control the Al/Cr molar ratio to 1.5. Polymerization activity was 4,100 g-polymer/g-catalyst/h. Measurement results of physical properties are shown in Tables 1 and 2.

Example 1-7

A trialkylaluminum compound-supported chromium catalyst was prepared, and polymerization was performed in exactly the same manner as in Example 1-1, except that the hydrogen partial pressure was from 0.1 MPa to 0.4 MPa to control Hc/ETc to 3.3×10$^{-3}$. Polymerization activity was 4,000 g-polymer/g-catalyst/h. Measurement results of physical properties are shown in Tables 1 and 2.

Example 1-8

A trialkylaluminum compound-supported chromium catalyst was prepared, and polymerization was performed in exactly the same manner as in Example 1-1, except that the addition amount of 1-hexene was changed from 4.0 g to 5.0 g. Polymerization activity was 4,200 g-polymer/g-catalyst/h. Measurement results of physical properties are shown in Tables 1 and 2.

Example 1-9

A trialkylaluminum compound-supported chromium catalyst was prepared, and polymerization was performed in exactly the same manner as in Example 1-1, except that the addition amount of 1-hexene was changed from 4.0 g to 6.5 g; and that the polymerization temperature was changed from 100° C. to 99° C. Polymerization activity was 4,400 g-polymer/g-catalyst/h. Measurement results of physical properties are shown in Tables 1 and 2.

Example 1-10

A trialkylaluminum compound-supported chromium catalyst was prepared, and polymerization was performed in exactly the same manner as in Example 1-1, except that the activation temperature of the chromium catalyst was changed from 500° C. to 400° C.; that the hydrogen partial pressure was from 0.1 MPa to 0.2 MPa to control Hc/ETc to 1.6×10$^{-3}$; and that the addition amount of 1-hexene was changed from 4.0 g to 7.0 g. Polymerization activity was 2,200 g-polymer/g-catalyst/h. Measurement results of physical properties are shown in Tables 1 and 2. The polymerization activity was largely lowered as compared with that in Example 1-1. The molecular weight distribution was broadened, and the Charpy impact strength was lowered as compared with that in Example 1-1.

Example 1-11

A trialkylaluminum compound-supported chromium catalyst was prepared, and polymerization was performed in exactly the same manner as in Example 1-1, except that the activation temperature of the chromium catalyst was changed from 500° C. to 600° C.; and that the addition amount of 1-hexene was changed from 4.0 g to 2.0 g. Polymerization activity was 4,900 g-polymer/g-catalyst/h. Measurement results of physical properties are shown in Tables 1 and 2. The molecular weight distribution became narrow, and the rupture time was lowered as compared with that in Example 1-1.

Example 1-12

A trialkylaluminum compound-supported chromium catalyst was prepared, and polymerization was performed in exactly the same manner as in Example 1-1, except that the addition amount of the tri-n-butylaluminum solution was changed from 4.2 mL to 21.2 mL to control the Al/Cr molar ratio to 5. Polymerization activity was 2,300 g-polymer/g-catalyst/h. Measurement results of physical properties are shown in Tables 1 and 2. The polymerization activity was largely lowered as compared with that in Example 1-1. The molecular weight distribution was broadened, and the Charpy impact strength was lowered as compared with that in Example 1-1.

Example 1-13

A trialkylaluminum compound-supported chromium catalyst was prepared, and polymerization was performed in exactly the same manner as in Example 1-1, except for using Catalyst-2 (a catalyst having chromium acetate supported on silica) having a chromium atom supporting amount of 1.2% by weight, a specific surface area of 290 m$^2$/g and a pore volume of 1.1 cm$^3$/g. Polymerization activity was 1,900 g-polymer/g-catalyst/h. Measurement results of physical properties are shown in Tables 1 and 2. The polymerization activity was largely lowered as compared with that in Example 1-1. Both of the rupture time and the Charpy impact strength were lowered as compared with those in Example 1-1.

Example 1-14

A dialkylaluminum alkoxide compound-supported chromium catalyst was prepared in exactly the same manner as in Example 1-1(2), except that 5.9 mL of a 0.1 moles/L hexane solution of diethylaluminum ethoxide, manufactured by Tosoh Finechem Corporation (Al/Cr molar ratio=1.4) was added in place of the tri-n-butylaluminum solution. Polymerization was performed using this catalyst in exactly the same manner as in Example 1-1(3), except that the polymerization temperature was set to 96° C.; that the ethylene partial pressure was set to 1.0 MPa (Hc/ETc=1.1×10$^{-3}$); and that the addition amount of 1-hexen was set to 7.0 g. Polymerization activity was 1,500 g-polymer/g-catalyst/h. Measurement results of physical properties are shown in Tables 1 and 2. According to this, since HLMFR was enhanced due to the use of diethylaluminum ethoxide, for the purpose of allowing HLMFR to fall within the range of the polyethylene based resin of the present invention, the polymerization temperature was dropped. As a result, it is noted that the molecular weight distribution became broad, and the durability was largely enhanced.

Example 1-15

A dialkylaluminum alkoxide compound-supported chromium catalyst was prepared in exactly the same manner as in Example 1-1(2), except that 5.9 mL of a 0.1 moles/L hexane solution of diethylaluminum ethoxide, manufactured by Tosoh Finechem Corporation (Al/Cr molar ratio=1.4) was added in place of the tri-n-butylaluminum solution. Polymerization was performed using this catalyst in exactly the same manner as in Example 1-1(3), except that the polymerization temperature was set to 96° C.; that the ethylene partial pressure was set to 1.0 MPa (Hc/ETc=1.1×10$^{-3}$); and that the addition amount of 1-hexen was set to 8.5 g. Polymerization activity was 1,400 g-polymer/g-catalyst/h. Measurement results of physical properties are shown in Tables 1 and 2.

Example 1-16

A dialkylaluminum alkoxide compound-supported chromium catalyst was prepared in exactly the same manner as in Example 1-1(2), except that 5.9 mL of a 0.1 moles/L hexane solution of diethylaluminum ethoxide, manufactured by Tosoh Finechem Corporation (Al/Cr molar ratio=1.4) was added in place of the tri-n-butylaluminum solution. Polymerization was performed using this catalyst in exactly the same manner as in Example 1-1(3), except that the polymerization temperature was set to 96° C.; that the ethylene partial pressure was set to 1.0 MPa (Hc/ETc=1.1×10$^{-3}$); and that the addition amount of 1-hexen was set to 9.5 g. Polymerization activity was 1,400 g-polymer/g-catalyst/h. Measurement results of physical properties are shown in Tables 1 and 2.

Example 1-17

(1) Synthesis of Diethylaluminum n-butoxide

In a 200-mL flask which had been previously purged with nitrogen, 98 mL of hexane which had been purified by distillation was charged, and 1.37 mL (10 mmoles) of triethylaluminum, manufactured by Tosoh Finechem Corporation was then added for dissolution. Subsequently, 0.92 mL (10 mmoles) of n-butanol, manufactured by Aldrich was added. The flask was heated on an oil bath, and hexane was refluxed for 2 hours, thereby terminating the reaction. The reaction mixture was directly cooled to room temperature, thereby obtaining a 0.1 moles/L hexane solution of diethylaluminum n-butoxide.

(2) Preparation of Chromium Catalyst and Polymerization

A dialkylaluminum alkoxide compound-supported chromium catalyst was prepared in exactly the same manner as in Example 1-1(2), except that 5.9 mL of the 0.1 moles/L hexane solution of diethylaluminum n-butoxide (Al/Cr molar ratio=1.4) synthesized in the foregoing (1) was added in place of the tri-n-butylaluminum solution. Polymerization was performed using this catalyst in exactly the same manner as in Example 1-1(3), except that the polymerization temperature was set to 96° C.; that the ethylene partial pressure was set to 1.0 MPa (Hc/ETc=1.1×10$^{-3}$); and that the addition amount of 1-hexen was set to 8.5 g. Polymerization activity was 1,600 g-polymer/g-catalyst/h. Measurement results of physical properties are shown in Tables 1 and 2.

Example 1-18

(1) Synthesis of Diisobutylaluminum Ethoxide

In a 200-mL flask which had been previously purged with nitrogen, 97 mL of hexane which had been purified by distillation was charged, and 2.54 mL (10 mmoles) of triisobutylaluminum, manufactured by Tosoh Finechem Corporation was then added for dissolution. Subsequently, 0.58 mL (10 mmoles) of ethanol, manufactured by Aldrich was added. The flask was heated on an oil bath, and hexane was refluxed for 2 hours, thereby terminating the reaction. The reaction mixture was directly cooled to room temperature, thereby obtaining a 0.1 moles/L hexane solution of diisobutylaluminum ethoxide.

(2) Preparation of Chromium Catalyst and Polymerization

A dialkylaluminum alkoxide compound-supported chromium catalyst was prepared in exactly the same manner as in Example 1-1(2), except that 5.9 mL of the 0.1 moles/L hexane solution of diisobutylaluminum ethoxide (Al/Cr molar ratio=1.4) synthesized in the foregoing (1) was added in place of the tri-n-butylaluminum solution. Polymerization was performed using this catalyst in exactly the same manner as in Example 1-1(3), except that the polymerization temperature was set to 96° C.; that the ethylene partial pressure was set to 1.0 MPa (Hc/ETc=1.1×10$^{-3}$); and that the addition amount of 1-hexen was set to 8.5 g. Polymerization activity was 1,500 g-polymer/g-catalyst/h. Measurement results of physical properties are shown in Tables 1 and 2.

Example 1-19

A trialkylaluminum and dialkylaluminum alkoxide compound-supported chromium catalyst was prepared in exactly the same manner as in Example 1-1(2), except that 5.9 mL of a solution obtained by previously mixing a 0.1 moles/L hexane solution of tri-n-butylaluminum, manufactured by Tosoh Finechem Corporation and a 0.1 moles/L hexane solution of diethylaluminum ethoxide, manufactured by Tosoh Finechem Corporation (Al/Cr molar ratio=1.4) was added in place of the tri-n-butylaluminum solution. Polymerization was performed using this catalyst in exactly the same manner as in Example 1-1(3), except that the polymerization temperature was set to 96° C.; that the ethylene partial pressure was set to 1.0 MPa (Hc/ETc=1.1×10$^{-3}$); and that the addition amount of 1-hexen was set to 6.5 g. Polymerization activity was 2,200 g-polymer/g-catalyst/h. Measurement results of physical properties are shown in Tables 1 and 2.

Example 1-20

A dialkylaluminum alkoxide compound-supported chromium catalyst was prepared in exactly the same manner as in Example 1-1(2), except that 7.6 mL of a 0.1 moles/L hexane solution of diethylaluminum ethoxide, manufactured by Tosoh Finechem Corporation (Al/Cr molar ratio=1.8) was added in place of the tri-n-butylaluminum solution. Polymerization was performed using this catalyst in exactly the same manner as in Example 1-1(3), except that the polymerization temperature was set to 84° C.; that the ethylene partial pressure was set to 1.0 MPa (Hc/ETc=9.0×10$^{-4}$); and that the addition amount of 1-hexene was set to 11.0 g. Polymerization activity was 1,000 g-polymer/g-catalyst/h. Measurement results of physical properties are shown in Tables 1 and 2. According to this, though the polymerization activity is lowered as compared with that in the case of Example 1-14 in which the polymerization was performed at an Al/Cr ratio of 1.4, for the purpose of allowing HLMFR to fall within the range of the polyethylene based resin of the present invention, the polymerization temperature can be more dropped at an Al/Cr molar ratio. As a result, it is noted that the molecular weight distribution becomes broader, and the durability is enhanced.

Comparative Example 1-1

Polymerization was performed in exactly the same manner as in Example 1-1(3), except that the tri-n-butylaluminum solution was not added in Example 1-1(2); that the catalyst of Example 1-1(1) was used; that the polymerization temperature was changed to 101° C.; and that Hc/ETc was changed to 8.3×10$^{-4}$. Polymerization activity was 2,200 g-polymer/g-catalyst/h. Measurement results of physical properties are shown in Tables 1 and 2. The polymerization activity was largely lowered as compared with that in Example 1-1. The λmax and the rupture time were also largely lowered as compared with those in Example 1-1. Also, this chromium catalyst was analyzed by diffuse reflection UV-VIS.

Comparative Example 1-2

A trialkylaluminum compound-supported chromium catalyst was prepared in exactly the same manner as in Example 1-1, and polymerization was performed, except that the addition amount of the tri-n-butylaluminum solution was changed from 4.2 mL to 0.85 mL to control the Al/Cr molar ratio to 0.2; and that the polymerization temperature was changed from 100° C. to 101° C. Polymerization activity was 2,500 g-polymer/g-catalyst/h. Measurement results of physical properties are shown in Tables 1 and 2. The polymerization activity was largely lowered as compared with that in Example 1-1. The λmax and the rupture time were also largely lowered as compared with those in Example 1-1.

Comparative Example 1-3

A dialkylaluminum alkoxide compound-supported chromium catalyst was prepared, and polymerization was performed, in exactly the same manner as in Example 1-1(2), except that 0.85 mL of a 0.1 moles/L hexane solution of diethylaluminum ethoxide, manufactured by Tosoh Finechem Corporation (Al/Cr molar ratio=0.2) was added in place of the tri-n-butylaluminum solution; that the polymerization temperature was changed to 103° C.; the ethylene partial pressure was changed to 1.0 MPa (Hc/ETc=1.2×10$^{-3}$); and that the addition amount of 1-hexene was changed to 3.5 g. Polymerization activity was 1,600 g-polymer/g-catalyst/h. Measurement results of physical properties are shown in Tables 1 and 2. The λmax and the rupture time were largely lowered as compared with those in Examples 1-14 to 1-16 using the same diethylaluminum ethoxide in an Al/Cr molar ratio of 1.4.

Comparative Example 1-4

A trialkylaluminum compound-supported chromium catalyst was prepared, and polymerization was performed in exactly the same manner as in Example 1-1, except that the hydrogen partial pressure was changed from 0.1 MPa to 0.01 MPa to control Hc/ETc to 8.1×10$^{-5}$. Polymerization activity was 4,100 g-polymer/g-catalyst/h. Measurement results of physical properties are shown in Tables 3 and 4. The rupture time was largely lowered as compared with that in Example 1-1.

Comparative Example 1-5

A trialkylaluminum compound-supported chromium catalyst was prepared, and polymerization was performed in exactly the same manner as in Example 1-1, except that the hydrogen partial pressure was changed from 0.1 MPa to 1.0 MPa to control Hc/ETc to 8.1×10$^{-3}$. Polymerization activity was 3,700 g-polymer/g-catalyst/h. Measurement results of physical properties are shown in Tables 3 and 4. The λmax and the Charpy impact strength were largely lowered as compared with those in Example 1-1.

Comparative Example 1-6

Catalyst-3 (a catalyst having chromium acetate supported on silica) having a chromium atom supporting amount of 1.1% by weight, a specific surface area of 450 m²/g, a pore volume of 1.3 cm³/g and a fluorine atom supporting amount of 1.7% by weight was subjected to calcination activation at 550° C. in the same method as in Example 1-1(1). In a 2.0-L autoclave which had been thoroughly purged with nitrogen, 50 mg of this chromium catalyst and 0.8 L of isobutane were charged, and the inner temperature was elevated to 101° C. After introducing hydrogen at 0.1 MPa, 3.0 g of 1-hexene was introduced under pressure with ethylene, and polymerization was performed while keeping an ethylene partial pressure at 1.4 MPa (Hc/ETc=8.3×10⁻⁴) so as to achieve catalyst productivity of 3,000 g-polymer/g-catalyst. Subsequently, the content gas was released outside the system, thereby terminating the polymerization. Polymerization activity was 2,900 g-polymer/g-catalyst/h. Measurement results of physical properties are shown in Tables 3 and 4. The λmax and the rupture time were largely lowered as compared with those in Example 1-1.

Comparative Example 1-7

Polymerization was performed in exactly the same manner as in Example 1-1(3), except that the activation temperature of the chromium catalyst of Example 1-1(1) was changed from 500° C. to 400° C.; that the tri-n-butylaluminum was not added in Example 1-1(2); that the polymerization temperature was changed from 100° C. to 96° C.; that the ethylene partial pressure was changed from 1.4 MPa to 1.0 MPa (Hc/ETc=1.1×10⁻³); and that the addition amount of 1-hexene was changed from 4.0 g to 7.0 g. Polymerization activity sharply decreased and was found to be 20 g-polymer/g-catalyst/h. Polyethylene in an amount at which the measurement of physical properties could be performed was not obtained. As compared with Example 1-10 and Example 1-14 in which the trialkylaluminum and the dialkylaluminum alkoxide are supported, respectively, it is noted that in the case of not supporting a trialkylaluminum or a dialkylaluminum alkoxide, the polymerization activity is not substantially revealed at the activation temperature of 400° C.

Comparative Example 1-8

A dialkylaluminum alkoxide compound-supported chromium catalyst was prepared in exactly the same manner as in Example 1-1(2), except that 21.2 mL of a 0.1 moles/L hexane solution of diethylaluminum ethoxide, manufactured by Tosoh Finechem Corporation (Al/Cr molar ratio=5) was added in place of the tri-n-butylaluminum solution. Polymerization was performed using this catalyst in exactly the same manner as in Example 1-1(3), except that the ethylene partial pressure was set to 1.0 MPa (Hc/ETc=1.1×10⁻³); and that the addition amount of 1-hexen was set to 7.0 g. Polymerization activity sharply decreased and was found to be 120 g-polymer/g-catalyst/h. Polyethylene in an amount at which the measurement of physical properties could be performed was not obtained. As shown in Example 1-12, in the case of supporting a trialkylaluminum, the polymerization activity is revealed even at the same Al/Cr molar ratio of 5; whereas in the case of supporting a dialkylaluminum alkoxide, it is noted that when the Al/Cr molar ratio increases, the activity is abruptly lowered.

The foregoing Examples and Comparative Examples and also various prescriptions at the time of production in the Examples and Comparative Examples as described later are shown in Tables 1 to 4.

TABLE 1

| Example No. | Catalyst No. | Calcination activation temperature (° C.) | Organoaluminum compound | Al/Cr molar ratio | Polymerization temperature (° C.) | Ethylene partial pressure (MPa) | Hydrogen partial pressure (MPa) | Hc/ETc | Addition amount of 1-hexene (g) | Polymerization activity (g/g/h) | HLMFR (g/10 min) |
|---|---|---|---|---|---|---|---|---|---|---|---|
| Example 1-1 | Catalyst-1 | 500 | n-Bu₃Al | 1.0 | 100 | 1.4 | 0.1 | 8.1 × 10⁻⁴ | 4.0 | 4100 | 4.6 |
| Example 1-2 | Catalyst-1 | 500 | Et₃Al | 1.0 | 100 | 1.4 | 0.1 | 8.1 × 10⁻⁴ | 4.0 | 3700 | 4.5 |
| Example 1-3 | Catalyst-1 | 500 | i-Bu₃Al | 1.0 | 100 | 1.4 | 0.1 | 8.1 × 10⁻⁴ | 4.0 | 4000 | 4.5 |
| Example 1-4 | Catalyst-1 | 450 | n-Bu₃Al | 1.0 | 100 | 1.4 | 0.1 | 8.1 × 10⁻⁴ | 6.0 | 3100 | 4.1 |
| Example 1-5 | Catalyst-1 | 550 | n-Bu₃Al | 1.0 | 100 | 1.4 | 0.1 | 8.1 × 10⁻⁴ | 3.0 | 4700 | 5.0 |
| Example 1-6 | Catalyst-1 | 500 | n-Bu₃Al | 1.5 | 100 | 1.4 | 0.1 | 8.1 × 10⁻⁴ | 4.0 | 4100 | 4.5 |
| Example 1-7 | Catalyst-1 | 500 | n-Bu₃Al | 1.0 | 100 | 1.4 | 0.4 | 3.3 × 10⁻³ | 4.0 | 4000 | 5.0 |
| Example 1-8 | Catalyst-1 | 500 | n-Bu₃Al | 1.0 | 100 | 1.4 | 0.1 | 8.1 × 10⁻⁴ | 5.0 | 4200 | 5.2 |
| Example 1-9 | Catalyst-1 | 500 | n-Bu₃Al | 1.0 | 99 | 1.4 | 0.1 | 8.0 × 10⁻⁴ | 6.5 | 4400 | 5.1 |
| Example 1-10 | Catalyst-1 | 400 | n-Bu₃Al | 1.0 | 100 | 1.4 | 0.2 | 1.6 × 10⁻³ | 7.0 | 2200 | 4.3 |
| Example 1-11 | Catalyst-1 | 600 | n-Bu₃Al | 1.0 | 100 | 1.4 | 0.1 | 8.1 × 10⁻⁴ | 2.0 | 4900 | 4.8 |
| Example 1-12 | Catalyst-1 | 500 | n-Bu₃Al | 5.0 | 100 | 1.4 | 0.1 | 8.1 × 10⁻⁴ | 4.0 | 2300 | 4.4 |
| Example 1-13 | Catalyst-2 | 500 | n-Bu₃Al | 1.0 | 100 | 1.4 | 0.1 | 8.1 × 10⁻⁴ | 4.0 | 1900 | 4.5 |
| Example 1-14 | Catalyst-1 | 500 | Et₂Al(OEt) | 1.4 | 96 | 1.0 | 0.1 | 1.1 × 10⁻³ | 7.0 | 1500 | 5.5 |
| Example 1-15 | Catalyst-1 | 500 | Et₂Al(OEt) | 1.4 | 96 | 1.0 | 0.1 | 1.1 × 10⁻³ | 8.5 | 1400 | 5.8 |
| Example 1-16 | Catalyst-1 | 500 | Et₂Al(OEt) | 1.4 | 96 | 1.0 | 0.1 | 1.1 × 10⁻³ | 9.5 | 1400 | 6.5 |
| Example 1-17 | Catalyst-1 | 500 | Et₂Al(OEt) | 1.4 | 96 | 1.0 | 0.1 | 1.1 × 10⁻³ | 8.5 | 1600 | 5.7 |
| Example 1-18 | Catalyst-1 | 500 | iBu₂Al(OEt) | 1.4 | 96 | 1.0 | 0.1 | 1.1 × 10⁻³ | 8.5 | 1500 | 6.0 |
| Example 1-19 | Catalyst-1 | 500 | n-Bu₃Al/Et₂Al(OEt) | 1.4 | 96 | 1.0 | 0.1 | 1.1 × 10⁻³ | 6.5 | 2200 | 5.7 |
| Example 1-20 | Catalyst-1 | 500 | Et₂Al(OEt) | 1.8 | 84 | 1.0 | 0.1 | 9.0 × 10⁻⁴ | 11.0 | 1000 | 5.5 |
| Comparative Example 1-1 | Catalyst-1 | 500 | — | 0.0 | 101 | 1.4 | 0.1 | 8.3 × 10⁻⁴ | 4.0 | 2200 | 4.0 |
| Comparative Example 1-2 | Catalyst-1 | 500 | n-Bu₃Al | 0.2 | 101 | 1.4 | 0.1 | 8.1 × 10⁻⁴ | 4.0 | 2500 | 4.2 |
| Comparative Example 1-3 | Catalyst-1 | 500 | Et₂Al(OEt) | 0.2 | 103 | 1.0 | 0.1 | 1.2 × 10⁻³ | 3.5 | 1600 | 5.7 |

TABLE 2

| Example No. | Density (g/cm³) | Mn (×10⁴) | Mw (×10⁴) | Mw/Mn | λmax | Rupture time (h) | log (rupture time) | Right side value of formula (A) | Propriety of formula (A) | Right side value of formula (D) | Propriety of formula (D) | Concentration of aluminum on catalyst surface | Charpy impact strength (kJ/m²) | Bending stiffness (MPa) |
|---|---|---|---|---|---|---|---|---|---|---|---|---|---|---|
| Example 1-1 | 0.9468 | 1.6 | 38.8 | 24.3 | 1.1 | 61 | 1.8 | 1.5 | OK | 2.7 | NO | OK | 14 | 1050 |
| Example 1-2 | 0.9467 | 1.6 | 38.5 | 24.1 | 1.2 | 66 | 1.8 | 1.5 | OK | 2.7 | NO | OK | 14 | 1050 |
| Example 1-3 | 0.9468 | 1.6 | 38.3 | 23.9 | 1.2 | 59 | 1.8 | 1.5 | OK | 2.7 | NO | OK | 13 | 1040 |
| Example 1-4 | 0.9470 | 1.5 | 40.5 | 27.0 | 1.1 | 70 | 1.8 | 1.4 | OK | 2.6 | NO | OK | 12 | 1060 |
| Example 1-5 | 0.9470 | 1.7 | 36.5 | 21.5 | 1.2 | 40 | 1.6 | 1.4 | OK | 2.6 | NO | OK | 15 | 1060 |
| Example 1-6 | 0.9466 | 1.6 | 38.5 | 24.1 | 1.2 | 72 | 1.9 | 1.6 | OK | 2.8 | NO | OK | 14 | 1040 |
| Example 1-7 | 0.9470 | 1.5 | 36.2 | 24.1 | 1.1 | 52 | 1.7 | 1.4 | OK | 2.6 | NO | OK | 15 | 1070 |
| Example 1-8 | 0.9460 | 1.5 | 36.0 | 24.0 | 1.1 | 115 | 2.1 | 1.8 | OK | 3.0 | NO | OK | 11 | 990 |
| Example 1-9 | 0.9452 | 1.5 | 36.3 | 24.2 | 1.1 | 226 | 2.4 | 2.1 | OK | 3.3 | NO | OK | 11 | 930 |
| Example 1-10 | 0.9469 | 1.3 | 39.2 | 30.2 | 1.1 | 90 | 2.0 | 1.5 | OK | 2.7 | NO | OK | 9 | 1060 |
| Example 1-11 | 0.9466 | 2.0 | 37.2 | 18.6 | 1.3 | 38 | 1.6 | 1.6 | OK | 2.8 | NO | OK | 15 | 1040 |
| Example 1-12 | 0.9467 | 1.5 | 39.4 | 26.3 | 1.2 | 70 | 1.8 | 1.5 | OK | 2.7 | NO | OK | 9 | 1030 |
| Example 1-13 | 0.9468 | 1.8 | 38.0 | 21.1 | 1.3 | 37 | 1.6 | 1.5 | OK | 2.7 | NO | OK | 9 | 1030 |
| Example 1-14 | 0.9495 | 1.0 | 34.8 | 34.8 | 1.1 | 105 | 2.0 | 0.5 | OK | 1.7 | OK | OK | 8 | 1250 |
| Example 1-15 | 0.9485 | 1.0 | 33.5 | 33.5 | 1.1 | 240 | 2.4 | 0.9 | OK | 2.1 | OK | OK | 8 | 1180 |
| Example 1-16 | 0.9481 | 1.0 | 32.0 | 32.0 | 1.1 | 330 | 2.5 | 1.0 | OK | 2.2 | OK | OK | 8 | 1150 |
| Example 1-17 | 0.9484 | 1.0 | 33.2 | 33.2 | 1.1 | 260 | 2.4 | 0.9 | OK | 2.1 | OK | OK | 8 | 1170 |
| Example 1-18 | 0.9486 | 1.0 | 33.5 | 33.5 | 1.1 | 220 | 2.3 | 0.8 | OK | 2.0 | OK | OK | 8 | 1190 |
| Example 1-19 | 0.9480 | 1.0 | 32.5 | 32.5 | 1.2 | 95 | 2.0 | 1.1 | OK | 2.3 | NO | OK | 8 | 1140 |
| Example 1-20 | 0.9493 | 0.9 | 34.0 | 37.8 | 1.1 | 280 | 2.4 | 0.6 | OK | 1.8 | OK | OK | 8 | 1240 |
| Comparative Example 1-1 | 0.9465 | 1.6 | 38.5 | 24.1 | 1.0 | 25 | 1.4 | 1.6 | NO | 2.8 | NO | NO | 10 | 1020 |
| Comparative Example 1-2 | 0.9466 | 1.6 | 38.6 | 24.1 | 1.0 | 28 | 1.4 | 1.6 | NO | 2.8 | NO | OK | 10 | 1030 |
| Comparative Example 1-3 | 0.9490 | 1.3 | 32.9 | 25.3 | 1.0 | 15 | 1.2 | 0.7 | OK | 1.9 | NO | OK | 10 | 1210 |

TABLE 3

| Example No. | Catalyst No. | Calcination activation temperature (°C.) | Organo-aluminum compound | Al/Cr molar ratio | Polymerization temperature (°C.) | Ethylene partial pressure (MPa) | Hydrogen partial pressure (MPa) | Hc/ETc | Addition amount of 1-hexene (g) | Polymerization activity (g/g/h) | HLMFR (g/10 min) |
|---|---|---|---|---|---|---|---|---|---|---|---|
| Comparative Example 1-4 | Catalyst-1 | 500 | n-Bu₃Al | 1.0 | 100 | 1.4 | 0.01 | $8.1 \times 10^{-5}$ | 4.0 | 4100 | 4.1 |
| Comparative Example 1-5 | Catalyst-1 | 500 | n-Bu₃Al | 1.0 | 100 | 1.4 | 1.0 | $8.1 \times 10^{-3}$ | 4.0 | 3700 | 5.1 |
| Comparative Example 1-6 | Catalyst-3 | 550 | — | 0.0 | 101 | 1.4 | 0.1 | $8.3 \times 10^{-4}$ | 3.0 | 2900 | 4.6 |
| Comparative Example 1-7 | Catalyst-1 | 400 | — | 0.0 | 96 | 1.0 | 0.1 | $1.1 \times 10^{-3}$ | 7.0 | 20 | * |
| Comparative Example 1-8 | Catalyst-1 | 500 | Et₂Al(OEt) | 5.0 | 100 | 1.0 | 0.1 | $1.1 \times 10^{-3}$ | 7.0 | 120 | * |
| Example 2-1 | Catalyst-1 | 450 | — | 0.0 | 101 | | | $2.6 \times 10^{-3}$ | | 1800 | 4.0 |
| Example 2-2 | Catalyst-1 | 450 | — | 0.0 | 102 | | | $2.6 \times 10^{-3}$ | | 1900 | 4.5 |
| Comparative Example 2-1 | Catalyst-1 | 550 | — | 0.0 | 100 | | | $8.1 \times 10^{-4}$ | | 2900 | 4.0 |
| Example 3-1 | Catalyst-1 | 450 | Et₂Al(OEt) | 1.4 | 91 | 1.0 | 0.1 | $1.1 \times 10^{-3}$ | 8.0 | 1000 | 6.0 |
| Example 3-2 | Catalyst-1 | 550 | Et₂Al(OEt) | 1.4 | 96 | 1.0 | 0.1 | $1.1 \times 10^{-3}$ | 7.0 | 1900 | 5.2 |
| Example 3-3 | Catalyst-1 | 500 | Et₂Al(OEt) | 1.0 | 99 | 1.0 | 0.1 | $1.1 \times 10^{-3}$ | 6.0 | 1600 | 5.6 |
| Example 3-4 | Catalyst-1 | 500 | Et₂Al(OEt) | 1.4 | 91 | 1.0 | 0.4 | $4.4 \times 10^{-3}$ | 6.5 | 1300 | 5.9 |
| Example 3-5 | Catalyst-3 | 500 | Et₂Al(OEt) | 1.2 | 89 | 1.0 | 0.1 | $1.1 \times 10^{-3}$ | 8.0 | 1900 | 6.0 |
| Example 3-6 | Catalyst-1 | 600 | Et₂Al(OEt) | 1.4 | 98 | 1.0 | 0.1 | $1.1 \times 10^{-3}$ | 6.0 | 2000 | 6.2 |
| Comparative Example 3-1 | Catalyst-1 | 500 | n-Bu₃Al | 1.4 | 101 | 1.0 | 0.4 | $4.6 \times 10^{-3}$ | 1.5 | 2500 | 5.5 |
| Example 3-7 | Catalyst-1 | 500 | Et₂Al(OEt) | 1.4 | 102 | 1.0 | 0.0 | 0 | 5.5 | 1500 | 6.0 |
| Example 3-8 | Catalyst-1 | 500 | Et₂Al(OEt) | 1.4 | 90 | 1.0 | 1.0 | $1.0 \times 10^{-3}$ | 5.0 | 1200 | 6.1 |
| Example 3-9 | Catalyst-4 | 500 | Et₂Al(OEt) | 1.4 | 92 | 1.0 | 0.1 | $1.2 \times 10^{-3}$ | 7.0 | 1600 | 5.5 |
| Comparative Example 3-2 | Catalyst-3 | 500 | — | 0.0 | 103 | 1.0 | 0.1 | $1.2 \times 10^{-3}$ | 1.5 | 2000 | 5.5 |
| Example 4-1 | Catalyst-1 | 500 | Et₂Al(OEt) | 1.1 | 99 | 1.0 | 0.1 | $1.1 \times 10^{-3}$ | 6.0 | 1600 | 5.6 |
| Example 4-2 | Catalyst-1 | 700 | Et₂Al(OEt) | 1.4 | 96 | 1.0 | 0.1 | $1.1 \times 10^{-3}$ | 7.0 | 1800 | 4.1 |

TABLE 3-continued

| Example No. | Catalyst No. | Calcination activation temperature (° C.) | Organo-aluminum compound | Al/Cr molar ratio | Polymerization temperature (° C.) | Ethylene partial pressure (MPa) | Hydrogen partial pressure (MPa) | Hc/ETc | Addition amount of 1-hexene (g) | Polymerization activity (g/g/h) | HLMFR (g/10 min) |
|---|---|---|---|---|---|---|---|---|---|---|---|
| Example 4-3 | Catalyst-6 | 500 | Et$_2$Al(OEt) | 1.2 | 89 | 1.0 | 0.1 | $1.1 \times 10^{-3}$ | 8.0 | 1900 | 6.0 |
| Comparative Example 4-1 | Catalyst-6 | 500 | — | 0.0 | 103 | 1.0 | 0.1 | $1.2 \times 10^{-3}$ | 1.5 | 2000 | 5.5 |

*: The polymerization activity was so low that polyethylene in an amount at which the measurement of physical properties could be performed was not obtained.

TABLE 4

| Example No. | Density (g/cm$^3$) | Mn (×10$^4$) | Mw (×10$^4$) | Mw/Mn | λmax | Rupture time (h) | log (rupture time) | Right side value of formula (A) | Propriety of formula (A) | Right side value of formula (D) | Propriety of formula (D) | Concentration of aluminum on catalyst surface | Charpy impact strength (kJ/m$^2$) | Bending stiffness (MPa) |
|---|---|---|---|---|---|---|---|---|---|---|---|---|---|---|
| Comparative Example 1-4 | 0.9470 | 1.6 | 39.0 | 24.4 | 1.4 | 20 | 1.3 | 1.4 | NO | 2.6 | NO | OK | 10 | 1060 |
| Comparative Example 1-5 | 0.9471 | 1.7 | 36.4 | 21.4 | 1.0 | 45 | 1.7 | 1.4 | OK | 2.6 | NO | OK | 8 | 1050 |
| Comparative Example 1-6 | 0.9466 | 2.0 | 38.4 | 19.2 | 1.0 | 24 | 1.4 | 1.6 | OK | 2.8 | NO | NO | 12 | 1040 |
| Comparative Example 1-7 | * | * | * | * | * | * | * | * | * | * | * | * | * | * |
| Comparative Example 1-8 | * | * | * | * | * | * | * | * | * | * | * | * | * | * |
| Example 2-1 | 0.9470 | | | 29.0 | 1.3 | 70 | 1.8 | 1.4 | OK | 2.6 | NO | NO | 10 | 1060 |
| Example 2-2 | 0.9480 | | | 32.0 | 1.2 | 50 | 1.7 | 1.1 | OK | 2.3 | NO | NO | 9.5 | 1100 |
| Comparative Example 2-1 | 0.9470 | | | 20.0 | 1.4 | 10 | 1.0 | 1.4 | NO | 2.6 | NO | NO | 9.5 | 1050 |
| Example 3-1 | 0.9495 | 1.0 | 36.0 | 36.0 | 1.1 | 150 | 2.2 | 0.5 | OK | 1.7 | OK | OK | 7 | 1200 |
| Example 3-2 | 0.9485 | 1.0 | 31.0 | 31.0 | 1.2 | 180 | 2.3 | 0.9 | OK | 2.1 | OK | OK | 9 | 1200 |
| Example 3-3 | 0.9490 | 1.0 | 28.0 | 28.0 | 1.1 | 180 | 2.3 | 0.7 | OK | 1.9 | OK | OK | 9 | 1220 |
| Example 3-4 | 0.9494 | 1.0 | 35.2 | 35.2 | 1.1 | 120 | 2.1 | 0.6 | OK | 1.8 | OK | OK | 8 | 1180 |
| Example 3-5 | 0.9499 | 1.0 | 31.8 | 31.8 | 1.1 | 100 | 2.0 | 0.4 | OK | 1.6 | OK | | | |
| Example 3-6 | 0.9494 | 1.0 | 25.0 | 25.0 | 1.2 | 60 | 1.8 | 0.6 | OK | 1.8 | OK | OK | 8 | 1200 |
| Comparative Example 3-1 | 0.9480 | 1.2 | 37.0 | 30.8 | 1.0 | 65 | 1.8 | 1.1 | OK | 2.3 | NO | OK | 9 | 1040 |
| Example 3-7 | 0.9485 | 1.0 | 26.8 | 26.8 | 1.4 | 70 | 1.8 | 0.9 | OK | 2.1 | NO | OK | 9 | 1230 |
| Example 3-8 | 0.9487 | 1.0 | 37.1 | 37.1 | 1.0 | 120 | 2.1 | 0.8 | OK | 2.0 | OK | OK | 7 | 1150 |
| Example 3-9 | 0.9485 | 1.1 | 41.0 | 37.2 | 1.2 | 250 | 2.4 | 0.9 | OK | 2.1 | OK | OK | 6 | 1150 |
| Comparative Example 3-2 | 0.9492 | 1.0 | 23.4 | 23.4 | 1.0 | 50 | 1.7 | 0.6 | OK | 1.8 | NO | NO | 8 | 100 |
| Example 4-1 | 0.9490 | 1.0 | 28.0 | 28.0 | 1.1 | 180 | 2.3 | 0.7 | OK | 1.9 | OK | OK | 9 | 1220 |
| Example 4-2 | 0.9480 | 1.1 | 28.2 | 25.6 | 1.2 | 80 | 1.9 | 1.1 | OK | 2.3 | NO | OK | 10 | 1200 |
| Example 4-3 | 0.9499 | 1.0 | 31.8 | 31.8 | 1.1 | 100 | 2.0 | 0.4 | OK | 1.6 | OK | OK | 8 | 1180 |
| Comparative Example 4-1 | 0.9492 | 1.0 | 23.4 | 23.4 | 1.0 | 50 | 1.7 | 0.6 | OK | 1.8 | NO | NO | 8 | 1100 |

*: The polymerization activity was so low that polyethylene in an amount at which the measurement of physical properties could be performed was not obtained.

The catalysts which are used in the present invention are as follows.

Catalyst-1: Cr=1.1% by weight, specific surface area=500 m$^2$/g, pore volume=1.5 cm$^3$/g Catalyst-2: Cr=1.2% by weight, specific surface area=290 m$^2$/g, pore volume=1.1 cm$^3$/g Catalyst-3: Cr=1.1% by weight, specific surface area=450 m$^2$/g, pore volume=1.3 cm$^3$/g. F=1.7% by weight Catalyst-4: Cr=1.1% by weight, specific surface area=500 m$^2$/g, pore volume=1.5 cm$^3$/g+Ti(OiPr)$_4$ (4.5 wt %-Ti)

Catalyst-5: Cr=1.1% by weight, specific surface area=500 m$^2$/g, pore volume=1.5 cm$^3$/g, Al$_2$O$_3$=4.0% by weight Catalyst-6: Cr=1.1% by weight, specific surface area=500 m$^2$/g, pore volume=1.5 cm$^3$/g, F=1.7% by weight (4) Production of Polyethylene Using a Pipe Loop Type Reactor and Product and Evaluation of Hollow Plastic Molded Article:

Example 1-21

120 L/h of isobutane and 5 g/h of the trialkylaluminum compound-supported chromium catalyst obtained in Example 1-1(2) were continuously fed into a pipe loop type reactor with an internal volume of 200 L; ethylene, hydrogen and 1-hexene were fed at 100° C. so as to keep a weight ratio of a hydrogen concentration to an ethylene concentration (Hc/ETc) in a liquid phase at $8.1 \times 10^{-4}$ and a weight ratio of a 1-hexene concentration to an ethylene concentration in a liquid phase at 0.11, respectively while discharging the reactor contents at a prescribed rate; and polymerization was continuously performed in a liquid-filled state under a condition at a total pressure of 4.1 MPa for an average residence time of 0.9 hours. Catalyst productivity was found to be 4,100 g-polymer/g-catalyst, and average polymerization activity was found to be 4,600 g-polymer/g-catalyst/h. Measurement results of physical properties (HLMFR, density, molecular weight (Mn and Mw), molecular weight distribution (Mw/Mn), λmax, rupture time, Charpy impact strength and bending stiffness) are shown in Table 5.

A fuel tank for automobiles was molded in the following manner and evaluated with respect to drop impact properties, moldability and gasoline barrier properties. The results are shown in Table 5.

1. Used Molding Machine:

A large multi-layer blow molding machine (NB 150, manufactured by The Japan Steel Works, Ltd.) made of six layers of four different materials was used, and molding was performed under the following condition regarding extrusion screws and layer configuration.

Outermost layer (first layer from the outside): Diameter=90 mmϕ, L/D=22

Second layer (second layer from the outside): Diameter=120 mmϕ, L/D=28

Third layer (third layer from the outside): Diameter=50 mmϕ, L/D=22

Fourth layer (fourth layer from the outside): Diameter=50 mmϕ, L/D=28

Fifth layer (fifth layer from the outside): Diameter=50 mmϕ, L/D=22

Innermost layer (sixth layer from the outside): Diameter=120 mmϕ, L/D=241

2. Molding Condition:

A multi-layer fuel tank made of six layers of four different materials and having a tank weight of 8 kg and a capacity of 60 L was molded under a condition at a molding temperature of 210° C. and at a blow die cooling temperature of 20° C. for a cooling time of 180 seconds. As to a shape of the tank, a prototype (saddle type) by Japan Polyethylene Corporation was molded. Incidentally, as to the layer ratios, the rotation number of each of the screws of the extruder was adjusted while observing a thickness ratio of the tank so as to have ratios of 11% for the outermost layer, 40% for the second layer, 3% for the third layer, 3% for the fourth layer, 3% for the fifth layer and 40% for the innermost layer, respectively.

Example 1-22

Polymerization was continuously performed under a condition for an average residence time of 2.4 hours in exactly the same manner as in Example 1-21, except that the dialkylaluminum alkoxide compound-supported chromium catalyst obtained in Example 1-14 was used in place of the trialkylaluminum compound-supported chromium catalyst obtained in Example 1-1(2); that the polymerization temperature was changed to 96° C.; that the weight ratio of a hydrogen concentration to an ethylene concentration (Hc/ETc) in a liquid phase was changed to $1.1 \times 10^{-3}$; and that the weight ratio of a 1-hexene concentration to an ethylene concentration in a liquid phase was changed to 0.21. Catalyst productivity was found to be 3,800 g-polymer/g-catalyst, and average polymerization activity was found to be 1,600 g-polymer/g-catalyst/h. Measurement results of physical properties (HLMFR, density, molecular weight (Mn and Mw), molecular weight distribution (Mw/Mn), λmax, rupture time, Charpy impact strength and bending stiffness) are shown in Table 5. Furthermore, a fuel tank for automobiles was molded in the same manner as in Example 1-21. The results of evaluation with respect to drop impact properties, moldability and gasoline barrier properties are shown in Table 5.

Comparative Example 1-15

Polymerization was continuously performed for an average residence time of 1.6 hours in exactly the same manner as in Example 1-21, except that the chromium catalyst obtained in Example 1-1(1) was used in place of the trialkylaluminum compound-supported chromium catalyst obtained in Example 1-1(2); and that the polymerization temperature was changed from 100° C. to 101° C. Catalyst productivity was found to be 3,800 g-polymer/g-catalyst, and average polymerization activity was found to be 2,300 g-polymer/g-catalyst/h. Results of physical properties and evaluation of a fuel tank for automobiles are shown in Table 5. As compared with the cases of Examples 1-21 and 1-22, the rupture time, the drop impact properties and the moldability were lowered.

Comparative Example 1-16

Polymerization was continuously performed for an average residence time of 1.3 hours in exactly the same manner as in Example 1-21, except that the chromium catalyst obtained in Comparative Example 1-96 was used in place of the trialkylaluminum compound-supported chromium catalyst obtained in Example 1-1(2); and that the polymerization temperature was changed from 100° C. to 101° C. Catalyst productivity was found to be 4,000 g-polymer/g-catalyst, and average polymerization activity was found to be 3,100 g-polymer/g-catalyst/h. Results of physical properties and evaluation of a fuel tank for automobiles are shown in Table 5. As compared with the cases of Examples 1-21 and 1-22, the rupture time was largely lowered, and the moldability was also lowered.

Comparative Example 1-17

Figure 2:
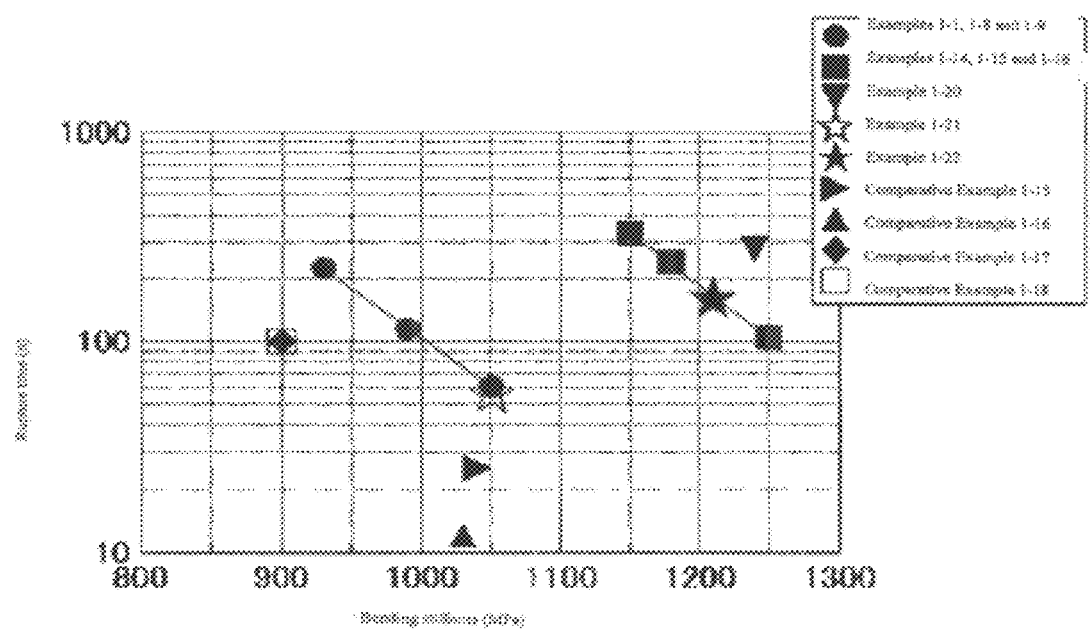
FIG. 2 is a plot diagram showing a relation between bending stiffness and rupture time regarding representative Examples and Comparative Examples.

Lupolen 4261 AG, manufactured by Basell Polyolefins was used as commercially available polyethylene, and physical properties and a fuel tank for automobiles were evaluated in the same manner as in Example 1-21. The results are shown in Table 5. A relation between stiffness and rupture time is shown in FIG. 2. As compared with the cases of Examples 1-21 and 1-22, the case of Comparative Example 1-17 revealed the results that a balance between the stiffness and the durability is inferior.

Comparative Example 1-18

HB111R, manufactured by Japan Polyethylene Corporation was used as commercially available polyethylene, and physical properties and a fuel tank for automobiles were evaluated in the same manner as in Example 1-21. The results are shown in Table 5. A relation between stiffness and rupture time is shown in FIG. 2. As compared with Comparative Example 1-18, the cases of Examples 1-21 and 1-22 revealed the results that a balance between the stiffness and the durability is favorable.

TABLE 5

| | | Example 1-21 | Example 1-22 | Comparative Example 1-15 | Comparative Example 1-16 | Comparative Example 1-17 | Comparative Example 1-18 |
|---|---|---|---|---|---|---|---|
| Chromium catalyst | | Catalyst-1 | Catalyst-1 | Catalyst-1 | Catalyst-3 | Lupolen 4261AG, manufactured by Basell Polyolefins | HB111R, manufactured by Japan Polyethylene Corporation |
| Calcination activation temperature | °C. | 500 | 500 | 500 | 550 | | |
| Trialkylaluminum compound | | n-Bu$_3$Al | Et$_2$Al(OEt) | — | — | | |
| A/Cr molar ratio | | 1 | 1.4 | 0 | 0 | | |
| Polymerization temperature | | 100 | 96 | 101 | 101 | | |
| Hc/ETc | | $8.1 \times 10^{-4}$ | $1.1 \times 10^{-3}$ | $8.3 \times 10^{-4}$ | $8.3 \times 10^{-4}$ | | |
| HLMFR | g/10 min | 4.5 | 5.7 | 4.2 | 4.4 | 6 | 6 |
| Density | g/cm$^3$ | 0.9469 | 0.9490 | 0.9467 | 0.9466 | 0.945 | 0.945 |
| Mn (×10$^4$) | | 1.6 | 1.0 | 1.6 | 2.0 | 2.7 | 1.6 |
| Mw (×10$^4$) | | 39.0 | 34.5 | 38.5 | 38.6 | 38.4 | 29.4 |
| Mw/Mn | | 24.4 | 34.5 | 24.1 | 19.3 | 14.4 | 18.8 |
| λmax | | 1.16 | 1.12 | 1.04 | 1.06 | 1.25 | 1.79 |
| Rupture time | h | 56 | 160 | 25 | 12 | 100 | 100 |
| Charpy impact strength | kJ/m$^2$ | 14 | 8 | 12 | 17 | 10 | 10 |
| Bending stiffness | MPa | 1050 | 1210 | 1040 | 1030 | 900 | 900 |
| Drop impact properties | % | ⊙ | ○ | ○ | ⊙ | ⊙ | ⊙ |
| Moldability | | ○ | ○ | Δ | Δ | ○ | ⊙ |
| Gasoline barrier properties | g/day | ⊙ | ⊙ | ⊙ | ⊙ | ⊙ | ⊙ |

It is noted from the foregoing Tables 1 to 4 that the present polyethylene based resins of the Examples are excellent in moldability and durability and excellent in a balance between impact resistance and stiffness, whereas the polyethylene based resins of the Comparative Examples are inferior in at least one of these characteristics. Also, it is noted from Table 5 that the hollow plastic molded articles of the Examples are excellent in moldability, durability and barrier properties and excellent in a balance between impact resistance and stiffness, whereas the polyethylene based resins of the Comparative Examples are inferior in at least one of these characteristics.

Example 2-1

(1) Activation of Chromium Catalyst 5 kg of Catalst-1 (Phillips catalyst) having a chromium atom-supporting amount of a carrier of 1.1% by mass (carrier: silica), a specific surface are of 500 m$^2$/g and a pore volume of 1.5 cm$^3$/g was thrown into an electric furnace for activation having an inner diameter of 25 cm, fluidized with dry air and then activated at an activation temperature of 450° C. for 20 hours. The catalyst was taken out in dry nitrogen and set in a catalyst feed apparatus.

(2) Polymerization

120 L/h of isobutane and 7.5 g/h of the chromium catalyst obtained in the foregoing (1) were continuously fed into a pipe loop type reactor with an internal volume of 200 L; ethylene, hydrogen and 1-hexene were fed at 101° C. so as to keep a weight ratio of a hydrogen concentration to an ethylene concentration in a liquid phase at $2.6 \times 10^{-3}$ and a weight ratio of a 1-hexene concentration to an ethylene concentration in a liquid phase at 0.12, respectively while discharging the reactor contents at a prescribed rate; and polymerization was continuously performed in a liquid-filled state under a condition at a total pressure of 4.1 MPa for an average residence time of 1.5 hours. Catalyst productivity was found to be 2,700 g-polymer/g-catalyst, and average polymerization activity was found to be 1,800 g-polymer/g-catalyst/h. The polymerization was continued for 60 hours, thereby obtaining 1.2 tons of a polyethylene based polymer. Measurement results of physical properties (melt flow rate, density, molecular weight (Mn and Mw), molecular weight distribution (Mw/Mn), stiffness, rupture time, Charpy impact strength. elongation viscosity and melt tension) are shown in Tables 3 and 4.

(3) Molding of Fuel Tank for Automobiles

Furthermore, the following Resins 1 to 4 were used and molded by a co-extrusion blow molding machine (NB 150, manufactured by The Japan Steel Works, Ltd.) under the following condition so as to have the following layer configuration, thereby obtaining a fuel tank for automobiles.
(Used Resins)
1. Polyethylene Based Resin:
The present polyethylene based resin produced by performing polymerization using the chromium catalyst was used.
2. Adhesive Resin (MAPE):
Maleic anhydride-modified polyethylene having 0.1% by mass of maleic anhydride grafted thereon, manufactured by Japan Polyethylene Corporation was used.
3. Barrier Resin (EVOH):
An ethylene vinyl alcohol resin EVAL, manufactured by Kuraray Co., Ltd. was used.
4. Regenerated Material:
A regrind resin prepared by in the foregoing layer configuration, using the same resin as the resin constituting the innermost layer as a regenerated material layer resin at the time of starting an experiment, blow molding a fuel tank for automobiles and pulverizing the fuel tank for automobiles was used as a regenerated material. Specifically, for the regenerated material layer, a regenerated material prepared by molding a fuel tank for automobiles having the following layer configuration and pulverizing it was used.
(Layer Configuration)
Outermost layer: Present polyethylene based resin (layer configuration ratio: 11%)
Regenerated material layer: Present polyethylene based resin (layer configuration ratio: 40%)
Adhesive outer layer: MAPE (layer configuration ratio: 3%)
Barrier layer: EVOH (layer configuration ratio: 3%)
Adhesive inner layer: MAPE (layer configuration ratio: 3%)
Innermost layer: Present polyethylene based resin (layer configuration ratio: 40%)

(Molding Condition)

A multi-layer fuel tank made of six layers of four different materials and having a tank weight of 8 kg and a capacity of 60 L was molded under the following co-extrusion multi-layer condition at a molding temperature of 210° C. and at a blow die cooling temperature of 20° C. for a cooling time of 180 seconds. As to a shape of the tank, a saddle type was molded. Incidentally, as to the layer ratios, the rotation number of each of the screws of the extruder was adjusted while observing a thickness ratio of the tank so as to have ratios of 11% for the outermost layer, 40% for the second layer, 3% for the third layer, 3% for the fourth layer, 3% for the fifth layer and 40% for the innermost layer, respectively.

Outermost layer (first layer from the outside): Diameter=90 mmϕ, L/D=22

Second layer (second layer from the outside): Diameter=120 mmϕ, L/D=28

Third layer (third layer from the outside): Diameter=50 mmϕ, L/D=22

Fourth layer (fourth layer from the outside): Diameter=50 mmϕ, L/D=28

Fifth layer (fifth layer from the outside): Diameter=50 mmϕ, L/D=22

Innermost layer (sixth layer from the outside): Diameter=120 mmϕ, L/D=241

The fuel tank for automobiles was evaluated with respect to drop impact properties, heat resistance/pressure resistance test, internal pressure deformation test and extrusion characteristic. The results are shown in Table 6.

According to this, it is noted that both of the physical properties of the polyethylene based resin and the evaluation of the fuel tank for automobiles are favorable.

Example 2-2

Polymerization and molding were performed in the same manner as in Example 2-1, except that the polymerization temperature was changed to 102° C.; and that the mass ratio of a 1-hexene concentration to an ethylene concentration in a liquid phase was changed to 0.11. Catalyst productivity was found to be 2,900 g-polymer/g-catalyst, and average polymerization activity was found to be 1,900 g-polymer/g-catalyst/h. Physical properties of the polyethylene based resin and evaluation results of the fuel tank for automobiles are shown in Table 6. According to this, it is noted that both of the physical properties of the polyethylene based resin and the evaluation of the fuel tank for automobiles are favorable.

Comparative Examples 2-1

(1) Activation of Chromium Catalyst:

Activation was performed in exactly the same manner as in Example 2-1(1), except that the activation temperature was changed to 550° C.

(2) Polymerization:

Polymerization was performed in exactly the same manner as in Example 2-1(2), except that the mass ratio of a hydrogen concentration to an ethylene concentration in a liquid phase was changed to $8.1 \times 10^{-4}$; and the mass ratio of a 1-hexene concentration to an ethylene concentration in a liquid phase was changed to 0.10. Catalyst productivity was found to be 4,300 g-polymer/g-catalyst, and average polymerization activity was found to be 2,900 g-polymer/g-catalyst/h. Physical properties of the obtained polyethylene based resin are shown in Tables 3 and 4.

Also, evaluation results of a fuel tank for automobiles molded in the same manner as in Example 2-1 are shown in Table 6.

According to this, it is noted that the molecular weight distribution becomes narrow, and the results of FNCT and heat resistance/pressure resistance test are poor.

TABLE 6

| | Physical properties of polyethylene | | | | | | Physical properties of molded article | | | |
|---|---|---|---|---|---|---|---|---|---|---|
| | Density g/cm$^3$ | HLMFR g/10 min | Mw/Mn — | FNCT hr | Charpy impact strength kJ/m$^2$ | λmax — | Bending modulus MPa | Moldability — | Drop impact properties — | Internal pressure deformation test — | Heat resistance/pressure resistance test — |
| Example 2-1 | 0.947 | 4.0 | 29 | 70 | 10 | 1.3 | 1060 | ○ | ○ | ○ | ○ |
| Example 2-2 | 0.948 | 4.5 | 32 | 50 | 9.5 | 1.2 | 1100 | ○ | ○ | ○ | ○ |
| Comparative Example 2-1 | 0.947 | 4.0 | 20 | 10 | 9.5 | 1.4 | 1050 | ○ | ○ | ○ | X |

It is noted from Table 6 that the present polyethylene based resin of the Examples is excellent in moldability and durability and excellent in a balance between impact resistance and stiffness and has high stiffness, whereas the polyethylene based resin of the Comparative Example is inferior in at least one of these characteristics. Also, it is noted that the hollow plastic molded articles of the Examples are excellent in moldability and durability and excellent in a balance between impact resistance and stiffness, whereby the polyethylene based resin of the Comparative Example is inferior in at least one of these characteristics.

Example 3-1

A diethylaluminum ethoxide compound-supported chromium catalyst was prepared, and polymerization was performed in exactly the same manner as in Example 1-14, except that the activation temperature of the chromium catalyst was changed from 500° C. to 450° C.; that the polymerization temperature was changed from 96° C. to 91° C.; and that the addition amount of 1-hexene was changed from 7.0 g to 8.0 g.

Polymerization activity was 1,000 g-polymer/g-catalyst/h. Measurement results of physical properties and the like are shown in Tables 3 and 4.

Example 3-2

A diethylaluminum ethoxide compound-supported chromium catalyst was prepared, and polymerization was performed in exactly the same manner as in Example 1-14, except that the activation temperature of the chromium catalyst was changed from 500° C. to 550° C.

Polymerization activity was 1,900 g-polymer/g-catalyst/h. Measurement results of physical properties and the like are shown in Tables 3 and 4.

Example 3-3

A diethylaluminum alkoxide compound-supported chromium catalyst was prepared in exactly the same manner as in Example 1-14(2), except that 4.2 mL of a 0.1 moles/L hexane solution of diethylaluminum ethoxide, manufactured by Tosoh Finechem Corporation (Al/Cr molar ratio=1.0) was added. Polymerization was performed using this catalyst in exactly the same manner as in Example 1-14(3), except that the polymerization temperature was set to 99° C.; and that the addition amount of 1-hexen was set to 6.0 g.

Polymerization activity was 1,600 g-polymer/g-catalyst/h. Measurement results of physical properties and the like are shown in Tables 3 and 4.

Example 3-4

A diethylaluminum ethoxide compound-supported chromium catalyst was prepared, and polymerization was performed in exactly the same manner as in Example 1-14, except that the hydrogen partial pressure was changed from 0.1 MPa to 0.4 MPa to control He/ETc to $4.4 \times 10^{-3}$.

Polymerization activity was 1,300 g-polymer/g-catalyst/h. Measurement results of physical properties are shown in Tables 3 and 4. As compared with the case of Example 1-14 in which the polymerization was performed at a hydrogen partial pressure of 0.1 MPa, it is noted that for the purpose of allowing HLMFR to fall within the range of the polyethylene based resin of the present invention, when the hydrogen partial pressure is 0.4 MPa, the polymerization temperature can be more lowered, and as a result, the molecular weight distribution becomes broader, and the durability is enhanced.

Example 3-5

Catalyst-3 having a chromium atom supporting amount of 1.1% by weight, a specific surface area of 450 m$^2$/g, a pore volume of 1.3 cm$^3$/g and a fluorine atom supporting amount of 1.7% by weight was prepared. A dialkylaluminum alkoxide compound and fluorine-supported chromium catalyst was prepared in exactly the same manner as in Example 1-14(2), except that 5.1 mL of a 0.1 moles/L hexane solution of diethylaluminum ethoxide, manufactured by Tosoh Finechem Corporation (Al/Cr molar ratio=1.2) was added. Polymerization was performed using this catalyst in exactly the same manner as in Example 1-14(3), except that the polymerization temperature was set to 89° C.; and that the addition amount of 1-hexen was set to 8.0 g.

Polymerization activity was 1,900 g-polymer/g-catalyst/h. Measurement results of physical properties and the like are shown in Tables 3 and 4.

Example 3-6

A diethylaluminum ethoxide compound-supported chromium catalyst was prepared, and polymerization was performed in exactly the same manner as in Example 1-14, except that the activation temperature of the chromium catalyst was changed from 500° C. to 600° C.; and that the polymerization temperature was changed from 96° C. to 98° C.

Polymerization activity was 2,000 g-polymer/g-catalyst/h.

Comparative Example 3-1

A tri-n-butylaluminum compound-supported chromium catalyst was prepared in exactly the same manner as in Example 1-14(2), except that 5.9 mL of a 0.1 moles/L hexane solution of tri-n-butylaluminum, manufactured by Tosoh Finechem Corporation (Al/Cr molar ratio=1.4) was added in place of the diethylaluminum ethoxide. Polymerization was performed using this catalyst in exactly the same manner as in Example 1-14(3), except that the ethylene partial pressure was set to 0.4 MPa (Hc/ETc=$4.6 \times 10^{-3}$); and that the addition amount of 1-hexen was set to 1.5 g.

Polymerization activity was 2,500 g-polymer/g-catalyst/h. Measurement results of physical properties and the like are shown in Tables 3 and 4.

Example 3-7

Polymerization was performed in exactly the same manner as in Example 1-14, except that the polymerization temperature was changed from 96° C. to 102° C.; and that hydrogen was not introduced at all (Hc/ETc=0).

Polymerization activity was 1,500 g-polymer/g-catalyst/h. Measurement results of physical properties and the like are shown in Tables 3 and 4.

Example 3-8

A diethylaluminum ethoxide compound-supported chromium catalyst was prepared, and polymerization was performed in exactly the same manner as in Example 1-14, except that the polymerization temperature was changed from 96° C. to 90° C.; and that the hydrogen partial pressure was from 0.1 MPa to 1.0 MPa to control Hc/ETc to $1.1 \times 10^{-3}$.

Polymerization activity was 1,200 g-polymer/g-catalyst/h. Measurement results of physical properties and the like are shown in Tables 3 and 4.

Example 3-9

A dialkylaluminum ethoxide compound-supported chromium catalyst was prepared in exactly the same manner as in Example 1-14, except for using Catalyst-4 having a chromium atom supporting amount of 1.1% by weight, a specific surface area of 500 m$^2$/g and a pore volume of 1.5 cm$^3$/g and containing 4.5% by weight of titania in terms of a titanium atom supporting amount, which had been obtained by supporting titanium tetraisopropoxide thereon and subjecting to calcination activation. Polymerization was performed in exactly the same manner as in Example 1-14(3), except that this dialkylaluminum ethoxide compound-supported chromium catalyst was used; and that the polymerization temperature was changed from 96° C. to 92° C.

Polymerization activity was 1,600 g-polymer/g-catalyst/h.

Comparative Example 3-2

Catalyst-3 having a chromium atom supporting amount of 1.1% by weight, a specific surface area of 500 m$^2$/g, a pore volume of 1.5 cm$^3$/g and a fluorine atom supporting amount of 1.7% by weight was prepared and subjected to calcination activation at 500° C. in the same method as in Example 1-14(1). Polymerization was performed using this catalyst in exactly the same manner as in Example 1-14(3), except that the polymerization temperature was set to 103° C.; and that the addition amount of 1-hexen was set to 1.5 g.

Polymerization activity was 2,000 g-polymer/g-catalyst/h. Measurement results of physical properties and the like are shown in Tables 3 and 4. It is noted that HLMFR largely increases. For the purpose of allowing HLMFR to fall within the range of the polyethylene based resin of the present invention, the polymerization temperature was elevated. As a result, it is noted that the molecular weight distribution became narrow, and the durability was largely lowered.

Example 4-1

A diethylaluminum ethoxide-supported chromium catalyst was prepared in exactly the same manner as in Example 1-14(2), except that 4.6 mL of a 0.1 moles/L hexane solution of diethylaluminum ethoxide, manufactured by Tosoh Finechem Corporation (Al/Cr molar ratio=1.1) was added.

Polymerization was performed using this catalyst in exactly the same manner as in Example 1-14(3), except that the polymerization temperature was set to 99° C.; and that the addition amount of 1-hexen was set to 6.0 g.

Polymerization activity was 1,600 g-polymer/g-catalyst/h. Measurement results of physical properties and the like are shown in Tables 3 and 4.

Example 4-2

A diethylaluminum ethoxide compound-supported chromium catalyst was prepared, and polymerization was performed in exactly the same manner as in Example 1-14, except that the activation temperature of the chromium catalyst was changed from 500° C. to 700° C.

Polymerization activity was 1,800 g-polymer/g-catalyst/h. Measurement results of physical properties and the like are shown in Tables 3 and 4.

Example 4-3

Catalyst-6 having a chromium atom supporting amount of 1.1% by weight, a specific surface area of 500 m$^2$/g, a pore volume of 1.5 cm$^3$/g and a fluorine atom supporting amount of 1.7% by weight was subjected to calcination activation at 500° C. in the same method as in Example 1-14(1). A dialkylaluminum alkoxide compound and fluorine-supported chromium catalyst was prepared in exactly the same manner as in Example 1-14(2), except that 5.1 mL of a 0.1 moles/L hexane solution of diethylaluminum ethoxide, manufactured by Tosoh Finechem Corporation (Al/Cr molar ratio=1.2) was added.

Polymerization was performed using this catalyst in exactly the same manner as in Example 1-14(3), except that the polymerization temperature was set to 89° C.; and that the addition amount of 1-hexen was set to 8.0 g.

Polymerization activity was 1,900 g-polymer/g-catalyst/h. Measurement results of physical properties and the like are shown in Tables 3 and 4.

Example 4-4

A diethylaluminum ethoxide-supported chromium catalyst was prepared inexactly the same manner as in Example 1-14(2), except that 2.1 mL of a 0.1 moles/L hexane solution of diethylaluminum ethoxide, manufactured by Tosoh Finechem Corporation (Al/Cr molar ratio=0.5) was added. This prepared diethylaluminum ethoxide-supported chromium catalyst was analyzed by diffuse reflection UV-VIS.

Example 4-5

A diethylaluminum ethoxide-supported chromium catalyst was prepared inexactly the same manner as in Example 1-14(2), except that 42 mL of a 0.1 moles/L hexane solution of diethylaluminum ethoxide, manufactured by Tosoh Finechem Corporation (Al/Cr molar ratio=10) was added. This prepared diethylaluminum ethoxide-supported chromium catalyst was analyzed by diffuse reflection UV-VIS.

Comparative Example 4-1

Catalyst-6 having a chromium atom supporting amount of 1.1% by weight, a specific surface area of 500 m$^2$/g, a pore volume of 1.5 cm$^3$/g and a fluorine atom supporting amount of 1.7% by weight was prepared and subjected to calcination activation at 500° C. in the same method as in Example 1-14(1).

Polymerization was performed using this catalyst in exactly the same manner as in Example 1-14(3), except that the polymerization temperature was set to 103° C.; and that the addition amount of 1-hexen was set to 1.5 g.

Polymerization activity was 2,000 g-polymer/g-catalyst/h. Measurement results of physical properties and the like are shown in Tables 3 and 4. It is noted that HLMFR largely increases. For the purpose of allowing HLMFR to fall within the range of the polyethylene based resin of the present invention, the polymerization temperature was elevated. As a result, it is noted that the molecular weight distribution became narrow, and the durability was largely lowered.

INDUSTRIAL APPLICABILITY

When the polyethylene based resin of the present invention is processed into a hollow plastic molded article, it is able to allow it to exhibit excellent moldability, durability and barrier properties and to have an excellent balance between impact resistance and stiffness. Above all, it is suitably used for a fuel tank, in particularly a fuel tank for automobiles or the like, and therefore, its industrial meanings are high.

The invention claimed is:
1. A polyethylene based resin, which satisfies requirements (1) to (5):
   (1) a high-load melt flow rate (HLMFR) is from 1 to 100 g/10 min;
   (2) a density is from 0.940 to 0.960 g/cm$^3$;
   (3) a strain hardening parameter λmax of elongational viscosity is from 1.05 to 1.50;
   (4) a rupture time in a full notch tensile creep test and a density satisfy the following relational expression (A):

log(rupture time)≥−355×(density)+337.6     (A);

and
   (5) a molecular weight distribution (Mw/Mn) measured by gel permeation chromatography (GPC) is 32 or more;
   wherein the polyethylene based resin is produced with an organoaluminum compound-supported chromium catalyst obtained by first subjecting an inorganic oxide carrier having a chromium compound supported thereon to calcination activation and further supporting an organoaluminum compound,
   wherein the organoaluminum compound has formula (1):

$R^1{}_n Al(OR^2)_{3-n}$     (1)

n=1,2
   wherein $R^1$ and $R^2$ are each independently an alkyl group, provided that the alkyl group of each of $R^1$ and $R^2$ also includes a cycloalkyl group.

2. The polyethylene based resin of claim 1, wherein the rupture time in a full notch tensile creep test and the density satisfy expression (D):

$$\log(\text{rupture time}) \geq -355 \times (\text{density}) + 338.8 \qquad (D).$$

3. The polyethylene based resin of claim 1, which is produced using a chromium catalyst supporting an organoaluminum compound having formula (2):

$$R^3R^4Al(OR^5) \qquad (2),$$

wherein $R^3$, $R^4$, and $R^5$ are each independently an alkyl group, provided that the alkyl group of each of $R^3$, $R^4$ and $R^5$ also includes a cycloalkyl group.

4. The polyethylene based resin of claim 1, having a Charpy impact strength of 8 kJ/m² or more.

5. The polyethylene based resin of claim 1, wherein the rupture time (T) in a full notch tensile creep test is 30 hours or more.

* * * * *